US012661851B2

(12) United States Patent
Bonilla et al.

(10) Patent No.: US 12,661,851 B2
(45) Date of Patent: Jun. 23, 2026

(54) MATERIAL SUPPLY SYSTEMS FOR ADDITIVE MANUFACTURING AND METHODS FOR USING THE SAME

(71) Applicant: General Electric Company, Schenectady, NY (US)

(72) Inventors: Carlos H. Bonilla, Lebanon, OH (US); Gregory Kurt Miller, Houston, PA (US); John Sterle, Clifton Park, NY (US); Vadim Bromberg, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 376 days.

(21) Appl. No.: 18/032,471

(22) PCT Filed: Oct. 20, 2021

(86) PCT No.: PCT/US2021/055722
§ 371 (c)(1),
(2) Date: Apr. 18, 2023

(87) PCT Pub. No.: WO2022/087048
PCT Pub. Date: Apr. 28, 2022

(65) Prior Publication Data
US 2023/0391008 A1      Dec. 7, 2023

Related U.S. Application Data

(60) Provisional application No. 63/094,663, filed on Oct. 21, 2020.

(51) Int. Cl.
B29C 64/329        (2017.01)
B29C 64/343        (2017.01)
(Continued)

(52) U.S. Cl.
CPC .......... *B29C 64/329* (2017.08); *B29C 64/343* (2017.08); *B33Y 30/00* (2014.12); *B33Y 40/00* (2014.12)

(58) Field of Classification Search
CPC ............................ B29C 64/329; B29C 64/343
See application file for complete search history.

(56) References Cited

U.S. PATENT DOCUMENTS 4,034,219 A     7/1977   Louden et al.
4,404,566 A     9/1983   Clark et al.
(Continued)

FOREIGN PATENT DOCUMENTS

CN        201815393 U      5/2011
CN        103949636 A      7/2014
(Continued)

OTHER PUBLICATIONS

US 9,744,592 B1, 08/2017, Schmitt et al. (withdrawn)
(Continued)

*Primary Examiner* — Timothy Kennedy
(74) *Attorney, Agent, or Firm* — Dinsmore & Shohl LLP

(57)        ABSTRACT

A method for providing build material to an additive manufacturing system (100) includes moving the build material (10) from a dosing hopper (240) to an interior space defined by one or more supply sidewalls of a supply receptacle (110) and a piston (130) positioned within the supply receptacle (110), and moving the piston toward a working surface (102) of the additive manufacturing system, thereby moving build material within the interior space to the working surface.

10 Claims, 50 Drawing Sheets

(51) Int. Cl.
    *B33Y 30/00*        (2015.01)
    *B33Y 40/00*        (2020.01)

(56)                    References Cited

U.S. PATENT DOCUMENTS

| | | | |
|---|---|---|---|
| 4,680,895 | A | 7/1987 | Roestenberg |
| 4,722,824 | A | 2/1988 | Wiech, Jr. |
| 5,012,260 | A | 4/1991 | Yoshimura et al. |
| 5,204,055 | A | 4/1993 | Sachs et al. |
| 5,387,380 | A | 2/1995 | Cima et al. |
| 6,007,318 | A | 12/1999 | Russell et al. |
| 6,092,887 | A | 7/2000 | Tanino et al. |
| 6,159,085 | A | 12/2000 | Hara |
| 6,375,874 | B1 | 4/2002 | Russell et al. |
| 6,454,811 | B1 | 9/2002 | Sherwood et al. |
| 6,607,572 | B2 | 8/2003 | Gammack et al. |
| 6,657,155 | B2 | 12/2003 | Abe et al. |
| 6,764,636 | B1 | 7/2004 | Allanic et al. |
| 6,824,714 | B1 | 11/2004 | Turck et al. |
| 6,835,222 | B2 | 12/2004 | Gammack |
| 6,945,638 | B2 | 9/2005 | Teung et al. |
| 6,989,115 | B2 | 1/2006 | Russell et al. |
| 7,034,246 | B2 | 4/2006 | Muylaert et al. |
| 7,037,382 | B2 | 5/2006 | Davidson et al. |
| 7,204,684 | B2 | 4/2007 | Ederer et al. |
| 7,225,803 | B2 | 6/2007 | Boyadjieff |
| 7,281,785 | B2 | 10/2007 | Palifka et al. |
| 7,291,002 | B2 | 11/2007 | Russell et al. |
| 7,296,990 | B2 | 11/2007 | Devos et al. |
| 7,357,629 | B2 | 4/2008 | Weiskopf et al. |
| 7,387,359 | B2 | 6/2008 | Hernandez et al. |
| 7,389,154 | B2 | 6/2008 | Hunter et al. |
| 7,435,368 | B2 | 10/2008 | Davidson et al. |
| 7,585,450 | B2 | 9/2009 | Wahlstrom et al. |
| 7,686,995 | B2 | 3/2010 | Davidson et al. |
| 7,690,909 | B2 | 4/2010 | Wahlstrom |
| 7,820,241 | B2 | 10/2010 | Perret et al. |
| 7,824,001 | B2 | 11/2010 | Fienup et al. |
| 7,850,271 | B2 | 12/2010 | Gothait et al. |
| 7,879,123 | B2 | 2/2011 | Lundquist et al. |
| 7,971,991 | B2 | 7/2011 | Davidson et al. |
| 7,979,152 | B2 | 7/2011 | Davidson |
| 8,017,055 | B2 | 9/2011 | Davidson et al. |
| 8,033,812 | B2 | 10/2011 | Collins et al. |
| 8,105,527 | B2 | 1/2012 | Wahlstrom |
| 8,167,395 | B2 | 5/2012 | Fienup et al. |
| 8,185,229 | B2 | 5/2012 | Davidson |
| 8,322,821 | B2 | 12/2012 | Tsai et al. |
| 8,951,033 | B2 | 2/2015 | Hchsmann et al. |
| 8,956,144 | B2 | 2/2015 | Grasegger et al. |
| 8,997,799 | B2 | 4/2015 | Hodson et al. |
| 9,027,378 | B2 | 5/2015 | Crump et al. |
| 9,346,127 | B2 | 5/2016 | Buller et al. |
| 9,403,235 | B2 | 8/2016 | Buller et al. |
| 9,446,448 | B2 | 9/2016 | Mccoy et al. |
| 9,586,290 | B2 | 3/2017 | Buller et al. |
| 9,636,870 | B2 | 5/2017 | Kuzusako et al. |
| 9,912,915 | B2 | 3/2018 | Sinclair |
| 9,919,474 | B2 | 3/2018 | Napadensky |
| 9,989,396 | B2 | 6/2018 | Gold et al. |
| 10,022,794 | B1 | 7/2018 | Redding et al. |
| 10,093,103 | B2 | 10/2018 | Araki et al. |
| 10,166,603 | B2 | 1/2019 | Kawada et al. |
| 10,183,330 | B2 | 1/2019 | Buller et al. |
| 10,189,267 | B2 | 1/2019 | Sakai et al. |
| 10,195,693 | B2 | 2/2019 | Buller et al. |
| 10,232,443 | B2 | 3/2019 | Myerberg et al. |
| 10,259,044 | B2 | 4/2019 | Buller et al. |
| 10,272,492 | B2 | 4/2019 | Gibson et al. |
| 10,272,525 | B1 | 4/2019 | Buller et al. |
| 10,286,452 | B2 | 5/2019 | Buller et al. |
| 10,286,571 | B2 | 5/2019 | Hchsmann et al. |
| 10,336,053 | B2 | 7/2019 | Sasaki |
| 10,343,725 | B2 | 7/2019 | Martin et al. |
| 10,350,682 | B2 | 7/2019 | Myerberg et al. |
| 10,406,262 | B2 | 9/2019 | Bonassar et al. |
| 10,414,089 | B2 | 9/2019 | Maier |
| 10,449,696 | B2 | 10/2019 | Elgar et al. |
| 10,486,361 | B2 | 11/2019 | Kawabata |
| 10,486,363 | B2 | 11/2019 | Sachs et al. |
| 10,569,331 | B2 | 2/2020 | Kawada et al. |
| 10,632,675 | B2 | 4/2020 | Chanclon et al. |
| 10,695,981 | B2 | 6/2020 | Hchsmann et al. |
| 11,167,454 | B2 | 11/2021 | Rockstroh et al. |
| 2002/0043055 | A1 | 4/2002 | Conrad |
| 2002/0079601 | A1 | 6/2002 | Russell et al. |
| 2002/0090410 | A1* | 7/2002 | Tochimoto ............ B29C 64/357 |
| | | | 425/215 |
| 2002/0116907 | A1 | 8/2002 | Gammack et al. |
| 2004/0194250 | A1 | 10/2004 | Conrad et al. |
| 2006/0219163 | A1 | 10/2006 | Merot et al. |
| 2006/0221127 | A1 | 10/2006 | Lee et al. |
| 2007/0077323 | A1 | 4/2007 | Stonesmith et al. |
| 2008/0111271 | A1 | 5/2008 | Khoshnevis |
| 2008/0117240 | A1 | 5/2008 | Sheinman |
| 2008/0200104 | A1 | 8/2008 | Chuang |
| 2008/0284819 | A1 | 11/2008 | Owaki et al. |
| 2008/0303882 | A1 | 12/2008 | Silverbrook et al. |
| 2008/0303883 | A1 | 12/2008 | Miyazawa |
| 2010/0043698 | A1 | 2/2010 | Bolt |
| 2012/0018032 | A1 | 1/2012 | Von Essen |
| 2013/0004607 | A1 | 1/2013 | Hoechsmann et al. |
| 2014/0240396 | A1 | 8/2014 | Rosati et al. |
| 2015/0110911 | A1 | 4/2015 | Snyder |
| 2015/0298394 | A1 | 10/2015 | Sheinman |
| 2015/0343533 | A1 | 12/2015 | Park et al. |
| 2016/0052054 | A1 | 2/2016 | Orange et al. |
| 2016/0096360 | A1 | 4/2016 | Zetzl et al. |
| 2016/0114533 | A1 | 4/2016 | Grasegger et al. |
| 2016/0151973 | A1 | 6/2016 | Juan Jover et al. |
| 2016/0339640 | A1 | 11/2016 | Juan et al. |
| 2016/0361874 | A1 | 12/2016 | Park et al. |
| 2016/0368054 | A1 | 12/2016 | Ng et al. |
| 2017/0050378 | A1 | 2/2017 | Ederer et al. |
| 2017/0106443 | A1 | 4/2017 | Karlsson |
| 2017/0106595 | A1 | 4/2017 | Gnther et al. |
| 2017/0120521 | A1 | 5/2017 | Sakura et al. |
| 2017/0144374 | A1 | 5/2017 | Ono |
| 2017/0182717 | A1 | 6/2017 | Byun et al. |
| 2017/0203514 | A1 | 7/2017 | McCoy et al. |
| 2017/0217104 | A1 | 8/2017 | Cortes I Herms et al. |
| 2017/0239725 | A1 | 8/2017 | Ufton |
| 2017/0246808 | A1 | 8/2017 | Hchsmann et al. |
| 2017/0252975 | A1 | 9/2017 | Park |
| 2017/0266880 | A1 | 9/2017 | Matsubara |
| 2017/0334138 | A1 | 11/2017 | Vilajosana et al. |
| 2017/0334144 | A1 | 11/2017 | Fish et al. |
| 2018/0001567 | A1 | 1/2018 | Juan et al. |
| 2018/0009110 | A1 | 1/2018 | Langford et al. |
| 2018/0056582 | A1 | 3/2018 | Matusik et al. |
| 2018/0111194 | A1 | 4/2018 | Buller et al. |
| 2018/0111196 | A1 | 4/2018 | Brezoczky et al. |
| 2018/0236504 | A1 | 8/2018 | Pourcher et al. |
| 2018/0297283 | A1 | 10/2018 | Hagedorn et al. |
| 2018/0304364 | A1 | 10/2018 | Myerberg et al. |
| 2018/0339467 | A1 | 11/2018 | Donovan et al. |
| 2018/0345541 | A1 | 12/2018 | Cuyt et al. |
| 2019/0001413 | A1 | 1/2019 | Golz et al. |
| 2019/0070779 | A1 | 3/2019 | Chen et al. |
| 2019/0084231 | A1 | 3/2019 | Chanclon Fernandez et al. |
| 2019/0134705 | A1 | 5/2019 | Sheinman et al. |
| 2019/0152148 | A1 | 5/2019 | Kremer |
| 2019/0160733 | A1 | 5/2019 | Mirkin et al. |
| 2019/0201982 | A1 | 7/2019 | Lombardo et al. |
| 2019/0210277 | A1 | 7/2019 | Sachs et al. |
| 2019/0210282 | A1 | 7/2019 | Sugiura et al. |
| 2019/0217385 | A1 | 7/2019 | Bonilla Gonzalez et al. |
| 2019/0218501 | A1 | 7/2019 | Kamen et al. |
| 2019/0240732 | A1 | 8/2019 | Koch et al. |
| 2019/0358901 | A1 | 11/2019 | Dugan |
| 2019/0366626 | A1 | 12/2019 | Swartz et al. |
| 2020/0147885 | A1 | 5/2020 | Gimenez Manent et al. |

(56) References Cited

U.S. PATENT DOCUMENTS

| | | | |
|---|---|---|---|
| 2020/0282461 A1 | 9/2020 | Fang | |
| 2020/0298474 A1 | 9/2020 | Gimenez et al. | |
| 2020/0324467 A1 | 10/2020 | Tjellesen et al. | |

FOREIGN PATENT DOCUMENTS

| | | | |
|---|---|---|---|
| CN | 103862045 B | 1/2017 | |
| CN | 106738907 A | 5/2017 | |
| CN | 206528076 U | 9/2017 | |
| CN | 109366982 A | 2/2019 | |
| CN | 208745355 U | 4/2019 | |
| CN | 109732916 A | 5/2019 | |
| CN | 110076991 A | 8/2019 | |
| CN | 209851598 U | 12/2019 | |
| CN | 210211384 U | 3/2020 | |
| CN | 210880916 U | 6/2020 | |
| DE | 19743804 A1 | 4/1999 | |
| DE | 19846478 A1 | 4/2000 | |
| DE | 102009036153 A1 | 2/2011 | |
| DE | 202013009787 U1 | 12/2013 | |
| EP | 1316408 A1 * | 6/2003 | ..... B29C 64/153 |
| EP | 1704989 A2 | 9/2006 | |
| EP | 1847370 A2 | 10/2007 | |
| EP | 1776910 B1 | 4/2013 | |
| EP | 2782743 A1 | 10/2014 | |
| EP | 2091718 B1 | 8/2016 | |
| EP | 2986405 B1 | 2/2017 | |
| EP | 3456518 A1 | 3/2019 | |
| EP | 3461574 A1 | 4/2019 | |
| EP | 3475057 A1 | 5/2019 | |
| EP | 3492244 A1 | 6/2019 | |
| EP | 3511094 A1 | 7/2019 | |
| EP | 3560714 A1 | 10/2019 | |
| EP | 3566869 A2 | 11/2019 | |
| EP | 3463817 B1 | 4/2021 | |
| EP | 3575064 B1 | 8/2021 | |
| GB | 2550339 A | 11/2017 | |
| JP | 2002292751 A | 10/2002 | |
| JP | 2006511365 A | 4/2006 | |
| JP | 2009136758 A | 6/2009 | |
| JP | 2010149318 A | 7/2010 | |
| JP | 2013193222 A | 9/2013 | |
| JP | 2015522438 A | 8/2015 | |
| JP | 2018001414 A | 1/2018 | |
| JP | 2018047562 A | 3/2018 | |
| JP | 2018144037 A | 9/2018 | |
| JP | 2020093259 A | 6/2020 | |
| WO | 2010055751 A1 | 5/2010 | |
| WO | 2011005690 A1 | 1/2011 | |
| WO | 2013182913 A2 | 12/2013 | |
| WO | 2014006877 A1 | 1/2014 | |
| WO | 2014044676 A1 | 3/2014 | |
| WO | 2014096177 A1 | 6/2014 | |
| WO | 2015112885 A1 | 7/2015 | |
| WO | 2015141779 A1 | 9/2015 | |
| WO | 2016040453 A1 | 3/2016 | |
| WO | 2016055523 A1 | 4/2016 | |
| WO | 2016083234 A1 | 6/2016 | |
| WO | 2017017272 A1 | 2/2017 | |
| WO | 2017088897 A1 | 6/2017 | |
| WO | 2017152142 A1 | 9/2017 | |
| WO | 2017180314 A1 | 10/2017 | |
| WO | 2018017117 A1 | 1/2018 | |
| WO | 2018149544 A1 | 8/2018 | |
| WO | 2018181334 A1 | 10/2018 | |
| WO | 2018183396 A1 | 10/2018 | |
| WO | 2018191667 A1 | 10/2018 | |
| WO | 2018194446 A1 | 10/2018 | |
| WO | 2018194685 A1 | 10/2018 | |
| WO | 2018197888 A1 | 11/2018 | |
| WO | 2019063741 A1 | 4/2019 | |
| WO | 2019076705 A1 | 4/2019 | |
| WO | 2019089497 A1 | 5/2019 | |
| WO | 2019094269 A1 | 5/2019 | |
| WO | 2019094283 A1 | 5/2019 | |
| WO | 2019094367 A1 | 5/2019 | |
| WO | 2019113412 A1 | 6/2019 | |
| WO | 2019136222 A1 | 7/2019 | |
| WO | 2019139742 A1 | 7/2019 | |
| WO | 2019140000 A1 | 7/2019 | |
| WO | 2019157074 A2 | 8/2019 | |
| WO | 2019182618 A1 | 9/2019 | |
| WO | 2019194826 A1 | 10/2019 | |
| WO | 2019209881 A1 | 10/2019 | |
| WO | 2019236074 A1 | 12/2019 | |
| WO | 2020007891 A1 | 1/2020 | |
| WO | 2020013828 A1 | 1/2020 | |
| WO | 2020068101 A1 | 4/2020 | |
| WO | 2020115468 A1 | 6/2020 | |
| WO | 2020146416 A2 | 7/2020 | |
| WO | 2020159507 A1 | 8/2020 | |
| WO | 2020237118 A1 | 11/2020 | |
| WO | 2020237119 A1 | 11/2020 | |
| WO | 2020237120 A1 | 11/2020 | |
| WO | 2020237122 A1 | 11/2020 | |
| WO | 2020237123 A1 | 11/2020 | |
| WO | 2020237138 A1 | 11/2020 | |
| WO | 2020237142 A1 | 11/2020 | |
| WO | 2020237143 A1 | 11/2020 | |
| WO | 2020237144 A1 | 11/2020 | |
| WO | 2020237161 A1 | 11/2020 | |
| WO | 2020237163 A1 | 11/2020 | |
| WO | 2020237165 A1 | 11/2020 | |
| WO | 2020237166 A1 | 11/2020 | |
| WO | 2022086867 A1 | 4/2022 | |
| WO | 2022086868 A1 | 4/2022 | |

OTHER PUBLICATIONS

Machine translation of CN 110076991, retrieved from USPTO database Sep. 10, 2025 (Year: 2025).*

European Patent Office Action for Application No. 21807391.4 dated Jun. 5, 2024 (5 pages).

International Search Report for Appln. No. PCT/US2021/055457 mailed Jan. 27, 2022, 20 pages.

International Search Report for Appln. No. PCT/US2021/055458 mailed Jan. 27, 2022, 15 pages.

International Search Report for Appln. No. PCT/US2021/055716 mailed Mar. 22, 2022, 21 pages.

International Search Report for Appln. No. PCT/US2021/055717 mailed Dec. 20, 2021, 16 pages.

International Search Report for Appln. No. PCT/US2021/055719 mailed Jan. 18, 2022, 17 pages.

International Search Report for Appln. No. PCT/US2021/055722 mailed Jan. 3, 2022, 14 pages.

International Search Report for Appln. No. PCT/US2021/056828 mailed Feb. 23, 2022, 11 pages.

International Search Report for Appln. No. PCT/US2021/056451 mailed Apr. 4, 2022, 33 pages.

International Search Report for Appln. No. PCT/US2021/056827 mailed Feb. 11, 2022, 15 pages.

International Search Report for Appln. No. PCT/US2021/056789 mailed Jan. 18, 2022, 18 pages.

International Search Report for Appln. No. PCT/US2021/056787 mailed Aug. 2, 2022, 12 pages.

International Search Report for Appln. No. PCT/US2021/057517 mailed Sep. 6, 2022, 21 pages.

International Preliminary Report for Appln. No. PCT/US2021/055457 mailed May 4, 2023, 14 pages.

International Preliminary Report for Appln. No. PCT/US2021/055458 mailed May 4, 2023, 10 pages.

International Preliminary Report for Appln. No. PCT/US2021/055716 mailed May 4, 2023, 16 pages.

International Preliminary Report for Appln. No. PCT/US2021/055717 mailed May 4, 2023, 11 pages.

International Preliminary Report for Appln. No. PCT/US2021/055719 mailed May 4, 2023, 12 pages.

International Preliminary Report for Appln. No. PCT/US2021/055722 mailed May 4, 2023, 10 pages.

(56) References Cited

OTHER PUBLICATIONS

International Preliminary Report for Appln. No. PCT/US2021/056828 mailed May 11, 2023, 8 pages.

International Preliminary Report for Appln. No. PCT/US2021/056451 mailed May 11, 2023, 23 pages.

International Preliminary Report for Appln. No. PCT/US2021/056827 mailed May 11, 2023, 9 pages.

International Preliminary Report for Appln. No. PCT/US2021/056789 mailed May 11, 2023, 11 pages.

International Preliminary Report for Appln. No. PCT/US2021/056787 mailed May 11, 2023, 8 pages.

International Preliminary Report for Appln. No. PCT/US2021/057517 mailed May 11, 2023, 15 pages.

Shanjani "Material Spreading and Compaction in Powder-Based Solid Freeform Fabrication Methods: Mathematical Modeling" Department of Mechanical and Mechatronic Engineering, University of Waterloo, Sep. 10, 2008.

Japanese Office Action for Application No. 2023-521818 dated Feb. 16, 2020 (5 pages with English Translation).

Japanese Office Action for Application No. 2023-521819 dated Feb. 20, 2024 (5 pages with English Translation).

European Patent Office Action for Application No. 21807388.0 dated Mar. 22, 2023 (8 pages).

* cited by examiner

MATERIAL SUPPLY SYSTEMS FOR ADDITIVE MANUFACTURING AND METHODS FOR USING THE SAME

CROSS-REFERENCE TO RELATED APPLICATION

This application is a National Stage Entry under 35 U.S.C. § 371 of International Patent Application No. PCT/US2021/055722, filed Oct. 20, 2021 and entitled MATERIAL SUPPLY SYSTEMS FOR ADDITIVE MANUFACTURING AND METHODS FOR USING THE SAME, which claims the benefit of U.S. Provisional Patent Application No. 63/094,663, filed Oct. 21, 2020 and entitled "Material Supply Systems and Methods for Using the Same," which is hereby incorporated by reference in its entirety including the drawings.

FIELD

The present specification generally relates to material supply systems and methods for using the same.

BACKGROUND

Additive manufacturing systems may be utilized to construct an object from build material, such as organic or inorganic powders, in a layer-wise manner. Conventional additive manufacturing systems include various "recoat" apparatuses that are configured to sequentially distribute layers of build material, such that the build material can be consolidated to construct an object.

SUMMARY

In some configurations, recoat apparatuses may move build material from a supply receptacle to a build area, where build material can be consolidated by a laser, electron beam, application of a binder or solvent material, and/or the like. As build material is moved from the supply receptacle to the build area, the build material within the supply receptacle may need to be replenished. In some conventional configurations, the supply receptacle may be positioned within a build enclosure, and a user such as a technician must open the build enclosure to refill the supply receptacle, thereby interrupting production.

Embodiments of the present disclosure are generally directed to systems and methods that continuously or semi-continuously provide material to a supply receptacle of a manufacturing system.

In one embodiment, a method for providing build material to an additive manufacturing system, the method including moving the build material from a dosing hopper to an interior space defined by one or more supply sidewalls of a supply receptacle and a piston positioned within the supply receptacle, and moving the piston toward a working surface of the additive manufacturing system, thereby moving build material within the interior space to the working surface.

In another embodiment, a system includes a build area positioned along a working surface, a supply receptacle defining one or more supply receptacle sidewalls and an upwardly-facing receptacle opening, a piston engaged with the one or more supply receptacle sidewalls, where the piston, the upwardly-facing receptacle opening, and the one or more supply receptacle sidewalls at least partially define an interior space, and the piston is positionable between an extended position, in which the interior space has an extended volume, and a retracted position, in which the interior space has a retracted volume that is greater than the extended volume, a dosing hopper positioned above and in selective communication with the supply receptacle, where the dosing hopper is structurally configured to deliver build material to the interior space and where the dosing hopper defines a dosing volume, and a conveyance hopper in communication with the dosing hopper, the conveyance hopper defining a supply volume, where the supply volume is greater than the dosing volume.

Additional features and advantages of the material supply systems described herein, and the components thereof, will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
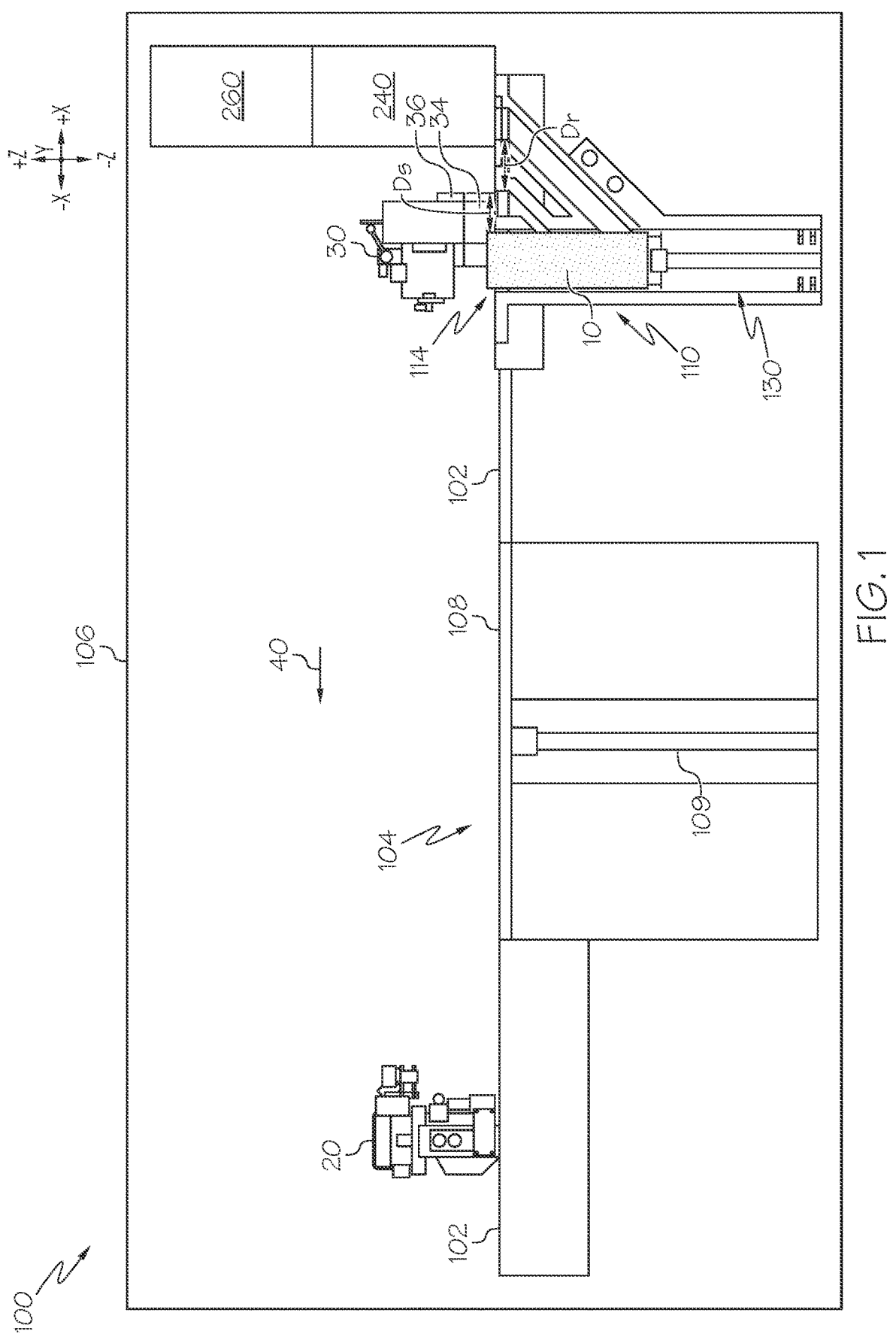
FIG. 1 schematically depicts a side section view of an illustrative manufacturing system, according to one or more embodiments shown and described herein.

Reference will now be made in detail to embodiments of material supply systems, and components thereof, examples of which are illustrated in the accompanying drawings. Whenever possible, the same reference numerals will be used throughout the drawings to refer to the same or like parts. Embodiments of the present disclosure are generally directed to systems and methods that continuously or semi-continuously provide material to a supply receptacle of a manufacturing system. These and other embodiments of material supply systems for manufacturing systems, manufacturing systems comprising the material supply systems, and methods for using the same are described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation unless otherwise expressly stated.

The phrase "communicatively coupled" is used herein to describe the interconnectivity of various components and means that the components are connected either through wires, optical fibers, or wirelessly such that electrical, optical, and/or electromagnetic signals may be exchanged between the components.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Embodiments described herein are generally directed to material supply systems for manufacturing systems. The material supply systems discussed herein may operate as build material supply systems for additive manufacturing systems. However, it should be appreciated that the material supply systems discussed herein may also be used to supply material in any desirable system. Additive manufacturing systems may generally construct materials through successive deposition and binding of build material. In conventional additive manufacturing systems, providing material to the additive manufacturing system is a difficult, dirty, time-consuming, and error-prone process. Embodiments described herein are directed to material supply systems that can continuously or semi-continuously provide material to an additive manufacturing system such that the additive manufacturing system can continuously or semi-continuously run with minimal interruption.

Figure 2:
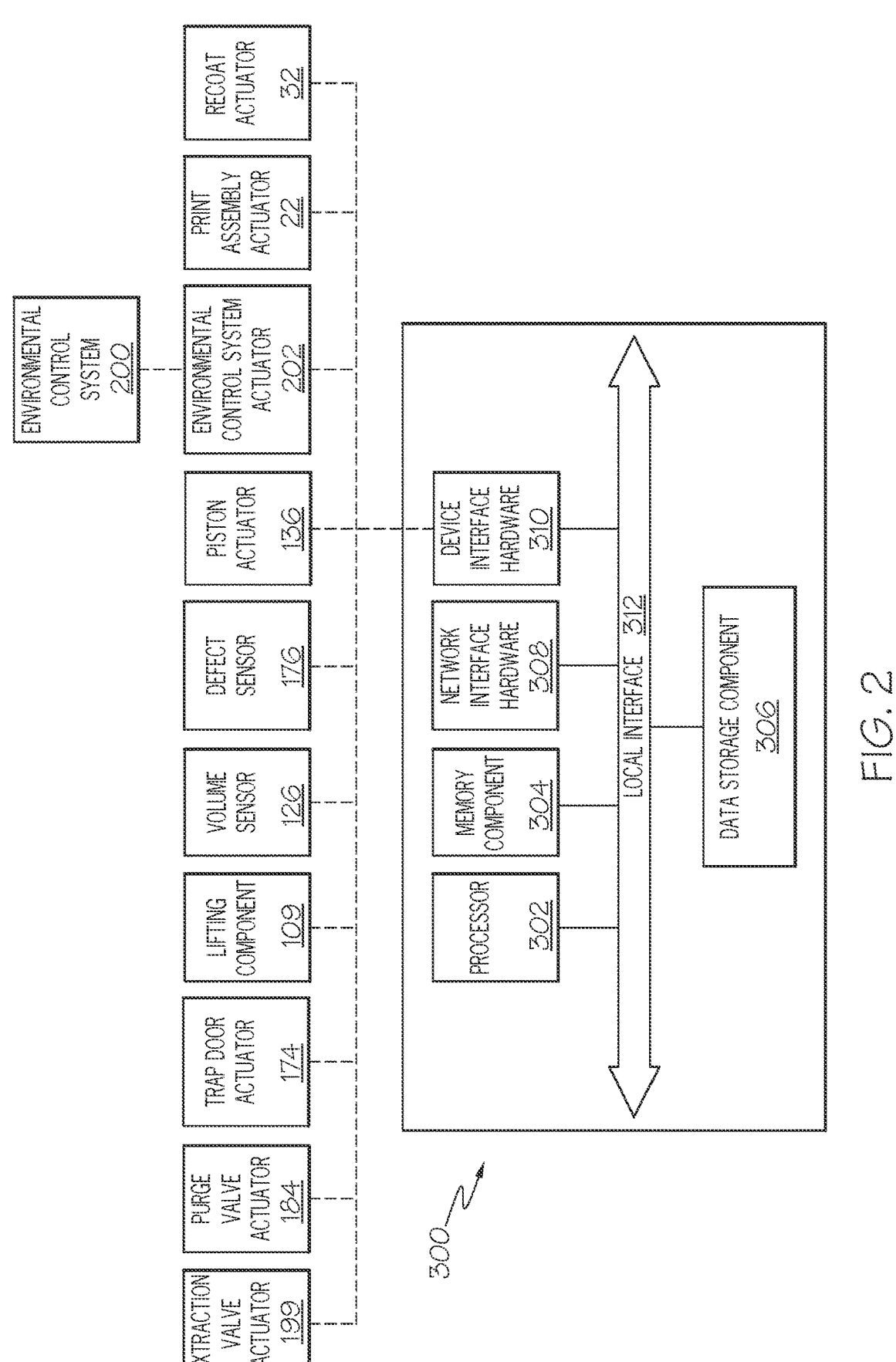
FIG. 2 schematically depicts an illustrative control diagram of the manufacturing system of FIG. 1, according to one or more embodiments shown and described herein.

Referring now to FIGS. 1 and 2, a side view and a control diagram of a manufacturing system 100 are schematically depicted. In embodiments, the manufacturing system 100 may be configured for the layerwise formation of a three-dimensional object of interest out of a build material 10. In embodiments, the three-dimensional object may be formed through successive deposition and binding of the build material 10, as described in greater detail herein. In embodiments, the build material 10 may include any material suitable for an additive manufacturing process, and may include, for example and without limitation, a powdered material or the like.

The manufacturing system 100 includes a build enclosure 106 that defines an interior space that is separated from an exterior environment. Furthermore, the manufacturing system 100 may include an environmental control system 200 that may maintain a sealed environment within the interior of the build enclosure 106 and/or supply one or more gasses to and throughout various components of the manufacturing system 100. The environmental control system 200 may include an environmental control system actuator 202, for example and without limitation, a turbo molecular pump, a scroll pump, an ion pump, a pressurized gas source, and one or more valves that cooperate to provide or remove the one or more gasses to the build enclosure 106. In some embodiments, the environmental control system actuator 202 may be communicatively coupled to a controller 300, such that the controller 300 can direct operation of the environmental control system 200.

The manufacturing system 100, in embodiments, includes a build area 104 and a working surface 102. The build area 104 is generally a platform or receptacle that is arranged to receive build material 10 in the form of one or more build material layers. In embodiments, binder or the like can be applied to the build material 10 in the build area 104, and the binder may cure build material 10 to form a three-dimensional object. While reference is made herein to build material 10 that is bound together by binder, in some embodiments, build material 10 within the build area 104 may be fused together upon the application of energy (e.g., via a laser, electron beam, or the like) to form a three-dimensional object.

In the embodiment depicted in FIG. 1, the build area 104 generally includes a build platform 108 supported by a lifting component 109. The build platform 108 may generally be a surface that is movable by the lifting component 109 in the vertical direction (e.g., in the direction of the z-axis of the coordinate axes of FIG. 1). For example, the lifting component 109 may move the build platform 108 in a downward direction (e.g., in the −z direction of the coordinate axes of FIG. 1) as successive layers of build material are distributed on the build platform 108. In embodiments, the lifting component 109 may include any suitable device or system capable of moving the build platform 108 in the vertical direction (e.g., in the direction of the z-axis of the coordinate axes of FIG. 1) and may include, for example and without limitation, a hydraulic actuator, an electric actuator, a mechanical actuator or the like. In some embodiments, the lifting component 109 may be positioned within the build enclosure 106. In some embodiments, the lifting component 109 may be only partially located within the build enclosure 106. In some embodiments, the lifting component 109 may be located outside of the build enclosure 106. For example, in some configurations, it may be desirable to isolate portions of the lifting component 109 from the interior of the build enclosure 106 to reduce the exposure of the portions of the lifting component 109 from conditions within the build enclosure 106 (e.g., airborne build material 10, etc.). In some embodiments, the lifting component 109 may be communicatively coupled to the controller 300 such that the controller 300 directs operation of the lifting component 109.

In embodiments, the manufacturing system 100 further includes a recoat assembly that is generally configured to distribute a layer of the build material 10 in the build area 104. A recoat actuator 32 may be coupled to the recoat assembly 30 to effect movement of the recoat assembly 30, and in embodiments, the recoat actuator 32 may be communicatively coupled to the controller 300. The recoat assembly 30 generally includes a material spreading member 34 that moves build material 10. In embodiments, the material spreading member 34 may include, for example and without limitation, one or more doctor blades, one or more rollers or the like, which are configured to move build material 10 within the build enclosure 106. In some embodiments, the recoat actuator 32 may move the material spreading member 34. For example, in embodiments in which the material spreading member 34 is one or more rollers, the recoat actuator 32 may be operable to rotate the one or more rollers. In some embodiments in which the material spreading member 34 includes one or more rollers, the recoat assembly may include one or more separate roller actuators that are operable to rotate the one or more rollers. In embodiments, the recoat actuator 32 may be communicatively coupled to the controller 300. In embodiments, the controller 300 may transmit one or more signals, data, and/or the like to cause the recoat actuator 32 to move, change the direction, change the speed, and/or the like of the recoat assembly 30.

In embodiments, the manufacturing system 100 may include a conveyance hopper 260 in selective communication with a dosing hopper 240. The conveyance hopper 260 and the dosing hopper 240 may generally be containers or the like that hold build material 10 therein and can dispense build material 10 therefrom. While the conveyance hopper 260 and dosing hopper 240 are depicted as being within the build enclosure 106 in FIG. 1, the present disclosure is not limited as such. That is, the conveyance hopper 260 and dosing hopper 240 may be located outside or partially outside the build enclosure 106 in various embodiments. In some embodiments, the dosing hopper 240 may be positioned within the build enclosure 106, while the conveyance hopper 260 is positioned outside of the build enclosure. In embodiments, the dosing hopper 240 is in selective communication with a supply receptacle 110, as described in greater detail herein. In some embodiments, the dosing hopper 240 defines a dosing volume at least partially defined between a gate valve 258 (FIG. 11), a valve 290 (FIG. 11) and a housing 241 (FIG. 11), and the conveyance hopper 260 defines a supply volume at least partially defined between the valve 290 (FIG. 8), a build material portion 262 (FIG. 8), and a conveyance hopper bulkhead 267 (FIG. 8), where the dosing volume is greater than the supply volume. In some embodiments, the dosing volume is less than the supply volume. In some embodiments, the dosing volume is at least about 3500 cubic centimeters. In some embodiments, the supply volume is at least about 135,000 cubic centimeters. In some embodiments, the supply volume is at least as great as a volume defined by the build area 104. In some embodiments, the supply volume and/or a combination of the supply volume and the dosing volume is greater than the volume defined by the build area 104. For example, in some embodiments, the supply volume is at least 10% greater than the volume defined by the build area 104. In this way, in some embodiments, the conveyance hopper 260 may hold enough build material 10 to support the building of a full product within the build area 104 without being replenished.

In some embodiments, the manufacturing system 100 may include a print assembly 20. The print assembly 20, in embodiments, may distribute a binder or binding agent to build material 10 positioned in the build area 104. In embodiments, the print assembly 20 is coupled to a print assembly actuator 22 that is operable to move the print assembly 20, for example in the +/− x direction of the coordinate axis of FIG. 1. In some embodiments, the print assembly actuator 22 may be communicatively coupled to the controller 300, and the controller 300 may direct the print assembly actuator 22 to operate the print assembly 20.

While reference is made herein to a print assembly 20 that distributes a binder or binding agent, it should be understood that this is merely an example. In some embodiments, the manufacturing system 100 may include an energy source or the like that fuses (e.g., sinters or melts) build material 10 at the build area 104 to form a three-dimensional product within the build area 104.

In some embodiments, the manufacturing system 100 includes one or more sensors, such as a volume sensor 126 and/or a defect sensor 176. In some embodiments, the volume sensor 126 and/or the defect sensor 176 may be located within or adjacent to the build enclosure 106 and positioned to obtain information regarding the build material 10 within the build enclosure 106. In embodiments, the volume sensor 126 may generally be configured to detect an amount of build material 10 in the supply receptacle 110. The volume sensor 126 may, in some embodiments, be configured to provide signals and/or data corresponding to the amount of build material 10 in the supply receptacle 110 to the controller 300. The defect sensor 176, in embodiments, may be configured to detect a defect or contaminant within build material 10 within the build enclosure 106. In embodiments, the defect sensor 176 may be configured to provide signals and/or data corresponding to a defect in build material 10 to the controller 300. As such, the volume sensor 126 and the defect sensor 176 may be communicatively coupled to the controller 300. In embodiments, the volume sensor 126 may include any suitable sensor for detecting the volume of build material 10 within the supply receptacle, and may include for example and without limitation a light ranging and detection (LIDAR) sensor, an acoustic sensor, or the like. In embodiments, the defect sensor 176 may include any suitable sensor for detecting a defect in the build material, and may include for example and without limitation a LIDAR sensor, an acoustic sensor, a two-dimensional camera, a one-dimensional camera, a thermal imaging device, or the like. In some embodiments, the volume sensor 126 and/or the defect sensor 176 may include an imaging device, such as a camera or the like. As such, the volume sensor 126 and the defect sensor 176 may obtain one or more images of the interior of the build enclosure 106, and may send signals indicative of captured images within the build enclosure 106 to the controller 300. Various other sensors in addition to or in lieu of the volume sensor 126 and/or the defect sensor 176 are contemplated and are included within the scope of the present disclosure.

In embodiments, the controller 300 is generally a device that is communicatively coupled to one or more components of the manufacturing system 100 and is arranged and configured to transmit and/or receive signals and/or data to/from the one or more components of the manufacturing system 100.

As shown in FIG. 2, the controller 300 may include one or more processors 302, a non-transitory memory component 304, network interface hardware 308, device interface hardware 310, and a data storage component 306. A local interface 312, such as a bus or the like, may interconnect the various components.

The one or more processors 302, such as a computer processing unit (CPU), may be the central processing unit of the controller 300, performing calculations and logic operations to execute a program. The one or more processors 302, alone or in conjunction with the other components, are illustrative processing devices, computing devices, processors, or combinations thereof. The one or more processors 302 may include any processing component configured to receive and execute instructions (such as from the data storage component 306 and/or the memory component 304).

The memory component 304 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 304 may include one or more programming instructions thereon that, when executed by the one or more processors 302, cause the one or more processors 302 to complete various processes, as described in further detail herein. The programming instructions stored on the memory component 304 may be embodied as a plurality of software logic modules, where each logic module provides programming instructions for completing one or more tasks.

The network interface hardware 308 may include any wired or wireless networking hardware, such as a modem, LAN port, wireless fidelity (Wi-Fi) card, WiMax card, mobile communications hardware, and/or other hardware for communicating with other networks and/or devices. For example, the network interface hardware 308 may be used to facilitate communication between external storage devices, user computing devices, server computing devices, external control devices, and/or the like via a network, such as, for example, a local network, the Internet, and/or the like.

The device interface hardware 310 may communicate information between the local interface 312 and one or more components of the manufacturing system 100. For example, the device interface hardware 310 may act as an interface between the local interface 312 and the recoat actuator 32, a piston actuator 136, the lifting component 109, the volume sensor 126, the defect sensor 176, and the like.

The data storage component 306, which may generally be a storage medium, may contain one or more data repositories for storing data that is received and/or generated. The data storage component 306 may be any physical storage medium, including, but not limited to, a hard disk drive (HDD), memory, removable storage, and/or the like. While the data storage component 306 is depicted as a local device, it should be understood that the data storage component 306 may be a remote storage device, such as, for example, a server computing device, cloud based storage device, or the like. Illustrative data that may be contained within the data storage component 306 includes, but is not limited to, sensing device data, build data, computed data, machine learning data, and other data.

It should be understood that the components illustrated in FIG. 2 are merely illustrative and are not intended to limit the scope of this disclosure. While the components in FIG. 2 are illustrated as residing within the controller 300, this is a nonlimiting example, and one or more components may be external to the controller 300. In some embodiments, one or more of the components may reside external to the controller 300.

Figure 3:
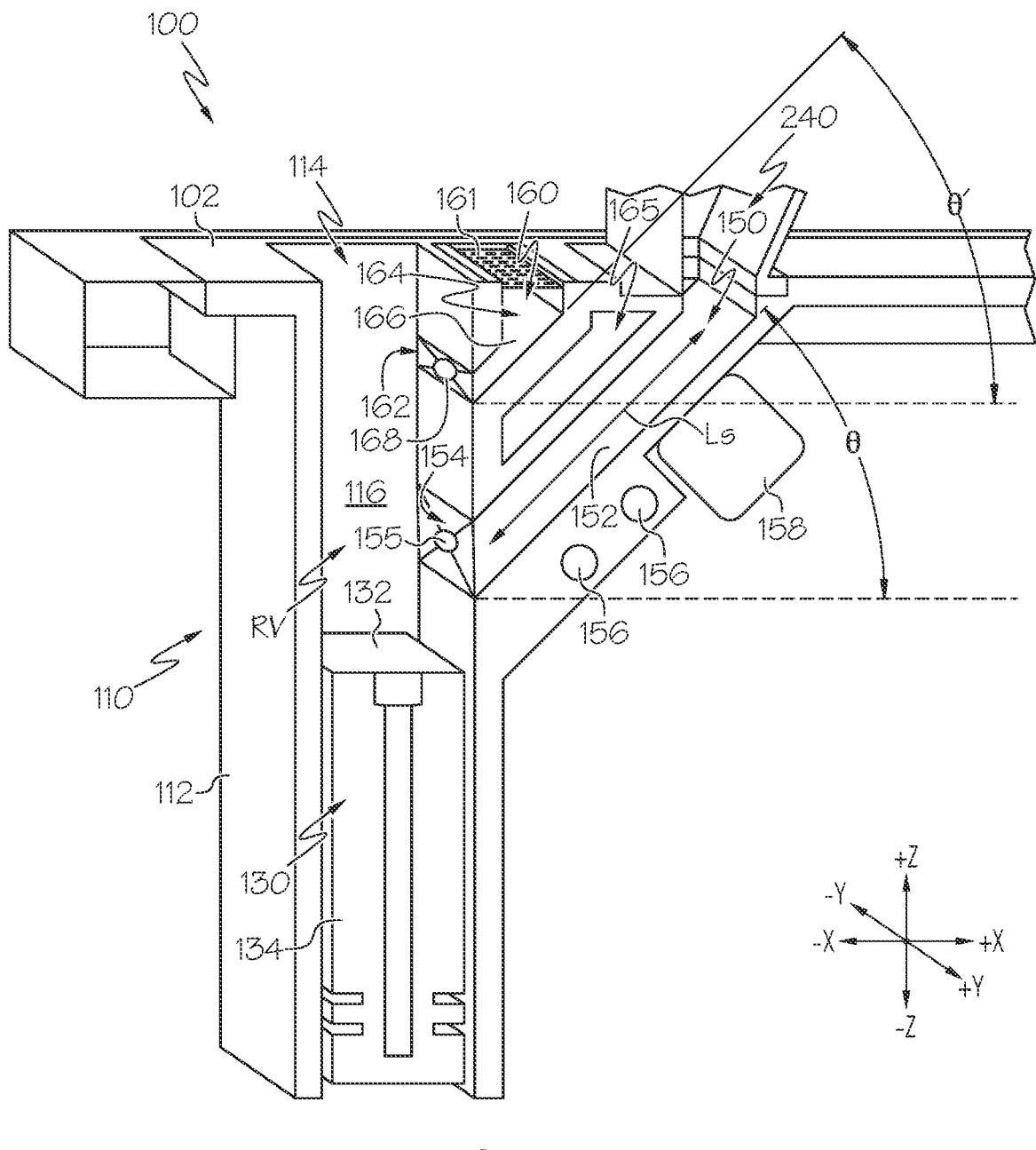
FIG. 3 schematically depicts a perspective section view of an illustrative supply receptacle of the manufacturing system of FIG. 1, according to one or more embodiments shown and described herein.

Referring now to FIG. 3, a perspective section view of the supply receptacle 110 is schematically depicted. The supply receptacle 110 defines one or more supply receptacle sidewalls 112 that define an upwardly-facing receptacle opening 114. Along with a piston 130 that is positioned at least partially within the supply receptacle 110, the upwardly-facing receptacle opening 114, and the one or more supply receptacle sidewalls 112 at least partially define an interior space 116 of the supply receptacle 110. The one or more supply receptacle sidewalls 112 define the horizontal, cross-sectional shape of the supply receptacle 110. In embodiments, the one or more supply receptacle sidewalls 112 may define pairs of opposing walls. In the embodiment depicted in FIG. 3, the one or more supply receptacle sidewalls 112 generally define a rectangular or square horizontal cross section of the supply receptacle 110. However, it should be appreciated that the horizontal cross section of the supply receptacle 110 may take any desirable shape by way of the particular number, size, and curvature of the one or more supply receptacle sidewalls 112. The upwardly-facing receptacle opening 114 of the supply receptacle 110, in embodiments, is positioned along the working surface 102 such that the one or more supply receptacle sidewalls 112 vertically extend beneath (e.g., in the −z direction of the coordinate axes of FIG. 3) the working surface 102.

Figure 14:
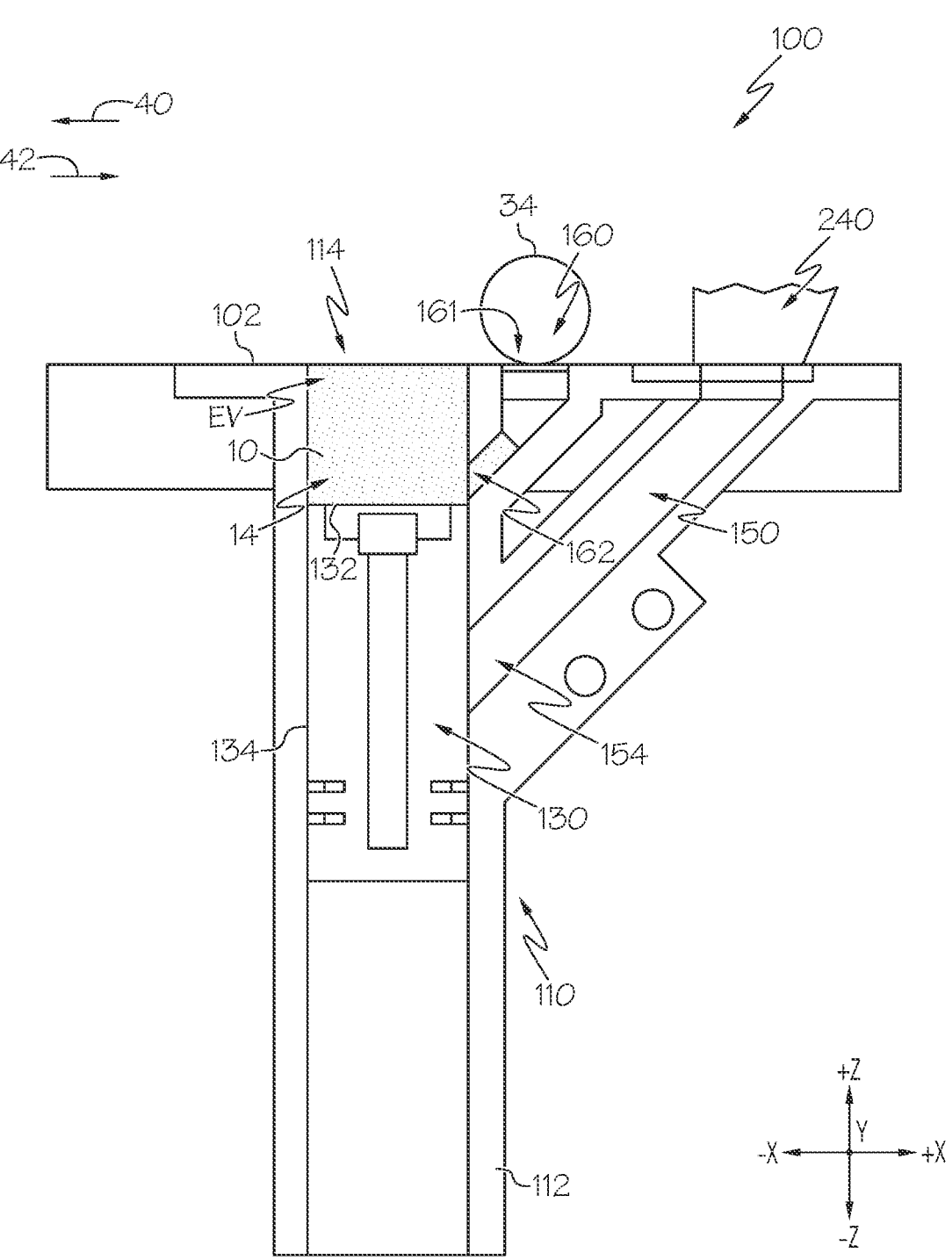
FIG. 14 schematically depicts a side section view of the supply receptacle and the piston of FIG. 13 with an illustrative material spreading member moving build material to an excess return, according to one or more embodiments shown and described herein.

In embodiments, the piston 130 is positionable within the supply receptacle 110 between an extended position and a retracted position. More particularly, the piston 130 is vertically positionable (e.g., in the direction of the z-axis of the coordinate axes of FIG. 3) within the supply receptacle 110, such that the piston 130 is movable in a direction transverse to the working surface 102. With the piston 130 in the extended position, the interior space 116 comprises an extended volume EV (FIG. 14). With the piston 130 in the retracted position, the interior space 116 comprises a retracted volume RV that is greater than the extended volume EV (FIG. 14). In embodiments, the piston 130 is movable from the retracted position to the extended position in less than about 2 seconds. In some embodiments, the piston 130 is movable from the retracted position to the extend position in about 1 second or less. Similarly, the piston 130, in embodiments, may be movable from the extended position in less than about 2 seconds, or about 1 second or less. In some embodiments, the piston 130 may move from the retracted position to the extended position while the recoat assembly 30 distributes a layer of build material 10 to the build area 104.

Figure 11:
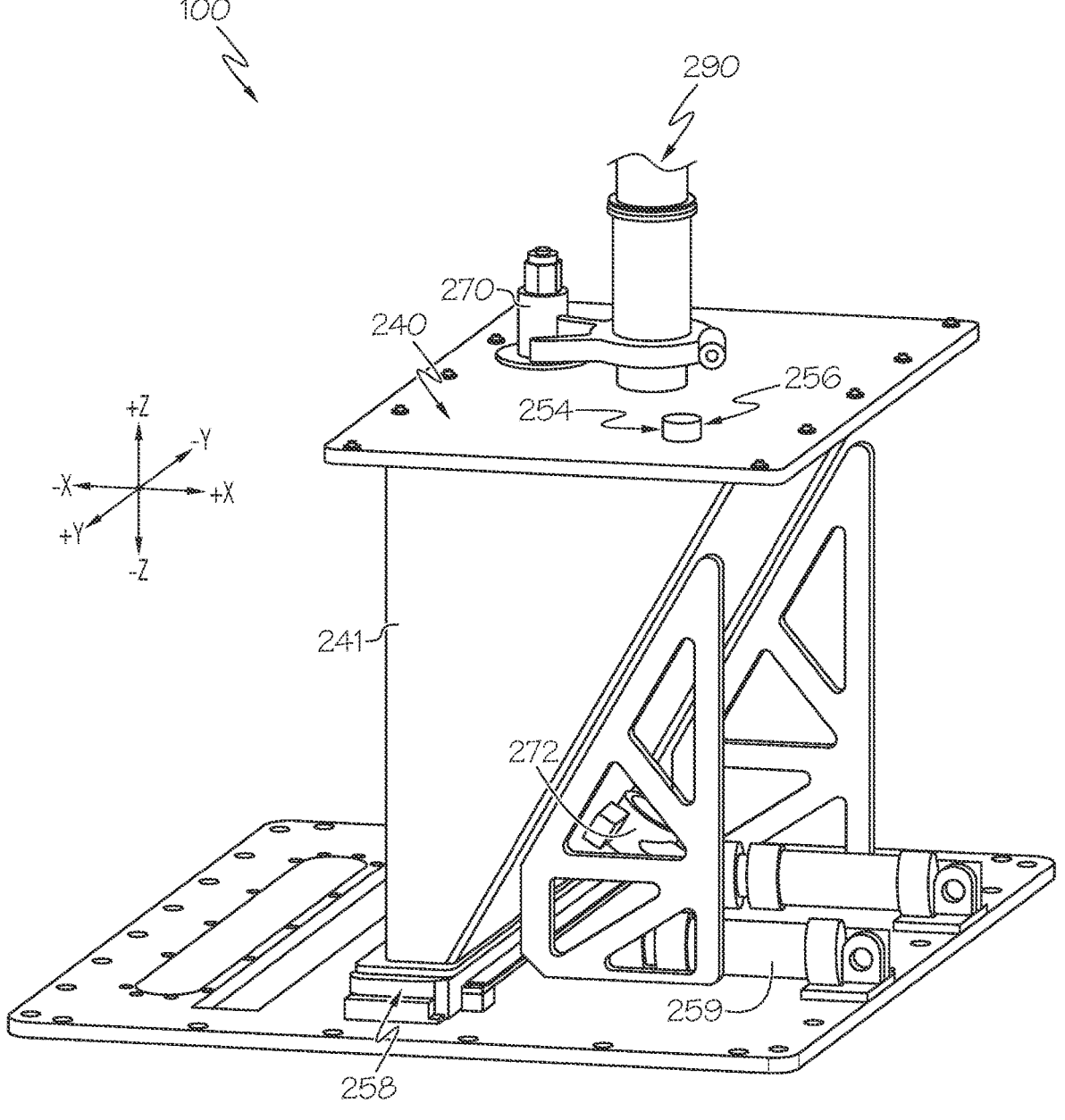
FIG. 11 schematically depicts a perspective view of an illustrative dosing hopper of the manufacturing system of FIG. 1, according to one or more embodiments shown and described herein.

In some embodiments, the retracted volume RV is less than the dose volume defined by the dosing hopper 240 (FIG. 11). In some embodiments, the retracted volume RV is at least about 2600 cubic centimeters. In some embodiments, the retracted volume RV and the dose volume defined by the dosing hopper 240 (FIG. 11) are collectively at least 6100 cubic centimeters. In the retracted position, the piston 130 may be positioned within the supply receptacle 110 such that a delivery surface 132 of the piston 130 is a first distance beneath (e.g. in the −z direction of the coordinate axes of FIG. 3) the upwardly-facing receptacle opening 114. In comparison, in the extended position, the piston 130 may be positioned within the supply receptacle 110 such that the delivery surface 132 of the piston 130 is positioned beneath the upwardly-facing receptacle opening 114 by a second distance that is less than the first distance.

The piston 130 includes the delivery surface 132 and one or more piston perimeter surfaces 134 that are oriented transverse to the delivery surface 132. The one or more piston perimeter surfaces 134 may extend from the delivery surface 132 (e.g., in the −z direction of the coordinate axes of FIG. 3). In embodiments, the delivery surface 132 may be the same shape as the horizontal cross section of the supply receptacle 110. For example, in embodiments where the one or more supply receptacle sidewalls 112 define a rectangular horizontal cross section of the supply receptacle 110, the delivery surface 132 of the piston 130 may also be rectangular. The delivery surface 132 may further be sized to minimize any gaps or spacing between a perimeter of the delivery surface 132 and the one or more supply receptacle sidewalls 112. Minimization of such spacing reduces the ability of build material 10 (FIG. 1) positioned above or on the delivery surface 132 to fall between the delivery surface 132 and the one or more supply receptacle sidewalls 112 to a position beneath the delivery surface 132.

Still referring to FIG. 3, in embodiments, a supply chute 150 may extend between the dosing hopper 240 and supply receptacle 110. The supply chute 150 may couple the dosing hopper 240 to the supply receptacle 110 such that build material 10 may flow from the dosing hopper 240, through the supply chute 150, to the interior space 116 of the supply receptacle 110. The supply chute 150, in embodiments, defines one or more supply chute sidewalls 152 that extend from the dosing hopper 240 to the supply receptacle 110. While in the embodiment depicted in FIG. 3, the supply chute 150 is depicted as including a generally rectangular cross-section, it should be understood that this is merely an example, and the supply chute 150 may have any suitable cross-sectional shape to allow build material 10 (FIG. 1) to move from the dosing hopper 240 to the interior space 116.

In embodiments, the supply chute defines a supply chute volume that is at least or about 3150 cubic centimeters.

The one or more supply chute sidewalls 152 may be oriented transverse to the one or more supply receptacle sidewalls 112. The one or more supply chute sidewalls 152 intersect with the one or more supply receptacle sidewalls 112 at a supply intersection 154 such that the supply chute 150 extends between the dosing hopper 240 and the supply intersection 154. In embodiments, the dosing hopper 240 is positioned vertically above (e.g., in the +z direction of the coordinate axes of FIG. 3) the supply intersection 154 such that the supply chute 150 slopes downwardly between the dosing hopper 240 and the supply intersection 154. More specifically, the supply chute 150 is downwardly sloped between the dosing hopper 240 and the supply intersection 154 such that the one or more supply chute sidewalls 152 form an intersection angle with the one or more supply receptacle sidewalls 112 at an angle θ that, in embodiments, is between about 30° and about 75°. In some embodiments, the angle θ is about 60°. In some embodiments, the angle θ is about 45°.

In embodiments, a supply length Ls of the supply chute 150 evaluated between the dosing hopper 240 and the supply intersection 154 may be between about 150 millimeters and about 200 millimeters. In embodiments, the supply length Ls may be measured along the length of any of the one or more supply chute sidewalls 152 evaluated between the dosing hopper 240 and the supply intersection 154. The downward slope of the supply chute 150 between the dosing hopper 240 and the supply intersection 154 permits and determines the flow of build material 10 from the dosing hopper 240, through the supply chute 150, to the interior space 116. For instance, due to the downward slope of the supply chute 150 between the dosing hopper 240 and the supply intersection 154, build material 10 (FIG. 1) can flow from the dosing hopper 240, through the supply chute 150, and into the supply receptacle 110 under the influence of gravity. The intersection angle θ formed by the one or more supply chute sidewalls 152 and the one or more supply receptacle sidewalls 112, therefore, affects the supply of build material 10 (FIG. 1) from the dosing hopper 240 to the interior space 116. For example, as the angle θ is increased, the build material 10 (FIG. 1) may flow from the dosing hopper 240 to the interior space 116 through the supply chute 150 at a relatively more rapid rate. Similarly, at a smaller angle θ, the build material 10 (FIG. 1) may flow from the dosing hopper 240 to the interior space 116 through the supply chute 150 at a relatively less rapid rate. To achieve greater angles θ, the dosing hopper 240 may be positioned closer to the interior space 116 (e.g., in the −x-direction of the coordinate axis of FIG. 3). As described in greater detail herein, it may be desirable to allow the recoat assembly 30 (FIG. 1) to be positioned between the supply receptacle 110 and the dosing hopper 240 along the working surface 102. To accommodate the recoat assembly 30 (FIG. 1), in embodiments, the angle θ may generally be between about 30° and about 75°, inclusive of the endpoints to both allow the flow from the dosing hopper 240 to the interior space 116, while allowing the recoat assembly 30 (FIG. 1) to be positioned between the supply receptacle 110 and the dosing hopper 240 along the working surface 102.

In embodiments, the manufacturing system 100 (FIG. 1) further comprises an excess return 160 that defines an upwardly-facing return opening 161. The upwardly-facing return opening 161 is positioned along the working surface 102. In the embodiment depicted in FIG. 3, the upwardly-facing return opening 161 is positioned along the working surface 102 between (e.g., in the direction of the x-axis of the coordinate axes of FIG. 3) the upwardly-facing receptacle opening 114 of the supply receptacle 110 and the dosing hopper 240. The excess return 160 includes one or more return sidewalls 166 extending downwardly (e.g., in the –z direction of the coordinate axes of FIG. 3) from the upwardly-facing return opening 161. In embodiments, the one or more return sidewalls 166 may extend between the upwardly-facing return opening 161 and the supply receptacle 110. In embodiments, the one or more return sidewalls 166 slope downwardly (e.g., in the –z direction of the coordinate axes of FIG. 3) from the upwardly-facing return opening 161 to the supply receptacle 110 and intersect the one or more supply receptacle sidewalls 112 at a return intersection 162. The one or more return sidewalls 166, therefore, couple the excess return 160 to the supply receptacle 110 such that build material 10 (FIG. 1) may flow from the excess return 160 to the interior space 116 of the supply receptacle 110. In such embodiments, the one or more return sidewalls 166 coupling the excess return 160 to the supply receptacle 110 may be also be referred to as a return chute 164. Similar to the supply chute 150 discussed above, the cross section of the return chute 164 may take any desirable shape to allow the flow of build material 10 (FIG. 1) there through. In some embodiments, the excess return 160 defines a return volume at least partially defined by the upwardly-facing return opening 161, the return intersection 162, and the one or more return sidewalls 166. In some embodiments, the return volume is less than the dosing volume defined by the dosing hopper 240. In some embodiments, the return volume is at least or about 1200 cubic centimeters.

The downward slope of the one or more return sidewalls 166 allows build material (FIG. 1) from the excess return 160 to flow to the interior space 116 under the influence of gravity. In some embodiments, the one or more return sidewalls 166 form an intersection angle with the one or more supply receptacle sidewalls 112 at an angle θ' that is between about 30° and about 75°. In some embodiments, the one or more return sidewalls 166 form an intersection angle with the one or more supply receptacle sidewalls 112 at an angle θ' of about 60°. In some embodiments, the one or more return sidewalls form an intersection angle with the one or more supply receptacle sidewalls 112 at an angle θ' of about 45°. In embodiments, the one or more return sidewalls 166 and the one or more supply chute sidewalls 152 form intersection angles with the one or more supply receptacle sidewalls 112 at the same angle (e.g., the angle θ and the angle θ' may be similar or the same). In some embodiments, the supply chute 150 and the one or more return sidewalls 166 may be angled and sized such that the return intersection 162 is above (e.g., in the +z direction of the coordinate axes of FIG. 3) the supply intersection 154 on the supply receptacle 110.

As discussed above, the angle θ' of intersection formed by the one or more return sidewalls 166 and the one or more supply receptacle sidewalls 112, the angle of intersection θ formed by the one or more supply chute sidewalls 152 and the one or more supply receptacle sidewalls 112, and the supply length Ls of the supply chute 150 affect the operation and packaging of the manufacturing system 100 (FIG. 1). In embodiments, the intersection angles θ and θ' along with the supply length Ls of the supply chute 150 may be selected to reduce the packaging or size of the manufacturing system 100 (FIG. 1). For instance, the angle θ formed by the one or more supply chute sidewalls 152 and the one or more supply receptacle sidewalls 112 along with the supply length Ls of the supply chute 150 determine the distance the supply chute 150 extends in the vertical direction (e.g., in the direction of the z-axis of the coordinate axes of FIG. 3) as well as the distance the supply chute 150 extends in the horizontal direction (e.g., in the direction of the x-axis of the coordinate axes of FIG. 3). In some embodiments, it may be desirable to reduce these distances in order to reduce the size or packaging of the manufacturing system 100 (FIG. 1). However, as a further inquiry, a threshold distance (e.g., in the direction of the x-axis of the coordinate axes of FIG. 3) should be maintained between the upwardly-facing receptacle opening 114 of the supply receptacle 110 and the dosing hopper 240 (as measured from the edge of the upwardly-facing opening 114 closest the dosing hopper 240 in the direction of the x-axis of the coordinate axes of FIG. 3), and more particularly between the upwardly-facing return opening 161 and the dosing hopper 240 (as measured from the edge of the upwardly-facing opening 161 closest the dosing hopper 240 in the direction of the x-axis of the coordinate axes of FIG. 3) such that the recoat assembly 30 (FIG. 1) may be at least partially positioned between the upwardly-facing return opening 161 and the dosing hopper 240, as will be explained further below. In other words, a length defined by a perimeter of the recoat assembly 30 (FIG. 1) in the direction of the x-axis of the coordinate axes of FIG. 3 should be less than a length between the upwardly-facing return opening 161 and the dosing hopper 240 in the direction of the x-axis of the coordinate axes of FIG. 3 (as measured from the edge of the upwardly-facing opening 161 closest the dosing hopper 240 in the direction of the x-axis of the coordinate axes of FIG. 3) such that at least a portion of the material spreading member 34 may be positioned between the edge of the upwardly-facing opening 161 closest the dosing hopper 240 in the direction of the x-axis of the coordinate axes of FIG. 3 and the dosing hopper 240.

For instance and referring to FIGS. 1 and 3, in embodiments, the recoat assembly 30 includes a recoat housing 36 that extends at least partially around the material spreading member 34. The excess return 160 is spaced apart from the dosing hopper 240 by a return distance Dr, and the material spreading member 34 is spaced apart from the recoat housing 36 by a material spreading distance Ds, which is less than the return distance Dr. Because the material spreading distance Ds is less than the return distance Dr, the recoat assembly 30 may be positioned over the excess return 160, and in particular, the material spreading member 34 may be positioned over the excess return 160 without the recoat assembly 30 contacting the dosing hopper 240. In some embodiments, the material spreading distance Ds is less than the return distance Dr such that the material spreading member 34 may at least partially traverse the excess return 160 (e.g., in the +x direction of the coordinate axes of FIG. 1) without the recoat assembly 30 contacting the dosing hopper 240. In some embodiments, the material spreading distance Ds is less than the return distance Dr such that the material spreading member 34 may fully traverse the excess return 160 (e.g., in the +x direction of the coordinate axes of FIG. 1) without the recoat assembly 30 contacting the dosing hopper 240.

The manufacturing system 100 may further comprise one or more heating elements 156 that are structurally configured to apply thermal energy to build material 10 positioned in at least one of the dosing hopper 240 and the supply chute 150. For example, in some embodiments, the heating element 156 may apply thermal energy to at least one of the dosing hopper 240 and the supply chute 150 thereby applying thermal energy to build material 10 in the dosing hopper 240 and/or the supply chute 150. In some embodiments, the heating element 156 may be attached to the supply chute 150. For instance, in some embodiments the heating element 156 may be coupled to the one or more supply chute sidewalls 152 and may heat the one or more supply chute sidewalls 152, which may then heat build material 10 within the supply chute 150. In some embodiments, the heating element 156 may be positioned between the supply chute 150 and the return chute 164. For instance, the heating element 156 may be positioned in a spacing 165 between the supply chute 150 and the return chute 164, such that the heating element 156 may simultaneously apply heat to both the one or more supply chute sidewalls 152 and the one or more return sidewalls 166. The one or more supply chute sidewalls 152 may then heat build material 10 within the supply chute 150, and the one or more return sidewalls 166 may then heat build material 10 within the return chute 164. In some embodiments, the heating element 156 may be coupled to the dosing hopper 240 and may apply thermal energy to the dosing hopper 240, thereby heating build material 10 positioned within the dosing hopper 240.

In embodiments, the manufacturing system 100 may further comprise an agitation device 158 that is structurally configured to agitate build material 10 in at least one of the dosing hopper 240 and the supply chute 150. The agitation device 158 may be a mechanical vibrator, an ultrasonic transducer, or any other suitable device that can vibrate, agitate, and/or shake build material 10 in at least one of the dosing hopper 240 and the supply chute 150. In some embodiments, the agitation device 158 may be coupled to the supply chute 150, for example, the one or more supply chute sidewalls 152 of the supply chute 150. In such embodiments, the agitation device 158 may vibrate or agitate the one or more supply chute sidewalls 152, which may then agitate build material 10 within the supply chute 150. By agitating the build material 10, the agitation device 158 may assist in inducing movement of the build material 10 through the supply chute 150. In some embodiments, the agitation device 158 may be positioned between the supply chute 150 and the return chute 164, such that the agitation device 158 may substantially simultaneously agitate build material 10 within the supply chute 150 and build material 10 within the return chute 164.

In embodiments, the dosing hopper 240 and the excess return 160 are in selective communication with the supply receptacle 110. More specifically, the piston 130 may be positioned within the supply receptacle 110 to either allow or restrict communication between the dosing hopper 240 and the interior space 116 of the supply receptacle 110. Similarly, the piston 130 may be positioned within the supply receptacle 110 to either allow or restrict communication between the excess return 160 and the interior space 116 of the supply receptacle 110. When the dosing hopper 240 is in communication with the interior space 116, build material 10 is able to flow from the dosing hopper 240 to the interior space 116. When communication is restricted between the dosing hopper 240 and the supply receptacle 110, build material 10 is restricted from flowing from the dosing hopper 240 to the interior space 116. Similarly, when the excess return 160 is in communication with the interior space 116 of the supply receptacle 110, build material 10 is able to flow from the excess return 160 to the interior space 116. When communication is restricted between the excess return 160 and the interior space 116, build material 10 is restricted from flowing from the excess return 160 to the interior space 116.

In the retracted position as depicted in FIG. 3, the piston 130, and more particularly the delivery surface 132 of the piston 130 may be positioned in the supply receptacle 110 beneath (e.g., in the −z direction of the coordinate axes of FIG. 3) the supply intersection 154. With the delivery surface 132 of the piston positioned beneath the supply intersection 154, the one or more piston perimeter surfaces 134 are also positioned beneath (e.g., in the −z direction of the coordinate axes of FIG. 3) the supply intersection 154. In embodiments in which the return intersection 162 is positioned vertically above (e.g., in the +z direction of the coordinate axes of FIG. 3) the supply intersection 154, the delivery surface 132 and the one or more piston perimeter surfaces 134 of the piston 130 may also be positioned beneath (e.g., in the −z direction of the coordinate axes of FIG. 3) the return intersection 162 when the piston 130 is in the retracted position.

With the delivery surface 132 and the one or more piston perimeter surfaces 134 positioned beneath (e.g., in the −z direction of the coordinate axes of FIG. 3) the supply intersection 154, neither the delivery surface 132 nor the one or more piston perimeter surfaces 134 obstruct the supply intersection 154. Therefore, build material 10 (FIG. 1) is able to flow from the dosing hopper 240, through the supply chute 150, to the interior space 116 of the supply receptacle 110. The build material 10 (FIG. 1) entering the supply receptacle 110 is supported by the delivery surface 132. In embodiments, the build material 10 (FIG. 1) may continue to flow from the dosing hopper 240 into the supply receptacle 110 until the build material 10 (FIG. 1) supported on the delivery surface 132 extends above the supply intersection 154.

In some embodiments, with build material 10 (FIG. 1) supported on the delivery surface 132, the piston 130 may be moved into the extended position, providing build material to the working surface 102 that can be moved to the build area 108 (FIG. 1). While the recoat assembly 30 (FIG. 1) distributes build material 10 (FIG. 1) to the build area 108 (FIG. 1), in some embodiments, the piston 130 may be moved back into the retracted position, such that build material 10 (FIG. 1) can flow from the dosing hopper 240 to the supply receptacle 110, thereby replenishing build material 10 (FIG. 1) in the supply receptacle 110 as each layer of build material 10 is distributed to the build area 108 (FIG. 1). In some embodiments, the supply receptacle 110 may be replenished with build material 10 (FIG. 1) from the dosing hopper 240 at any suitable interval.

In embodiments, a distance (e.g., in the direction of the z-axis of the coordinate axes of FIG. 3) between the delivery surface 132 of the piston 130 and the supply intersection 154 is related to the amount of build material 10 (FIG. 1) that flows from the dosing hopper 240 to the interior space 116. For example, the greater the distance between the supply intersection 154 and the delivery surface 132 of the piston 130, the greater the amount of build material 10 (FIG. 1) that can be released from the dosing hopper 240 into the supply receptacle 110 before the build material 10 on the delivery surface 132 extends to the supply intersection 154. Once the build material 10 (FIG. 1) on the delivery surface 132 extends above the supply intersection 154, the build material 10 (FIG. 1) may at least partially obstruct the supply intersection 154 such that build material 10 (FIG. 1) is restricted from flowing through the supply chute 150 to the interior space 116.

Similarly, with the delivery surface 132 and the one or more piston perimeter surfaces 134 positioned beneath (e.g., in the −z direction depicted in FIG. 3) the return intersection 162, neither the delivery surface 132 nor the one or more piston perimeter surfaces 134 of the piston 130 obstruct the return intersection 162. Therefore, build material 10 (FIG. 1) is able to flow from the excess return 160, through the return chute 164, to the interior space 116 of the supply receptacle 110. Build material 10 (FIG. 1) may continue to flow from the excess return 160 to the interior space 116 until the build material 10 (FIG. 1) in the supply receptacle 110 extends from the delivery surface 132 of the piston 130 above return intersection 162

Figure 13:
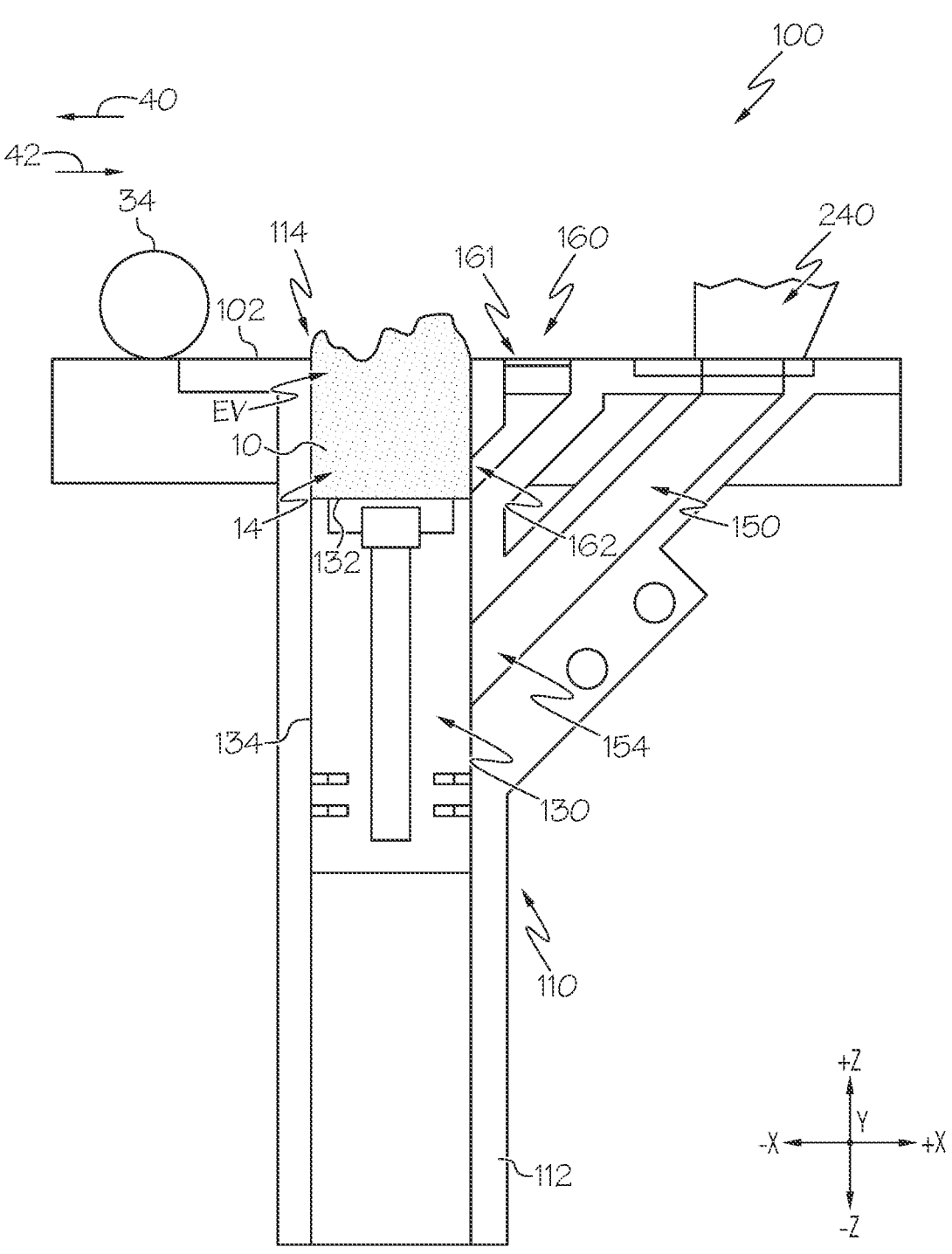
FIG. 13 schematically depicts a side section view of the supply receptacle of the manufacturing system of FIG. 1 having an illustrative piston in an extended position, according to one or more embodiments shown and described herein.

In some embodiments, in the extended position, the delivery surface 132 of the piston 130 may be positioned in the supply receptacle 110 between the supply intersection 154 and the return intersection 162, as depicted in FIG. 13, for instance. In other words, the delivery surface 132 of the piston 130 may be positioned above (e.g., in the +z direction of the coordinate axes of FIG. 3) the supply intersection 154 and below (e.g., in the −z direction of the coordinate axes of FIG. 3) the return intersection 162. With the delivery surface 132 of the piston 130 positioned above (e.g., in the +z direction of the coordinate axes of FIG. 3) the supply intersection 154, the one or more piston perimeter surfaces 134 of the piston 130 may extend from the delivery surface 132 past the supply intersection 154. Accordingly, the one or more piston perimeter surfaces 134 may at least partially obstruct the supply intersection 154 such that build material 10 (FIG. 1) is restricted from flowing from the supply chute 150 to the interior space 116. However, with the delivery surface 132 of the piston 130 positioned beneath the return intersection 162, neither the delivery surface 132 nor the one or more piston perimeter surfaces 134 obstruct the return intersection 162. Therefore, build material 10 (FIG. 1) is able to flow from the excess return 160, through the return chute 164, to the interior space 116. The build material 10 (FIG. 1) may continue to flow from the excess return 160 into the supply receptacle 110 until the build material 10 (FIG. 1) in the supply receptacle 110 extends a height (e.g., in the direction of the z-axis of the coordinate axes of FIG. 3) from the delivery surface 132 of the piston 130 above the return intersection 162. Once the build material 10 (FIG. 1) extends from the delivery surface 132 to the return inter- section 162, the build material 10 (FIG. 1) on the delivery surface 132 of the piston 130 may at least partially obstruct the return intersection 162, thereby restricting further flow of build material 10 (FIG. 1) through the return chute 164 to the interior space 116.

Figure 15:
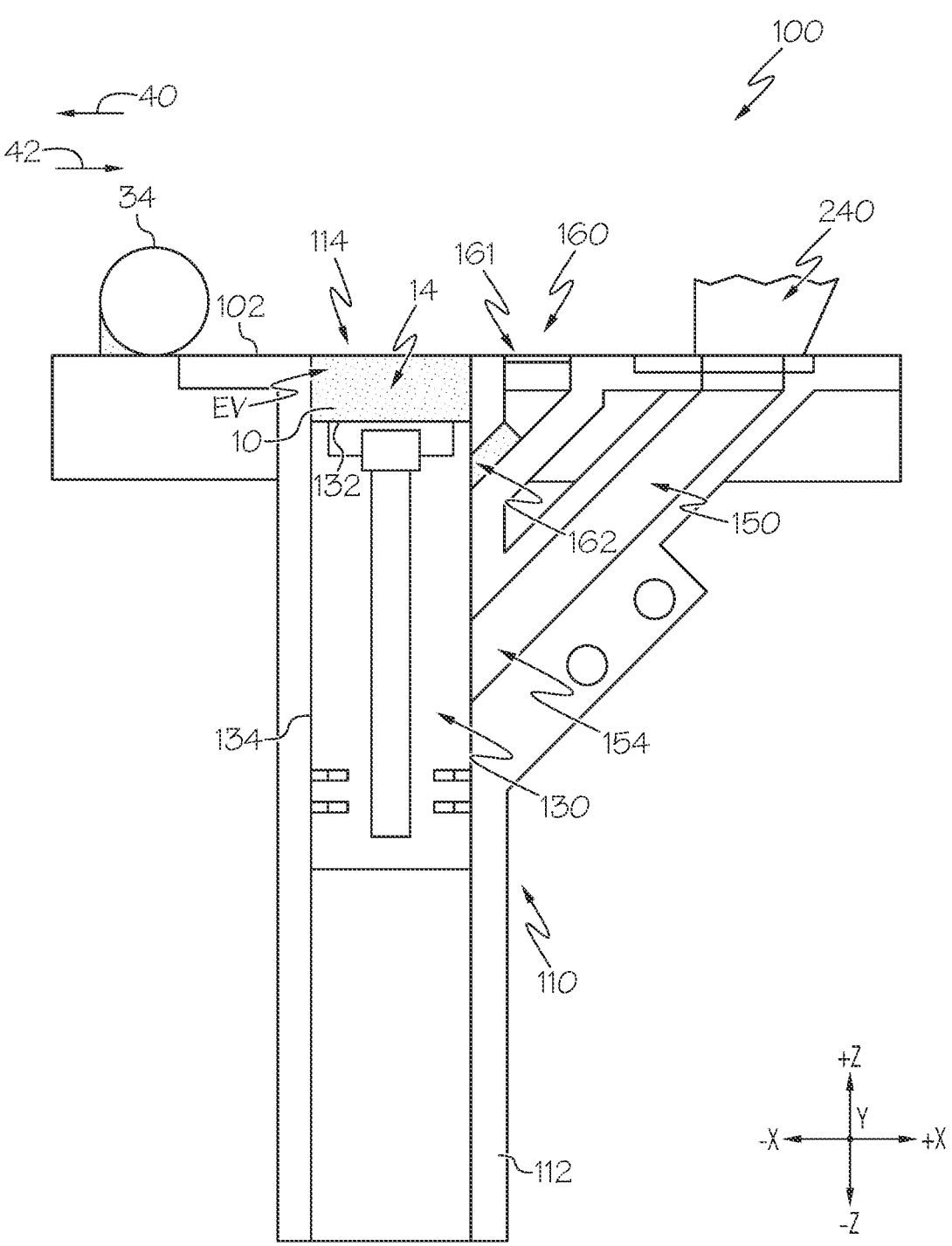
FIG. 15 schematically depicts a side section view of the supply receptacle and the piston of FIG. 13 with the material spreading member of FIG. 14 moving build material from the supply receptacle, according to one or more embodiments shown and described herein.

In some embodiments, in the extended position, the delivery surface 132 of the piston 130 may be positioned above (e.g., in the +z direction of the coordinate axes of FIG. 3) the supply intersection 154 and the return intersection 162, as depicted in FIG. 15, for instance. With the delivery surface 132 of the piston 130 positioned above the return intersection 162, the one or more piston perimeter surfaces 134 may extend from the delivery surface 132 past the return intersection 162. Therefore, the one or more piston perim- eter surfaces 134 may at least partially obstruct the return intersection 162 such that build material 10 (FIG. 1) is restricted from flowing from the return chute 164 to the interior space 116. Furthermore, the one or more piston perimeter surfaces 134 may extend from the delivery surface 132 past the supply intersection 154. Therefore, the one or more piston perimeter surfaces 134 may at least partially obstruct the supply intersection 154 such that build material 10 is restricted from flowing from the supply chute 150 to the interior space 116 with the piston 130 in the extended position.

In some embodiments, the manufacturing system 100 (FIG. 1) may further include a return valve 168 positioned on the one or more return sidewalls 166. The return valve 168 may be positionable between an open or closed position. In the closed position, the return valve 168 may at least partially obstruct communication between the excess return 160 and the interior space 116, such that build material 10 (FIG. 1) is restricted from flowing through the return valve 168 to the interior space 116. In the open position, build material 10 (FIG. 1) may flow from the excess return 160 to the interior space 116 through the return valve 168. In such embodiments, the release or flow of build material 10 (FIG. 1) from the excess return 160 to the interior space 116 may be controlled by the positions of both the piston 130 (e.g., between the extended position and the retracted position), and the return valve 168 (e.g., between the open position and the closed position). For example, build material 10 (FIG. 1) may be restricted from flowing from the excess return 160 into the supply receptacle 110 when the delivery surface 132 of the piston 130 is positioned above the return intersection 162 and the return valve 168 is in the closed position.

In some embodiments, the manufacturing system 100 (FIG. 1) may further comprise a supply valve 155 positioned on the one or more supply chute sidewalls 152. The supply valve 155 may be positionable between an open or closed position. In the closed position, the supply valve 155 may at least partially obstruct communication between the supply chute 150 and the interior space 116, such that build material 10 (FIG. 1) is restricted from flowing through the supply valve 155 to the interior space 116. In the open position, build material 10 (FIG. 1) may flow from the supply chute 150 to the interior space 116 through the supply valve 155. In such embodiments the release or flow of build material 10 (FIG. 1) from the dosing hopper 240 and supply chute 150 to the interior space 116 may be controlled by the positions of both the piston 130 (e.g., between the extended position and the retracted position) and the supply valve 155 (e.g., between the open position and the closed position). For example, build material 10 (FIG. 1) may be restricted from flowing from the supply chute 150 into the supply receptacle 110 when the delivery surface 132 of the piston 130 is positioned above and the supply intersection 154 and the supply valve 155 is in the closed position.

Figure 4:
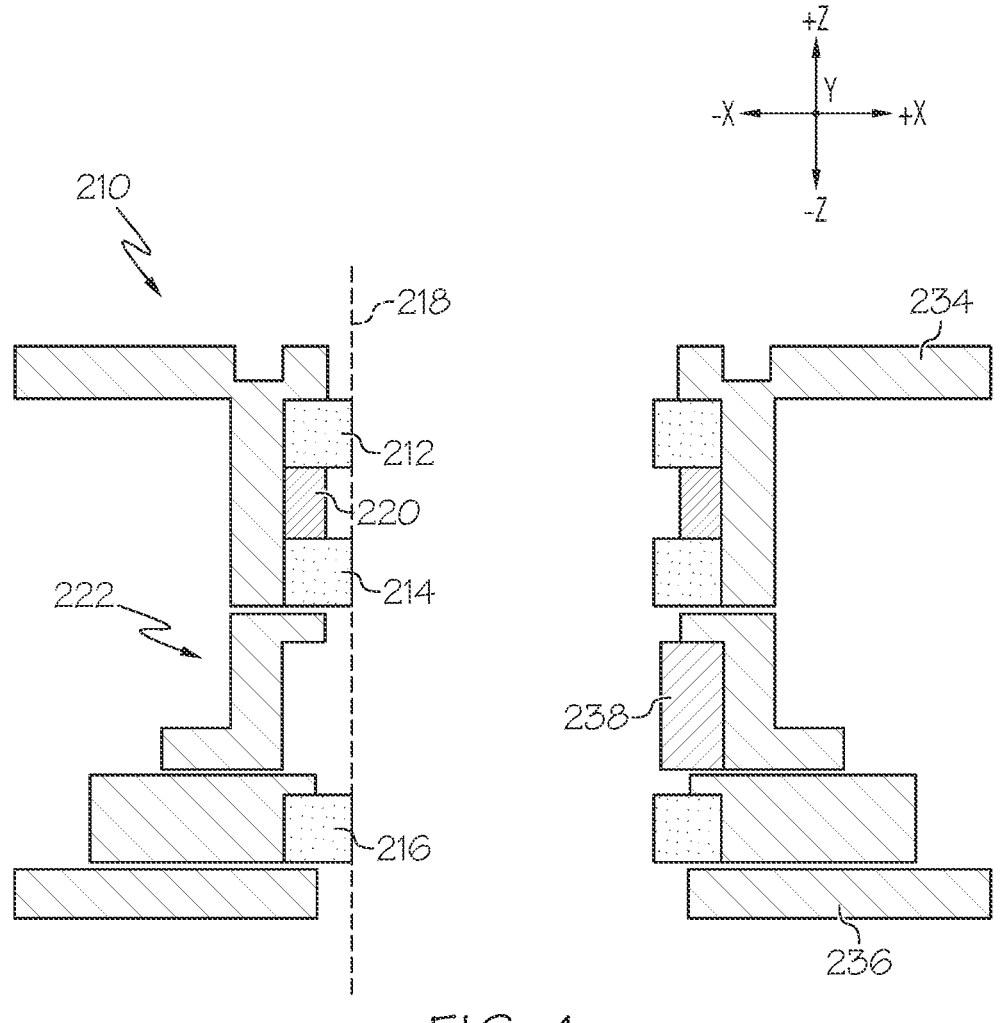
FIG. 4 schematically depicts a section view of an illustrative seal assembly of the manufacturing system of FIG. 1, according to one or more embodiments shown and described herein.

Referring now to FIGS. 1, and 4-6, in some embodiments, the manufacturing system 100 includes a supply receptacle seal 210 that is engaged with and/or engagable with the piston 130. For example a section view of the supply receptacle seal 210 is schematically depicted in FIG. 4. The supply receptacle seal 210 is generally positioned at the bottom (e.g., in the −z direction of the coordinate axes of FIG. 4) of the supply receptacle 110. The supply receptacle seal 210 generally defines an inner perimeter 218 that is generally aligned with an inner perimeter of the supply receptacle 110, such that the supply receptacle seal 210 engages the piston 130, and more particularly the one or more piston perimeter surfaces 134 (FIG. 3).

In embodiments, the supply receptacle seal 210 generally includes a textile seal 212, an upper polymer seal 214, and a lower polymer seal 216. The textile seal 212 may be positioned above (e.g., in the +z direction of the coordinate axes of FIG. 4) the upper polymer seal 214, and the upper polymer seal 214 may be positioned above the lower poly- mer seal 216 (e.g., in the +z direction of the coordinate axes of FIG. 4). The textile seal 212, upper polymer seal 214, and lower polymer seal 216 may define the inner perimeter 218 of the supply receptacle seal 210, and the textile seal 212, upper polymer seal 214, and lower polymer seal 216 may each engage the piston 130. More specifically, the piston 130 is vertically positionable (e.g., in the direction of the z-axis of the coordinate axes of FIG. 4) within the inner perimeter 218 defined by the textile seal 212, upper polymer seal 214, and lower polymer seal 216. For example, the one or more piston perimeter surfaces 134 (FIG. 3) of the piston 130 engage the textile seal 212, the upper polymer seal 214, and the lower polymer seal 216.

In embodiments, the textile seal 212 may be formed of any suitable textile that that can conform to the piston 130, such as felt or the like. The textile seal 212 generally conforms to the one or more piston perimeter surfaces 134 (FIG. 3) of the piston 130 such that the textile seal 212 may be engaged with the piston 130 as the piston 130 moves with respect to the textile seal 212. In embodiments, the textile seal 212 may generally restrict the passage of material (e.g., build material 10) from passing from between the textile seal 212 and the piston 130. In some embodiments, the material of the textile seal 212 may be particularly selected to avoid possible contamination of the build material 10 within the manufacturing system 100. For instance, after numerous cycles of actuating the piston 130 upwardly and downwardly (e.g., in the direction of the z-axis of the coordinate axes of FIG. 4), the textile seal 212 may wear and/or degrade such that portions of the textile seal 212 may break off and be introduced into the build enclosure 106. More particularly, small fibers of the textile seal 212 may wear off and enter the build material 10 supported by the piston 130 in the supply receptacle 110. Therefore, the small fibers of the textile seal 212 may be spread across the build area 104 along with the build material 10. However, because the portions of the textile seal 212 that wear and/or break off are textile fibers, in some circumstances, the fibers may then burn off under the high temperatures induced at the build area 104 such that the textile fibers have minimal impact on the object being built from the build material 10.

In embodiments, the upper polymer seal 214 and the lower polymer seal 216 may be formed of any suitable material for engaging the piston 130 while restricting the flow of build material 10 between the upper polymer seal 214 and/or the lower polymer seal 216 and the piston 130. In embodiments, the upper polymer seal 214 and/or the lower polymer seal 216 may be formed from, for example and without limitation, polytetrafluoroethylene. In some embodiments, the upper polymer seal 214 and the lower polymer seal 216 may restrict the flow of gas between the upper polymer seal 214 and/or the lower polymer seal 216 and the piston 130, as described in greater detail below. Because the textile seal 212 is positioned above (e.g., in the +z direction of the coordinate axes of FIG. 4) the upper polymer seal 214 and the lower polymer seal 216, the textile seal 212 may assist in preventing degraded portions of the upper polymer seal 214 and/or the lower polymer seal 216 from entering the supply receptacle 110 and accordingly the build enclosure 106.

In some embodiments a spacer 220 may be positioned between the textile seal 212 and the upper polymer seal 214, for example in the vertical direction (e.g., in the direction of the z-axis of the coordinate axes of FIG. 4). The spacer 220 may be formed of any suitable material, for example and without limitation, aluminum or the like, and may generally restrict relative movement between the textile seal 212 and the upper polymer seal 214 (e.g., in the direction of the z-axis of the coordinate axes of FIG. 4).

Figure 5:
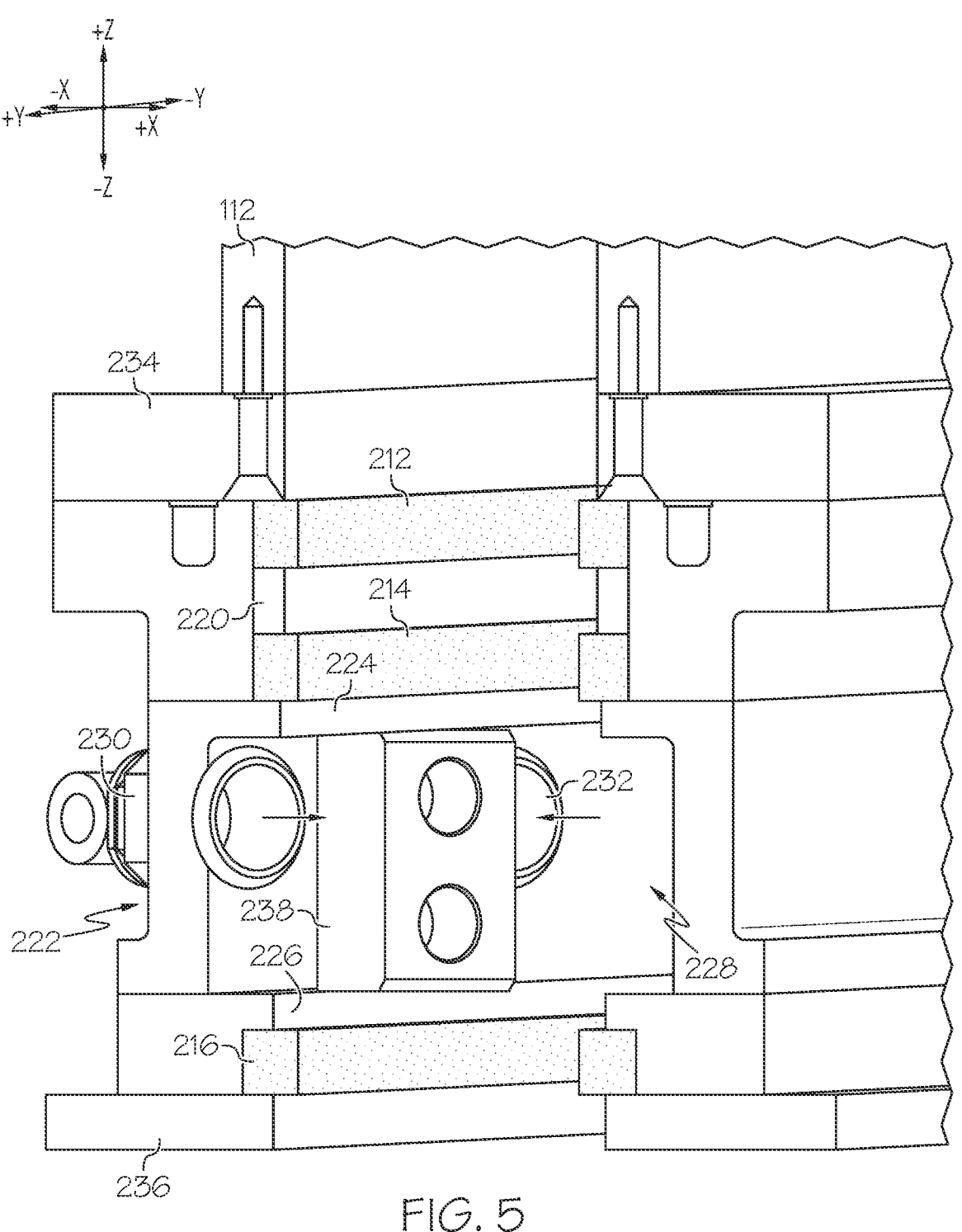
FIG. 5 schematically depicts an enlarged perspective section view of the seal assembly of FIG. 4, according to one or more embodiments shown and described herein.
Figure 6:
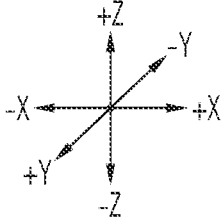
FIG. 6 schematically depicts another perspective section view of the seal assembly of FIG. 4, according to one or more embodiments shown and described herein.
Figure 6:
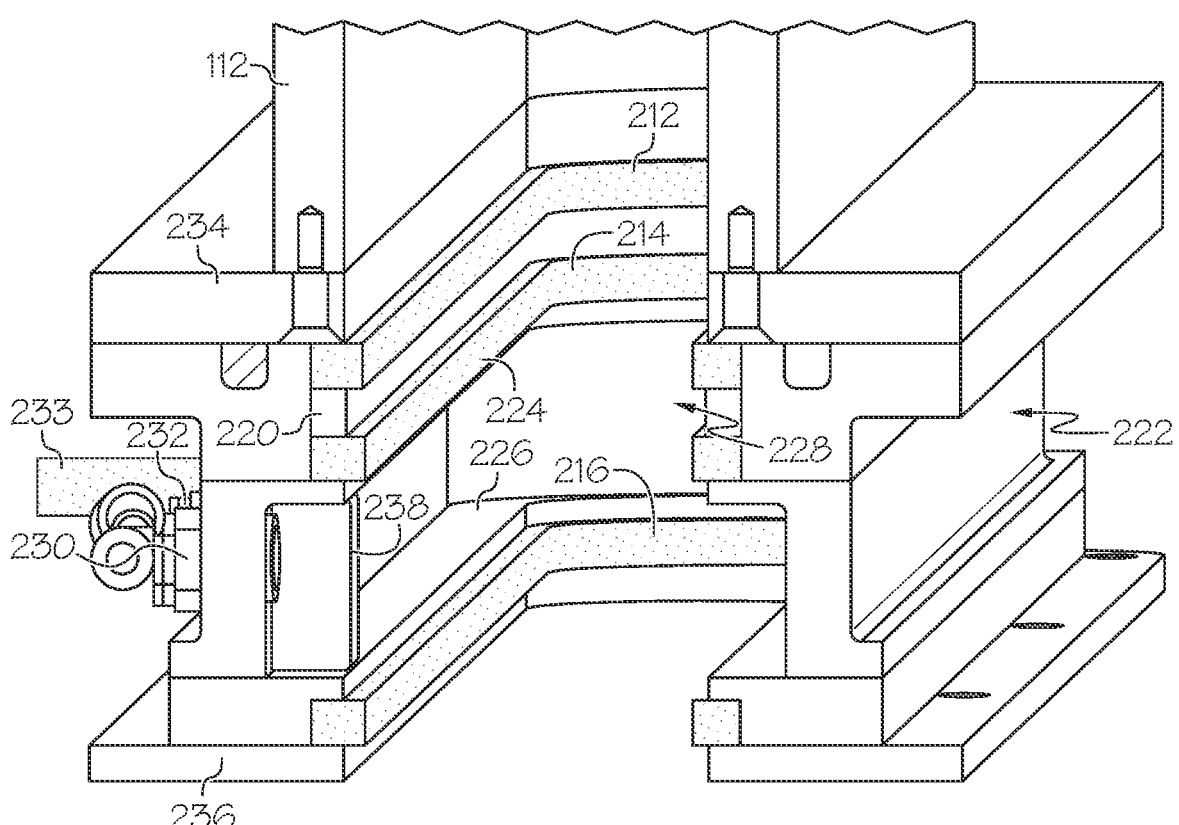

Still referring to FIGS. 1 and 4-6, in some embodiments, the supply receptacle seal 210 further comprises a pneumatic seal purge 222. FIGS. 5 and 6 depict perspective views of the pneumatic seal purge 222. In embodiments, the pneumatic seal purge 222 is positioned between the upper polymer seal 214 and the lower polymer seal 216 in the vertical direction (e.g., in the direction of the z-axis of the coordinate axes of FIG. 4). The pneumatic seal purge 222 generally includes an upper wall 224 and a lower wall 226 spaced apart from and positioned beneath the upper wall 224 in the vertical direction (e.g., in the −z direction of the coordinate axes of FIG. 5). The pneumatic seal purge 222 further includes a divider 238 that vertically extends (e.g., in the direction of the z-axis of the coordinate axes of FIG. 5) between the upper wall 224 and the lower wall 226. The upper wall 224, the lower wall 226 and the piston 130 at least partially define a purge cavity 228. In embodiments, the upper wall 224, the lower wall 226, and the divider 238 may be formed of any suitable material, for example and without limitation, a polymer, such as polytetrafluoroethylene and/or the like.

The pneumatic seal purge 222, in embodiments, further includes a purge gas inlet 230 and a purge gas outlet 232 in communication with the purge cavity 228. The divider 238 may be positioned between the purge gas inlet 230 and the purge gas outlet 232 (e.g., in the direction of the y-axis of the coordinate axes of FIG. 5), thereby separating the purge gas inlet 230 and the purge gas outlet 232. In embodiments, a gas source may be connected to the purge gas inlet 230 and/or the purge gas outlet 232, and the gas source may pass gases into the purge cavity 228 through the purge gas inlet 230, through the purge cavity 228, and out the purge gas outlet 232.

In operation, the pneumatic seal purge 222 may assist in removing any build material 10 that bypasses the textile seal 212 and the upper polymer seal 214. For example, build material 10 that bypasses the textile seal 212 and the upper polymer seal 214 may settle within the purge cavity 228. As gas is passed through the purge cavity 228, for example through the purge gas inlet 230 and the purge gas outlet 232, the gas may carry build material 10 out the purge gas outlet 232. For instance, the divider 238 may contact the one or more piston perimeter surfaces 134 (FIG. 3), directing the pressurized gas from the purge gas inlet 230, around a perimeter of the piston 130, to the purge gas outlet 232. In other words, the divider 238 effectively prevents the pressurized gas from traveling directly from the purge gas inlet 230 to the purge gas outlet 232 without first sweeping the purge cavity 228 around the perimeter of the piston 130. The purge gas inlet 230 and the purge gas outlet 232 may be positioned directly adjacent to and on opposite sides of the divider 238, such that the pressurized gas travels the perimeter of the purge cavity 228 when flowing from the purge gas inlet 230 to the purge gas outlet 232. As shown in FIG. 6, in some embodiments, the supply receptacle seal 210 may further include a filter 233 coupled to the purge gas outlet 232. The filter 233, in embodiments, may restrict the passage of build material 10 through the filter 233, and may thereby separate the build material 10 from gas passing through the filter 233. The filter 233, in embodiments, is coupled to the purge gas outlet 232 to filter build material 10 collected and removed from the purge cavity 228.

In embodiments, the supply receptacle seal 210 may be generally stationary with respect to the piston 130 and positioned such that the delivery surface 132 (FIG. 3) of the piston 130 generally remains above the textile seal 212 as the piston 130 moves between the extended and the retracted position.

In some embodiments, the supply receptacle seal 210 further comprises a first seal capture plate 234 selectively positioned above the textile seal 212 and a second seal capture plate 236 selectively positioned beneath the lower polymer seal 216. The first seal capture plate 234 and the second seal capture plate 236 may generally define the upper (e.g., in the +z direction of the coordinate axes of FIG. 4) and the lower (e.g., in the −z direction of the coordinate axes of FIG. 4) boundaries of the supply receptacle seal 210, respectively. The supply receptacle seal 210 may be selectively coupled to or removed from the supply receptacle 110 via the first seal capture plate 234 and the second seal capture plate 236. For instance, one or more screws, bolts, or other fasteners may couple at least one of the first seal capture plate 234 and the second seal capture plate 236 to the bottom (e.g., in the −z direction of the coordinate axes of FIG. 3) of the one or more supply receptacle sidewalls 112 (FIG. 3). By removing the one or more screws, bolts, or other fasteners, the first seal capture plate 234 and/or the second seal capture plate 236, and accordingly the entire supply receptacle seal 210 can be removed from the manufacturing system 100 and replaced as needed.

Figure 7:
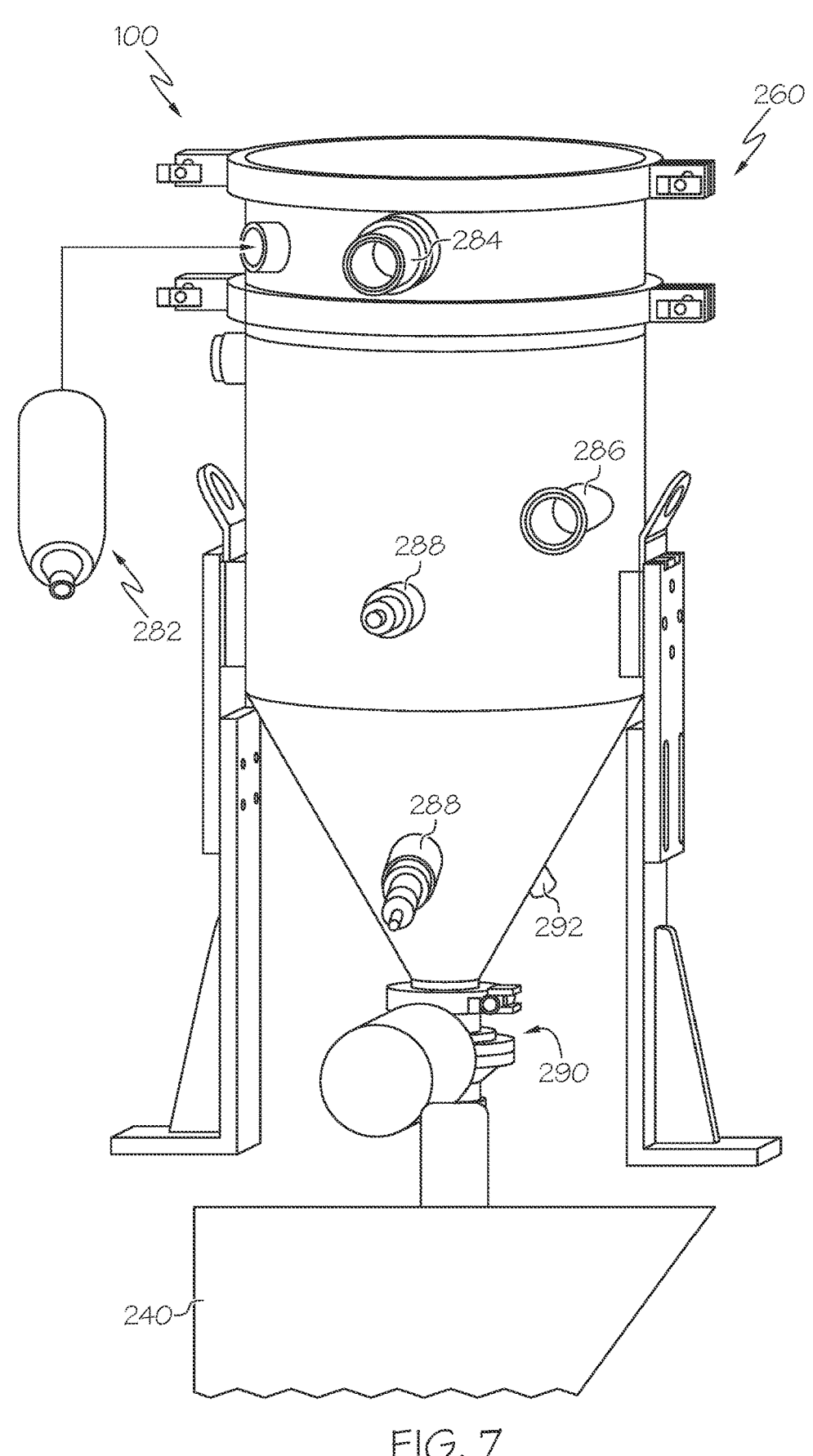
FIG. 7 schematically depicts a perspective view of an illustrative conveyance hopper of the manufacturing system of FIG. 1, according to one or more embodiments shown and described herein.

Referring to FIG. 7, a perspective view of the manufacturing system 100 is schematically depicted. In some embodiments, the manufacturing system 100 comprises the conveyance hopper 260 in communication with the dosing hopper 240, for example through a valve 290. In embodiments, the conveyance hopper 260 may hold build material 10 that can be provided to the dosing hopper 240. In some embodiments, the conveyance hopper 260 is positioned above the dosing hopper 240 such that build material 10 within the conveyance hopper 260 may flow to the dosing hopper 240 under the influence of gravity.

Figure 8:
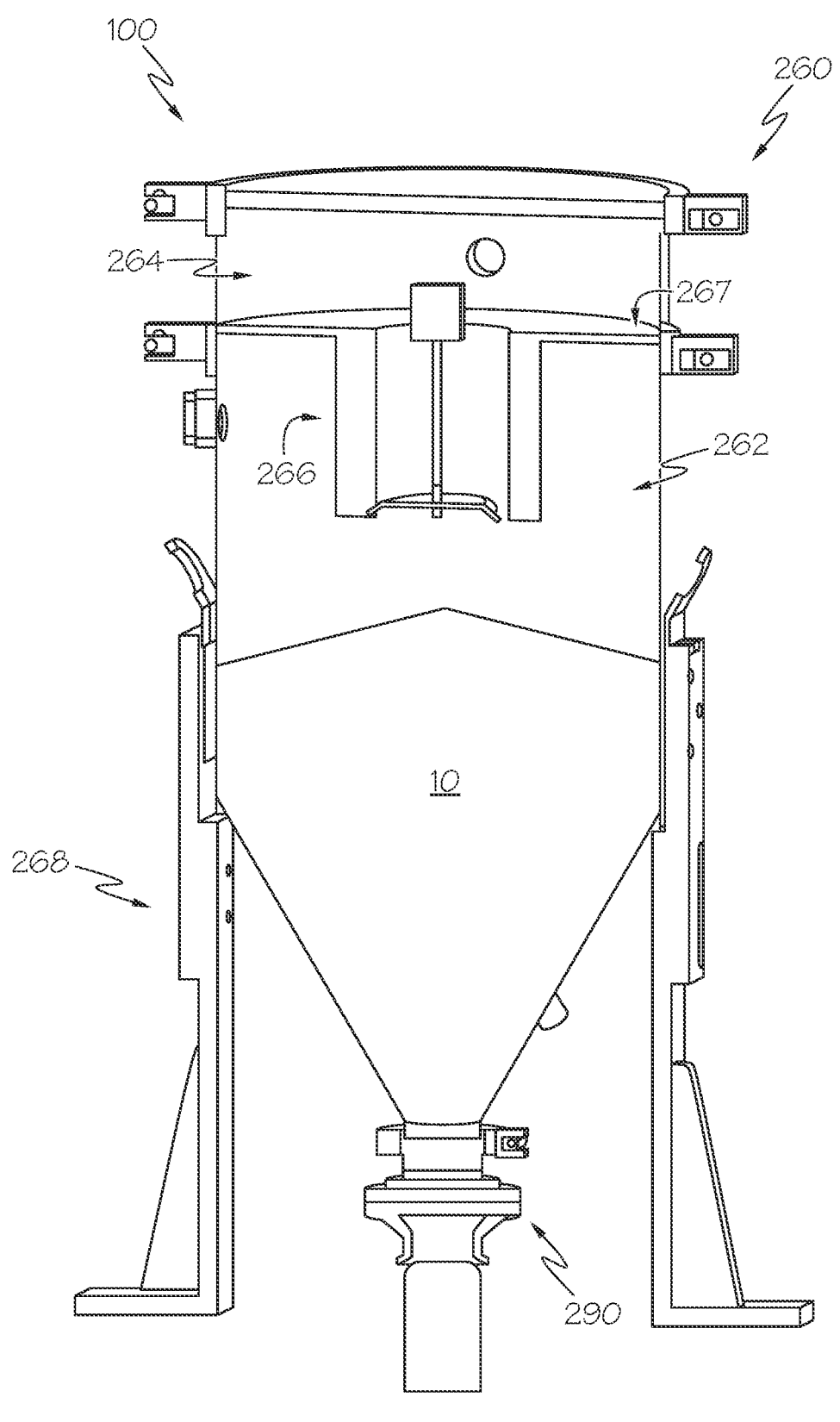
FIG. 8 schematically depicts a section view of the conveyance hopper of FIG. 7, according to one or more embodiments shown and described herein.

Referring to FIGS. 7 and 8, a perspective view and a section view of the conveyance hopper 260 are schematically depicted, respectively. In embodiments, the conveyance hopper 260 defines a build material portion 262 and a gas portion 264 separated from the build material portion 262 by a conveyance hopper bulkhead 267. The conveyance hopper 260, in some embodiments, may further include a conveyance hopper filter 266 positioned between the build material portion 262 and the gas portion 264. The conveyance hopper filter 266 is structurally configured to allow gases, such as air and the like, to pass through the conveyance hopper filter 266 while restricting build material 10 from passing through the conveyance hopper filter 266.

The conveyance hopper 260, in some embodiments, defines a conveyance inlet 286 in communication with the build material portion 262 and a conveyance outlet 284 in communication with the gas portion 264. In some embodiments, a mixture of gas and build material 10 may be conveyed to the conveyance inlet 286, and the gas may pass through the conveyance hopper filter 266 and out from the gas portion 264 through the conveyance outlet 284, as described in greater detail herein.

In some embodiments, the conveyance hopper 260 may include a conveyance agitation device 292 coupled to the conveyance hopper 260. In embodiments, the conveyance agitation device 292 may include any suitable device to vibrate or agitate the conveyance hopper 260, and thereby agitate build material 10 positioned within the conveyance hopper 260, and may include a vibration device or the like. By agitating the build material 10 within the conveyance hopper 260, the conveyance agitation device 292 may assist in transferring the build material from the conveyance hopper 260 to the dosing hopper 240 in communication with the conveyance hopper 260.

In some embodiments, the conveyance hopper 260 includes one or more conveyance hopper level sensors 288 structurally configured to detect a level of build material 10 within the conveyance hopper 260. The one or more conveyance hopper level sensors 288 may include any suitable sensors for detecting a level of build material 10 within the conveyance hopper 260, and may include for example and without limitation, ultrasonic sensors, capacitance sensors, float sensors, conductive sensors, optical sensors, microwave sensors, LIDAR sensors, load cells, and/or the like.

In some embodiments, the manufacturing system 100 includes a pressurized gas source 282 in selective communication with the conveyance hopper 260. The pressurized gas source 282 may be in communication with the gas portion 264 and may be operable to pass a gas to the gas portion 264. The gas passed from the pressurized gas source 282 may pass from the gas portion 264 to the build material portion 262 through the conveyance filter 266. By passing gas through the gas portion 264 and the conveyance filter 266 to the build material portion 262, the pressurized gas source 282 may assist in dislodging build material 10 engaged with the conveyance filter 266, thereby cleaning the conveyance filter 266.

In some embodiments, the conveyance hopper 260 may be supported by one or more legs 268, however, it should be understood that this is merely an example, and the conveyance hopper 260 may be supported by any suitable structure.

Figure 9:
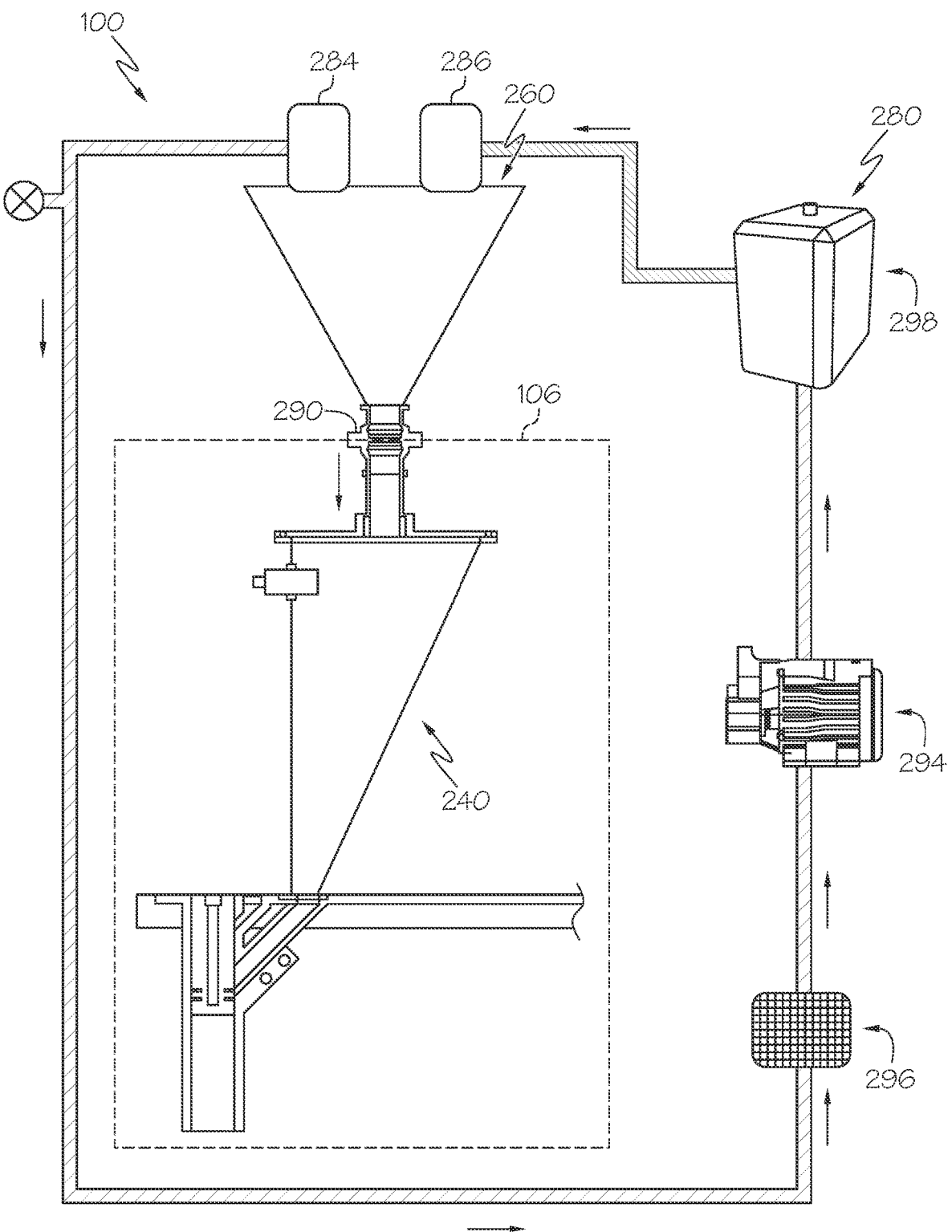
FIG. 9 schematically depicts an illustrative build material conveyance system of the manufacturing system of FIG. 1, according to one or more embodiments shown and described herein.

Referring to FIG. 9, a schematic diagram of a build material conveyance system 280 is depicted. In embodiments, the build material conveyance system 280 is structurally configured to move build material 10 (FIG. 8) to the conveyance inlet 286 of the conveyance hopper 260. In embodiments, the build material conveyance system 280 includes a build material reservoir 298 in communication with a conveyance inlet 286 of the conveyance hopper 260. Build material 10 (FIG. 8) may be positioned within the build material reservoir 298, and may be passed from the build material reservoir 298 to the conveyance hopper 260 through the conveyance inlet 286 along with a conveyance gas, such as air or the like. As described above, the build material 10 (FIG. 8) may be retained within the conveyance hopper 260, and the conveyance gas may be passed out of the conveyance hopper 260 through the conveyance outlet 284. In some embodiments, build material 10 (FIG. 8) may be moved to the conveyance hopper 260 in response to determining that an amount of build material (FIG. 8) within the conveyance hopper 260 is below a configurable threshold, for example via the one or more conveyance hopper level sensors 288 (FIG. 8)

In some embodiments, the build material conveyance system 280 further includes a conveyance pump 294 in communication with the conveyance hopper 260. In the embodiment depicted in FIG. 9, the conveyance pump 294 is positioned between the conveyance hopper 260 and the build material reservoir 298, and may generally draw conveyance gas from the conveyance hopper 260 through the conveyance outlet 284. In some embodiments, the build material conveyance system 280 further includes a filter 296 positioned between the conveyance pump 294 and the conveyance hopper 260. In embodiments, the filter 296 may generally restrict build material 10 (FIG. 8) from flowing from the conveyance hopper 260 through the pump 294. In some embodiments, the conveyance pump 294 may further drive gas and build material 10 (FIG. 8) from the build material reservoir 298 to the conveyance inlet 286 of the conveyance hopper 260.

Figure 10:
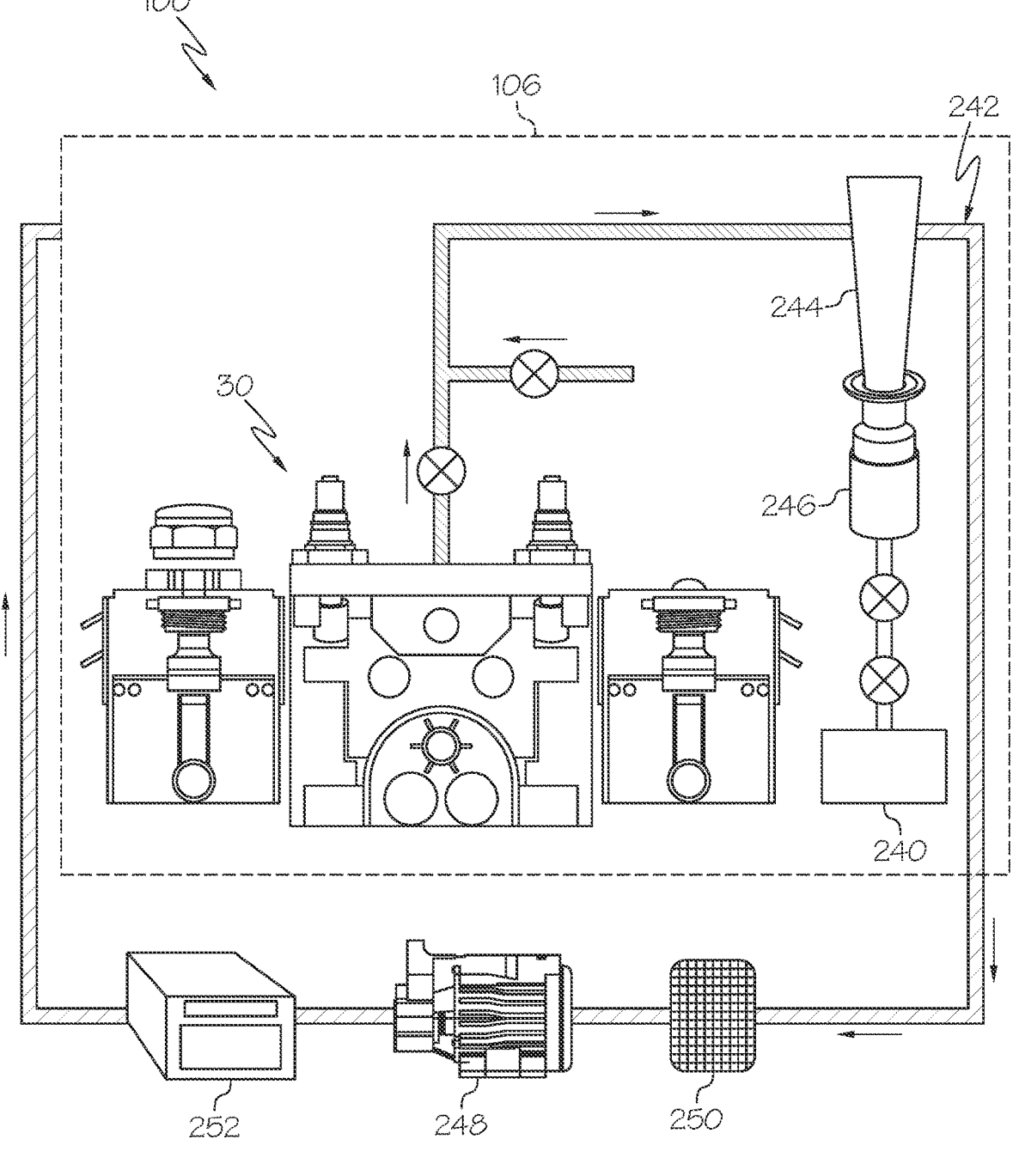
FIG. 10 schematically depicts an illustrative reclamation system of the manufacturing system of FIG. 1, according to one or more embodiments shown and described herein.

Referring to FIG. 10, a schematic diagram of a recoat build material reclamation system 242 is schematically depicted. The recoat build material reclamation system 242 is in communication with the dosing hopper 240 and the recoat assembly 30. In embodiments, the recoat build material reclamation system 242 includes a separation unit 244, and may in some embodiments include a collection unit 246 positioned between the separation unit 244 and the dosing hopper 240. In embodiments, the separation unit 244 is structurally configured to separate build material 10 (FIG. 1) from gas passed to the separation unit 244 from the recoat assembly 30. The separation unit 244 may include any suitable device for separating build material 10 (FIG. 1) from a gas, and may include a cyclonic separator or the like. In some embodiments, build material 10 (FIG. 1) from the separation unit 244 may be passed to the collection unit 246 and may reside in the collection unit 246 before moving to the dosing hopper 240. While in the embodiment depicted in FIG. 10 includes the collection unit 246, it should be understood that this is merely an example, and in some embodiments, build material 10 (FIG. 1) may pass directly from the separation unit 244 to the dosing hopper 240. Furthermore, in some embodiments, the separation unit 244 may be coupled to the conveyance hopper 260 (FIG. 9).

In the embodiment depicted in FIG. 10, the recoat build material reclamation system 242 further includes a reclamation pump 248, a reclamation filter 250, and a cooling unit 252. In embodiments, the reclamation pump 248 may draw gas and/or build material 10 (FIG. 1) from the recoat assembly 30 to the separation unit 244, and may draw gas from the separation unit 244 to the reclamation pump 248. In embodiments, the reclamation pump 248 may also drive gas back to the build enclosure 106. The reclamation filter 250 may generally restrict the flow of build material 10 (FIG. 1) through the reclamation filter 250 and may be positioned between the separation unit 244 and the reclamation pump 248. Accordingly, the reclamation filter 250 may restrict the flow of build material 10 (FIG. 1) from the separation unit 244 to the reclamation pump 248.

In embodiments, the cooling unit 252 is positioned between the reclamation pump 248 and the build enclosure 106 and may cool gas passed from the reclamation pump 248 to the build enclosure 106. The cooling unit 252, in embodiments, may include any suitable device for removing thermal energy from gas passed through the cooling unit 252, and may include a heat exchanger or the like. The pump 248 may pass gasses through the cooling unit 252 back to the build enclosure 106. In some embodiments, the recoat build material reclamation system 242 further includes one or more valves that may selectively direct gas and/or build material through the recoat build material reclamation system 242.

Referring to FIG. 11, a perspective view of the dosing hopper 240 is schematically depicted. In embodiments, the dosing hopper 240 is in communication with the conveyance hopper 260 (FIG. 7) through the valve 290. In some embodiments, the dosing hopper 240 includes a housing 241, a dosing vent 254, an agitation device 272, a gate valve 258, and a dosing level sensor 270.

In embodiments, the gate valve 258 is positioned between the housing 241 of the dosing hopper 240 and the interior space 116 (FIG. 3). The gate valve 258 may be coupled to one or more gate valve actuators 259 that move the gate valve 258 between an open position, in which build material 10 (FIG. 1) within the dosing hopper 240 is movable to the interior space 116 (FIG. 3), and a closed position, in which the build material 10 (FIG. 1) within the dosing hopper 240 is restricted from moving to the interior space 116 (FIG. 3). Accordingly, the dosing hopper 240 may be in selective communication with the interior space 116 (FIG. 3) through the gate valve 258. While the embodiment depicted in FIG.

11 includes the gate valve 258, it should be understood that this is merely an example, and embodiments described herein may not have a gate valve 258.

In embodiments, the dosing level sensor 270 is structurally configured to detect an amount of build material 10 (FIG. 1) within the dosing hopper 240. The dosing level sensor 270 may include any suitable sensor for detecting a level of build material 10 (FIG. 1) within the dosing hopper 240 and may include, for example and without limitation, ultrasonic sensors, capacitance sensors, float sensors, conductive sensors, optical sensors, microwave sensors, and/or the like. In some embodiments, build material 10 (FIG. 1) may be moved from the conveyance hopper 260 (FIG. 9) in response to determining that an amount of build material (FIG. 1) within the dosing hopper 240 is below a configurable threshold, for example, via the dosing level sensor 270.

The agitation device 272, in embodiments, is structurally configured is structurally configured to vibrate and/or agitate the dosing hopper 240, and accordingly agitate build material 10 (FIG. 1) within the dosing hopper 240, which may assist in encouraging the flow of build material 10 (FIG. 1) out of the dosing hopper 240. The agitation device 272 may include and may include a vibration device or the like.

The dosing vent 254, in embodiments, is in communication with an interior of the housing 241, and gases may pass through the dosing vent 254, for example, as build material (FIG. 1) passes out of the dosing hopper 240. By passing gas through the dosing vent 254 as build material 10 (FIG. 1) passes out of the dosing hopper 240, vacuum pressure and/or voids may be reduced, thereby assisting in ensuring the flow of build material 10 out of the dosing hopper 240. In some embodiments, the dosing vent 254 may include a vent filter 256 that resists the passage of particulate matter (e.g., build material 10 (FIG. 1)) through the vent filter 256 and accordingly the dosing vent 254. In some embodiments, gases may be introduced via the dosing vent 254, for example from a pressurized source. For example, in some circumstances, build material 10 (FIG. 1) may be reactive, and it may be desirable to introduce inert gas into to the dosing hopper 240 via the dosing vent 254 to reduce the likelihood of reaction of the build material 10.

Figure 12:
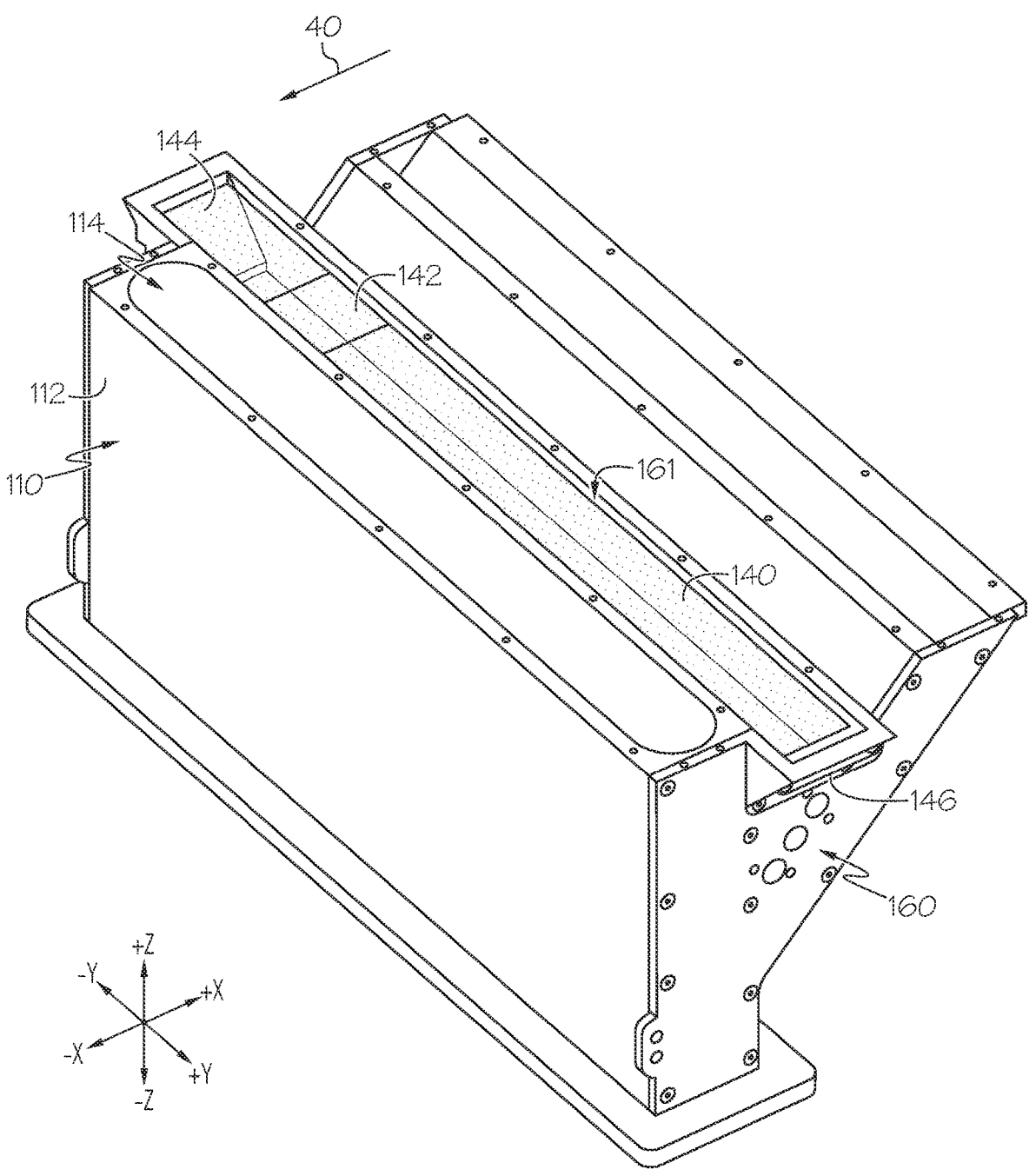
FIG. 12 schematically depicts a perspective view of an illustrative supply receptacle of the manufacturing system of FIG. 1, according to one or more embodiments shown and described herein.

Referring now to FIG. 12, a top perspective view of the excess return 160 is schematically depicted. In embodiments, a width of the excess return 160, evaluated in a direction transverse to a coating direction 40 of the recoat assembly 30 (FIG. 1) (e.g., in the y-direction of the coordinate axis depicted in FIG. 12) is greater than a width of the supply receptacle 110 evaluated in a direction transverse to the coating direction 40 of the recoat assembly 30 (FIG. 1). More particularly, a width of the upwardly-facing return opening 161 of the excess return 160 evaluated in a direction transverse to the coating direction 40 of the recoat assembly 30 (FIG. 1) is greater than a width of the upwardly-facing receptacle opening 114 of the supply receptacle 110 evaluated in a direction transverse to the coating direction of the recoat assembly 30 (FIG. 1). In embodiments, a width of the upwardly-facing facing return opening 161 of the excess return 160 evaluated in a direction transverse to the coating direction of the recoat assembly 30 (FIG. 1) is greater than a width of the material spreading member 34 (FIG. 1) evaluated in a direction transverse to the coating direction 40 of the recoat assembly (FIG. 1) (e.g., in the direction of the y-direction of the coordinate axis depicted in FIG. 1). In embodiments, the excess return 160 may include a first angled portion 144 and a second angled portion 146. The first angled portion 144 may partially extend and angle downwardly (e.g., in the −z direction of the coordinate axes of FIG. 12). The second angled portion 146 may also partially extend and angle downwardly (e.g., in the −z direction of the coordinate axes of FIG. 12), assisting in the flow of build material 10 (FIG. 1) into the excess return 160.

In some embodiments, the excess return 160 may comprise a sieve 140 that covers the upwardly-facing return opening 161. In some embodiments, the sieve 140 extends over at least a portion of the length (e.g., in the direction of the x-axis of the coordinate axes of FIG. 12) and at least a portion of the width (e.g., in the direction of the y-axis of the coordinate axes of FIG. 12) of the upwardly-facing return opening 161. The sieve 140 may strain or remove contaminants from build material 10 (FIG. 1) prior to the build material 10 (FIG. 1) entering the excess return 160 through the upwardly-facing return opening 161. In other words, the sieve 140 may allow build material 10 (FIG. 1) to pass through the sieve 140 while restricting particulate matter, such as contaminants, from passing through the sieve 140. The excess return 160 may further comprise a sieve agitation device 142 that is coupled to or otherwise engaged with the sieve 140. The sieve agitation device 142 may be a mechanical vibrator, a pneumatic vibrator, an ultrasound transducer, or other device configured to agitate the sieve 140 to assist in moving build material 10 (FIG. 1) through the sieve 140. In embodiments, the sieve 140 may be angled with respect to the working surface 102 (FIG. 1) to assist in passing build material 10 (FIG. 1) through the sieve 140. For example, in some embodiments, the sieve 140 may be oriented to face away from the upwardly-facing receptacle opening 114 of the supply receptacle 110. In some embodiments, the sieve 140 may be oriented at an angle with respect to the working surface 102 between about 1 degree and 5 degrees. In some embodiments, the sieve 140 may be coupled to the working surface 102 and/or the excess return via through a damper or the like that may reduce vibration transferred to the excess return 160 and/or the supply receptacle 110. For example, the damper may reduce vibration transferred to the excess return 160 through the sieve 140 as the result of movement of the recoat assembly 30 (FIG. 1)

Referring now to FIGS. 1-3 and 13-30, the application of build material 10 to the build area 104 will be discussed. FIG. 13 schematically depicts a sectional view of the supply receptacle 110. Referring now to FIGS. 1-3 and 13, particularly, the supply receptacle 110 includes a build material pile 14 supported on the delivery surface 132 of the piston 130. In embodiments, the processor 302 of the controller 300 may direct the piston actuator 136 to move the piston 130 downward (e.g., in the −z direction of the coordinate axes of FIG. 13) within supply receptacle 110 such that the delivery surface 132 is positioned beneath (e.g., in the −z direction of the coordinate axes of FIG. 13) at least one of the supply intersection 154 and the return intersection 162. As discussed with reference to FIG. 3, build material 10 may then be supplied from the excess return 160 and/or the dosing hopper 240 the delivery surface 132 of the piston 130. The processor 302 of the controller 300 may direct the piston actuator 136 to move the piston 130 upwardly (e.g., in the +z direction of the coordinate axes of FIG. 13) such that a first amount of build material 10 of the build material pile 14 is positioned above the working surface 102, as depicted in FIG. 13.

Referring now to FIGS. 1-3 and 14, particularly, after the first amount of build material 10 of the build material pile 14 is positioned above the working surface 102, the processor 302 of the controller 300 may direct the recoat actuator 32 to move the recoat assembly 30 in a return direction 42 such that the recoat assembly 30 is positioned between (e.g., in the direction of the x-axis of the coordinate axes of FIG. 14) the excess return 160 and the dosing hopper 240 along the working surface 102. Therefore, the material spreading member 34 of the recoat assembly 30 moves over both the upwardly-facing receptacle opening 114 of the supply receptacle 110 and the upwardly-facing return opening 161 in the return direction 42. By doing so, the material spreading member 34 may move the first amount of build material 10 of the build material pile 14 that is exposed from the upwardly-facing receptacle opening 114 and above the working surface 102 from the build material pile 14 and into the excess return 160, as depicted in FIG. 14. The removed build material 10 that is moved into the excess return 160 then settles within the excess return 160. In some embodiments and as depicted in FIG. 14, the build material 10 within the excess return 160 is restricted from flowing back into the supply receptacle 110 by at least one of the build material pile 14 and the one or more piston perimeter surfaces 134 which may at least partially obstruct communication between the excess return 160 and the interior space 116.

Following the removal of the initial amount of exposed build material 10 from the build material pile 14, the build material pile 14 may be smoothed such that a uniform and evenly-distributed build material pile 14 is supported on the piston 130, as depicted in FIG. 14. Furthermore, the build material pile 14 is smoothed such that the top of the build material pile 14 is flush with the working surface 102. Therefore, a known and evenly-distributed amount of build material 10 is in the build material pile 14, bounded within the delivery surface 132 of the piston 130, the working surface 102 and/or the upwardly-facing receptacle opening 114, and the one or more supply receptacle sidewalls 112. In this way, by uniformly smoothing the build material pile 14, the piston 130 may be actuated to expose predetermined, repeatable amounts of build material 10 from the upwardly-facing receptacle opening 114. In other words, by actuating the piston 130 upwardly (e.g., in the +z direction of the coordinate axes of FIG. 14) by a predetermined distance, a predetermined amount of the build material pile 14 may be exposed from the upwardly-facing receptacle opening 114 above the working surface 102.

Figure 16:
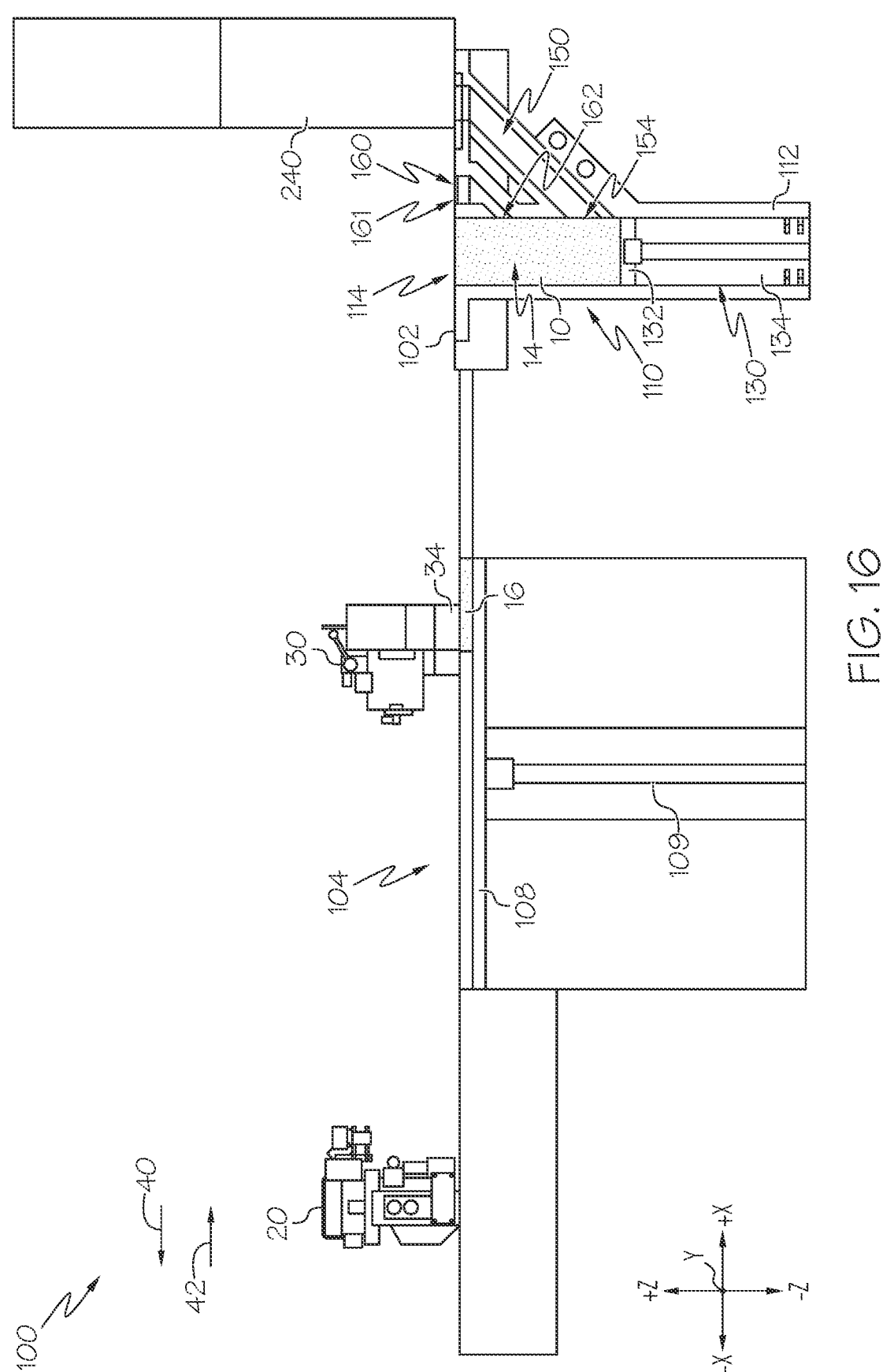
FIG. 16 schematically depicts a side view of the recoat assembly including the material spreading member of FIG. 15 moving build material to a build area of the manufacturing system, according to one or more embodiments shown and described herein.
Figure 17:
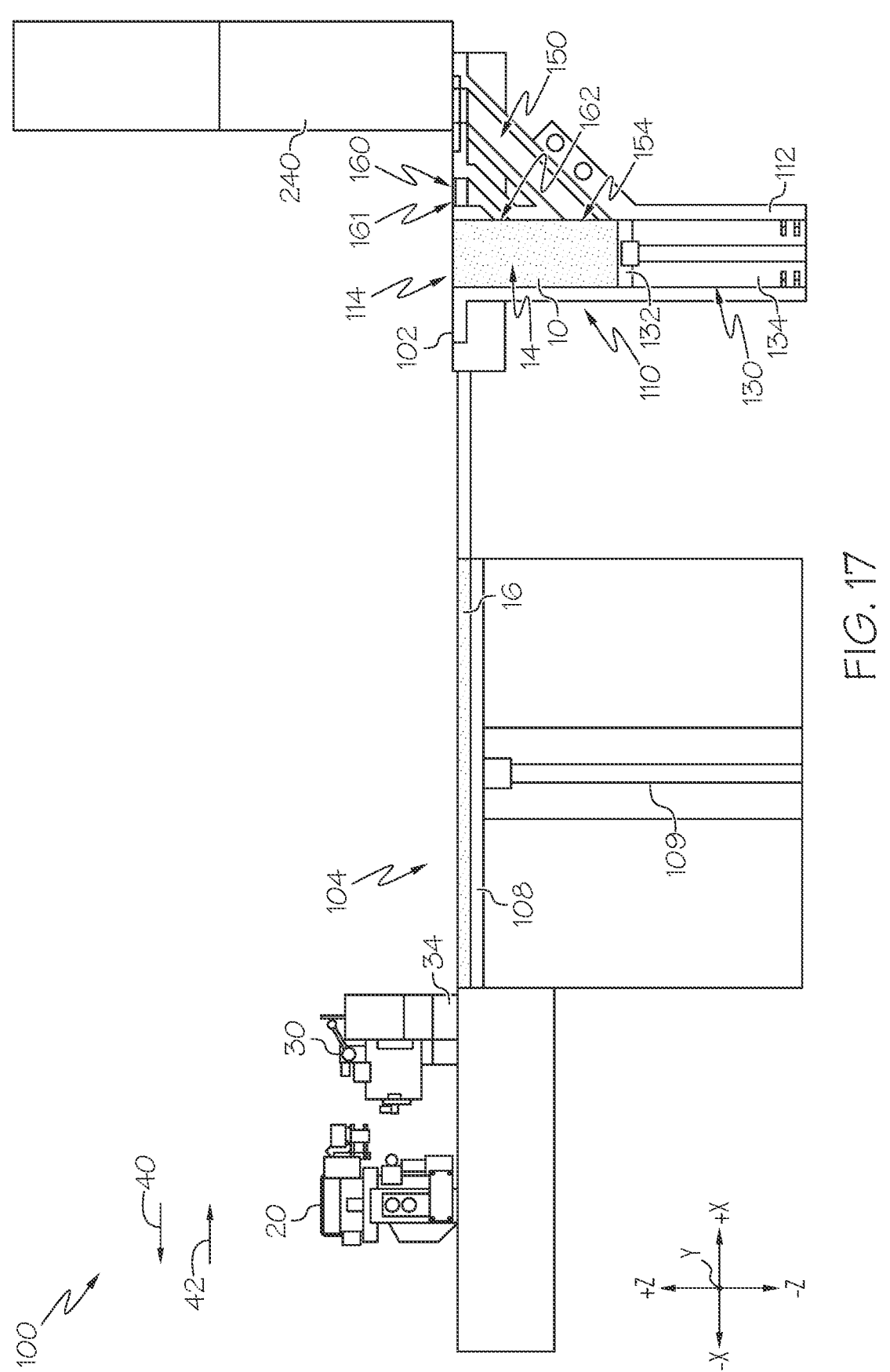
FIG. 17 schematically depicts a side view of the recoat assembly of FIG. 16 further moving build material to the build area, according to one or more embodiments shown and described herein.
Figure 18:
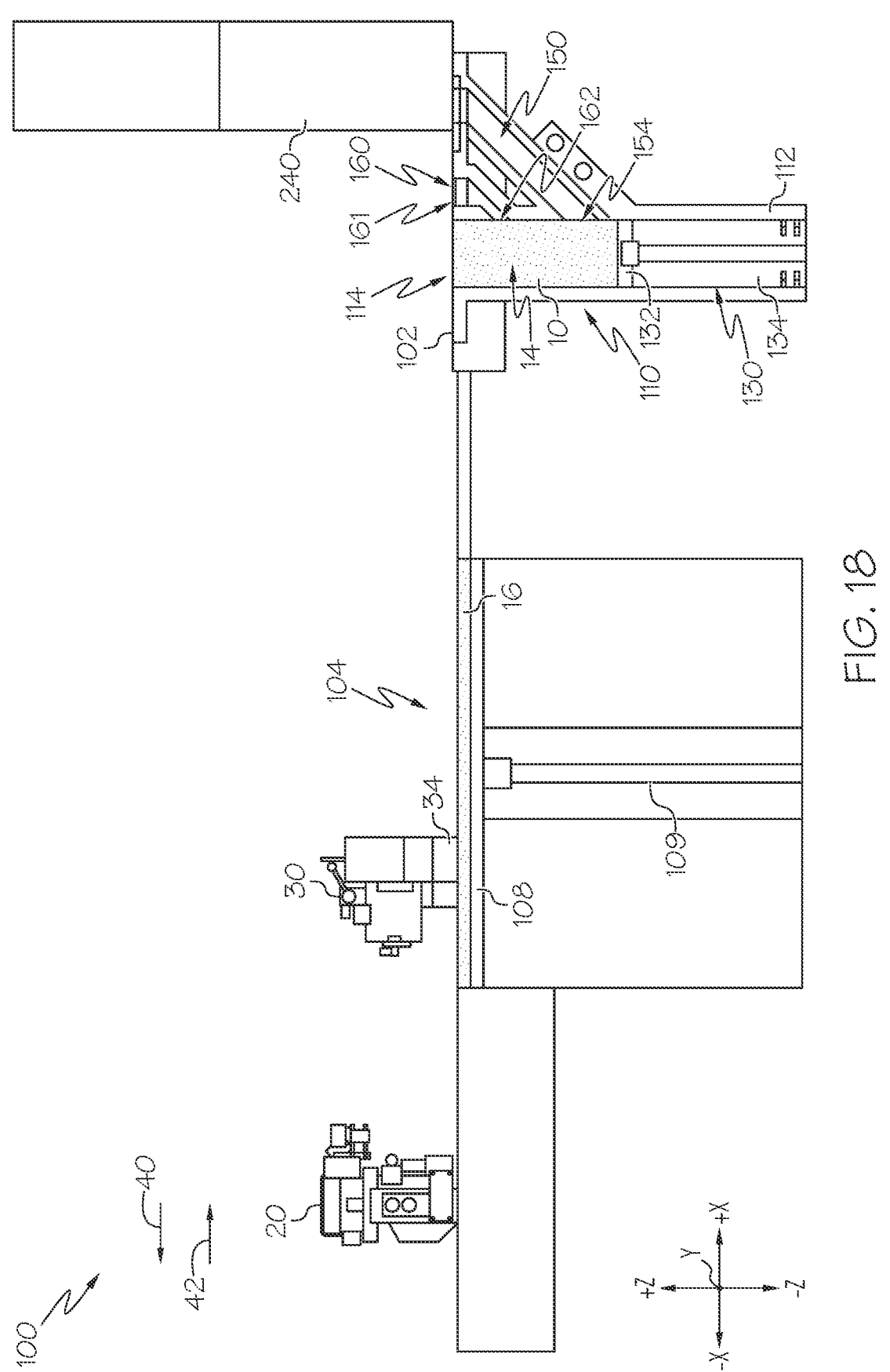
FIG. 18 schematically depicts a side view of the recoat assembly of FIG. 16 moving back to the supply receptacle, according to one or more embodiments shown and described herein.
Figure 19:
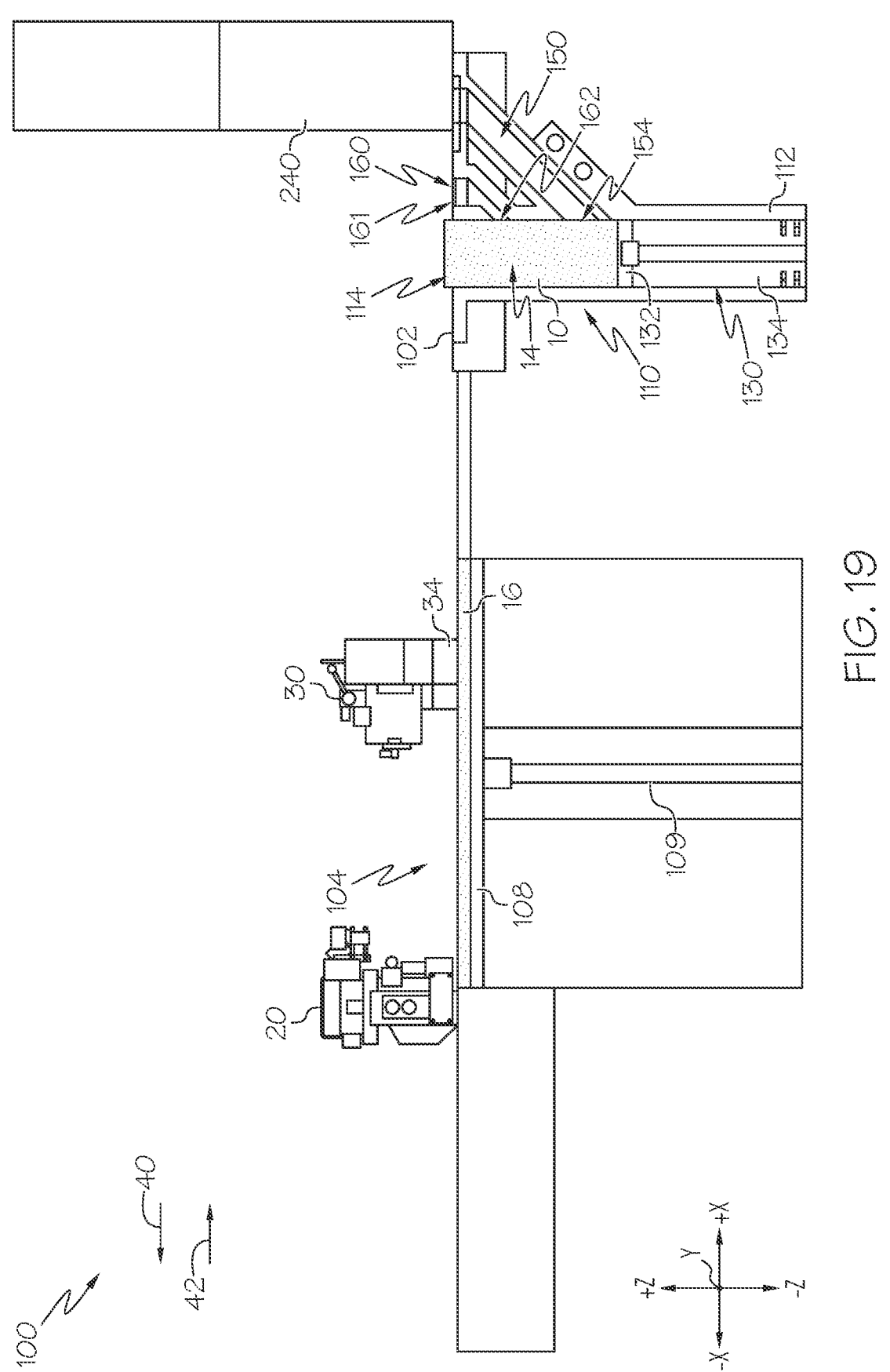
FIG. 19 schematically depicts a side view of an illustrative print assembly of the manufacturing system of FIG. 1 moving to the build area, according to one or more embodiments shown and described herein.
Figure 20:
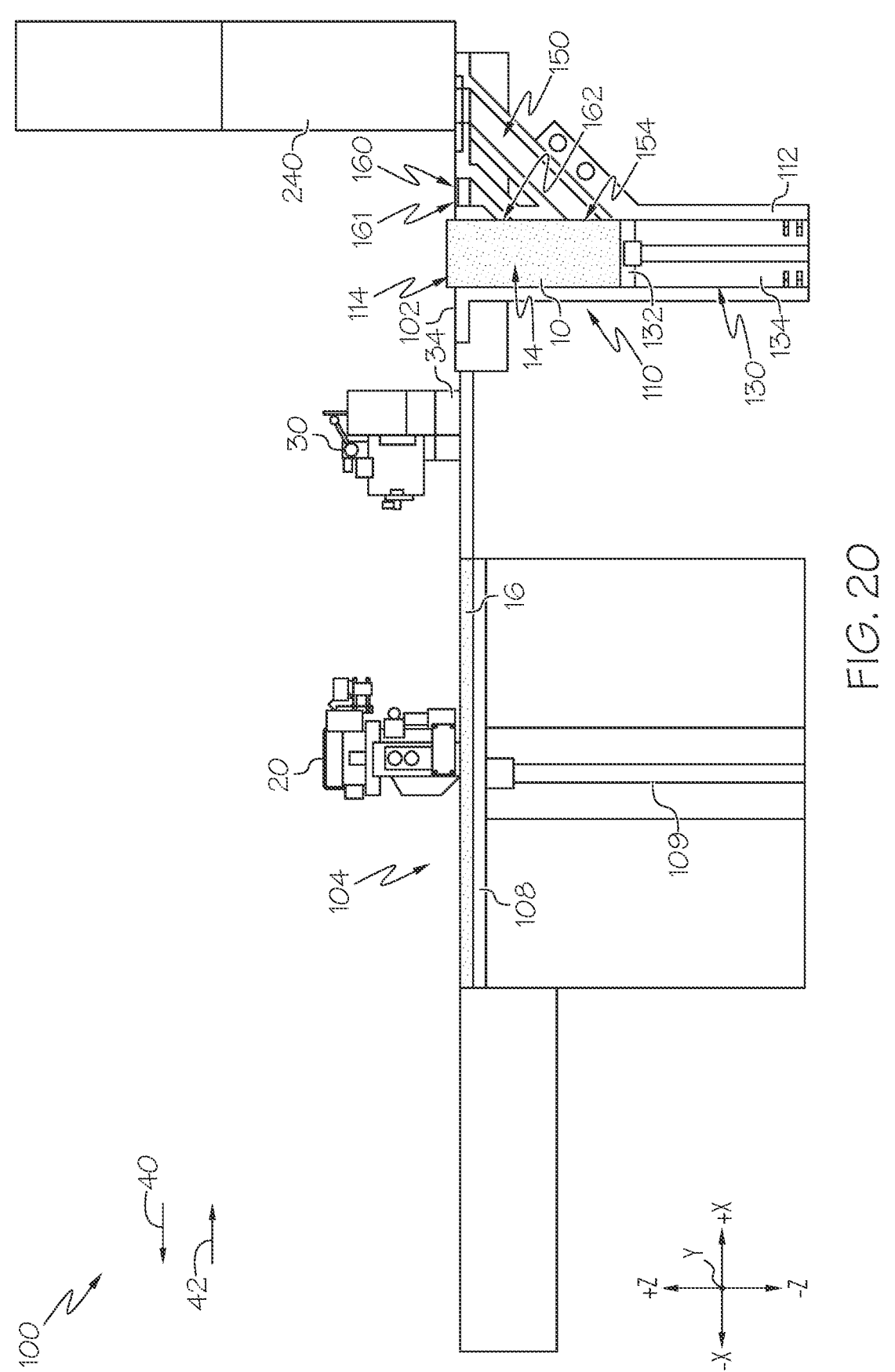
FIG. 20 schematically depicts the print assembly of FIG. 19 moving further over the build area, according to one or more embodiments shown and described herein.

Following the smoothing of the build material pile 14, in embodiments, the processor 302 of the controller 300 may direct the piston actuator 136 to move the piston 130 upwardly (e.g., in the +z direction of the coordinate axes of FIG. 14) a known distance. The amount of build material 10 of the build material pile 14 exposed may be associated with the amount of build material 10 required to cover the build area 104 with a layer of build material 10 of a desired thickness. In some embodiments, the amount of build material 10 of the build material pile 14 may be at least about 12.5 cubic centimeters of build material. In some embodiments, the amount of build material 10 of the build material pile 14 may be at least about 25 cubic centimeters of build material. In some embodiments, the amount of build material 10 of the build material pile 14 exposed may be the amount of build material 10 required to cover the build area 104 with a layer of build material 10 of a desired thickness and additionally a known excess or overdose amount of build material 10. Referring now to FIGS. 1-3 and 15, particularly, the processor 302 may direct for the lowering of the build platform 108 a known distance so as to receive a layer of build material 10 of desired thickness in the build area 104. The processor 302 of the controller 300 may also direct the recoat actuator 32 to move the recoat assembly 30 from a position between the excess return 160 and the dosing hopper 240 in a coating direction 40. The recoat assembly 30, and particularly the material spreading member 34 of the recoat assembly 30, then move across the upwardly-facing receptacle opening 114 of the supply receptacle 110, and may engage and spread the exposed amount of build material 10 of the build material pile 14 across the build area 104, as depicted in FIGS. 16 and 17. Referring to FIGS. 1-3, 16, and 17 particularly, the recoat assembly 30 moves across the build area 104 in the coating direction 40, spreading the exposed amount of build material of the build material pile 14 as a first layer 16 supported in the build area 104.

Referring now to FIGS. 1-3 and 18, after the recoat assembly 30 moves across the build area 104 in the coating direction 40, the processor 302 of the controller 300 may direct the recoat actuator 32 to move the recoat assembly 30 in the return direction 42. Therefore, the recoat assembly 30, and particularly the material spreading member 34, move back across the build area 104 towards the excess return 160. In some embodiments, the material spreading member 34 may remove excess build material 10 from the first layer 16 in the build area 104 as the material spreading member 34 moves in the return direction 42.

Referring now to FIGS. 1-3, 19, and 20, as the recoat assembly 30 moves across the build area 104 in the return direction 42, the processor 302 of the controller 300 may direct the print assembly actuator 22 to move the print assembly 20 across the build area 104 in the return direction 42. In other words, the print assembly 20 may trail the recoat assembly 30 as the print assembly 20 and the recoat assembly 30 move in the return direction 42. As the print assembly moves over the build area 104 in the return direction 42, the print assembly 20 may dispense a binder over select portions of the first layer 16 that correspond to a cross-sectional area of the three-dimensional object to be formed. In other embodiments, the print assembly 20 may consolidate select portions of the first layer 16 with an electron beam, laser, or other energy source. In such embodiments, it should be appreciated that the entire print assembly 20 may or may not move as discussed herein. For example, in some embodiments, the print assembly 20 may remain stationary and the emitted electron beam, for instance, may be directed to move across the build area 104.

Figure 21:
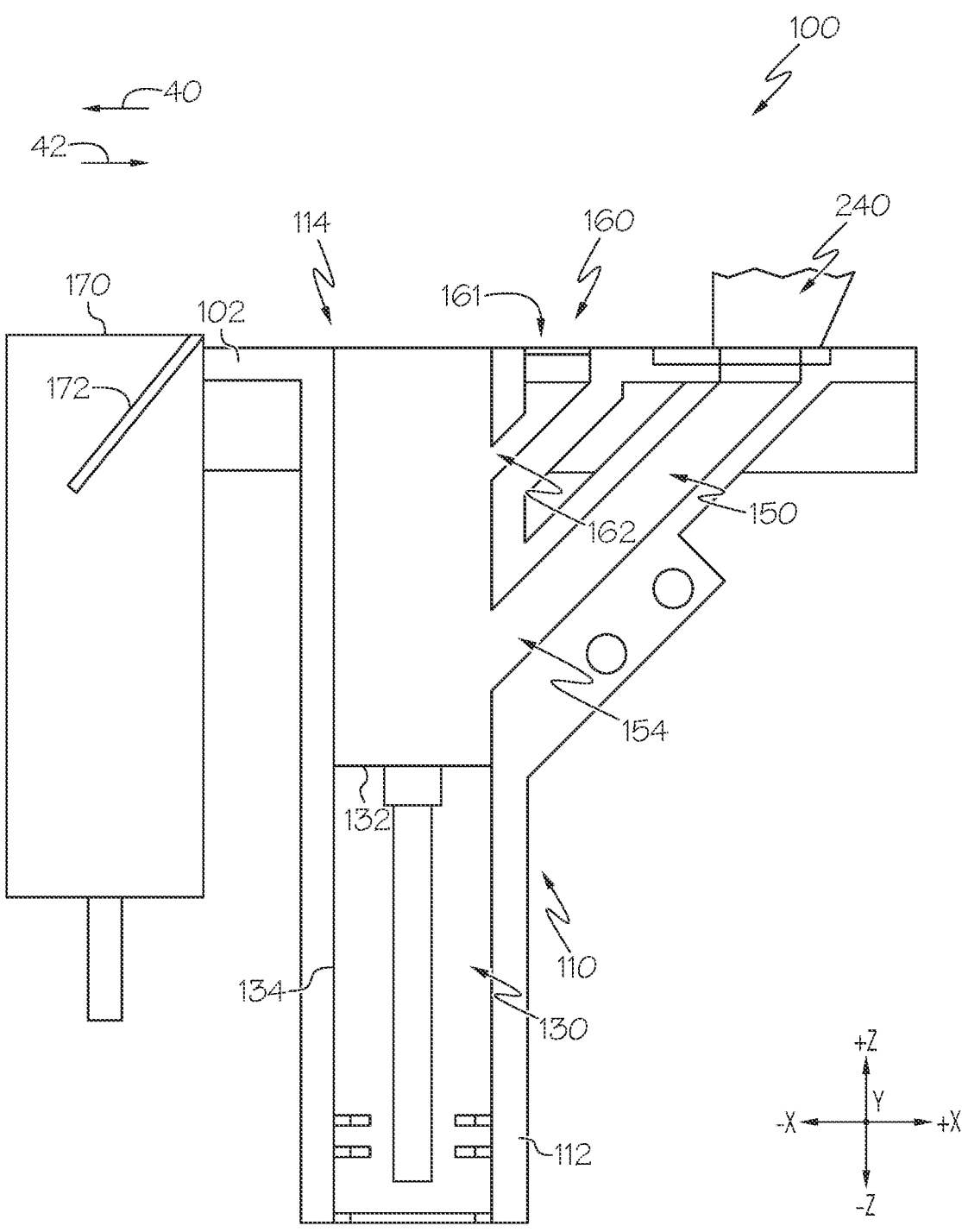
FIG. 21 schematically depicts a side section view of an illustrative contaminant receptacle of the manufacturing system of FIG. 1, according to one or more embodiments shown and described herein.
Figure 22:
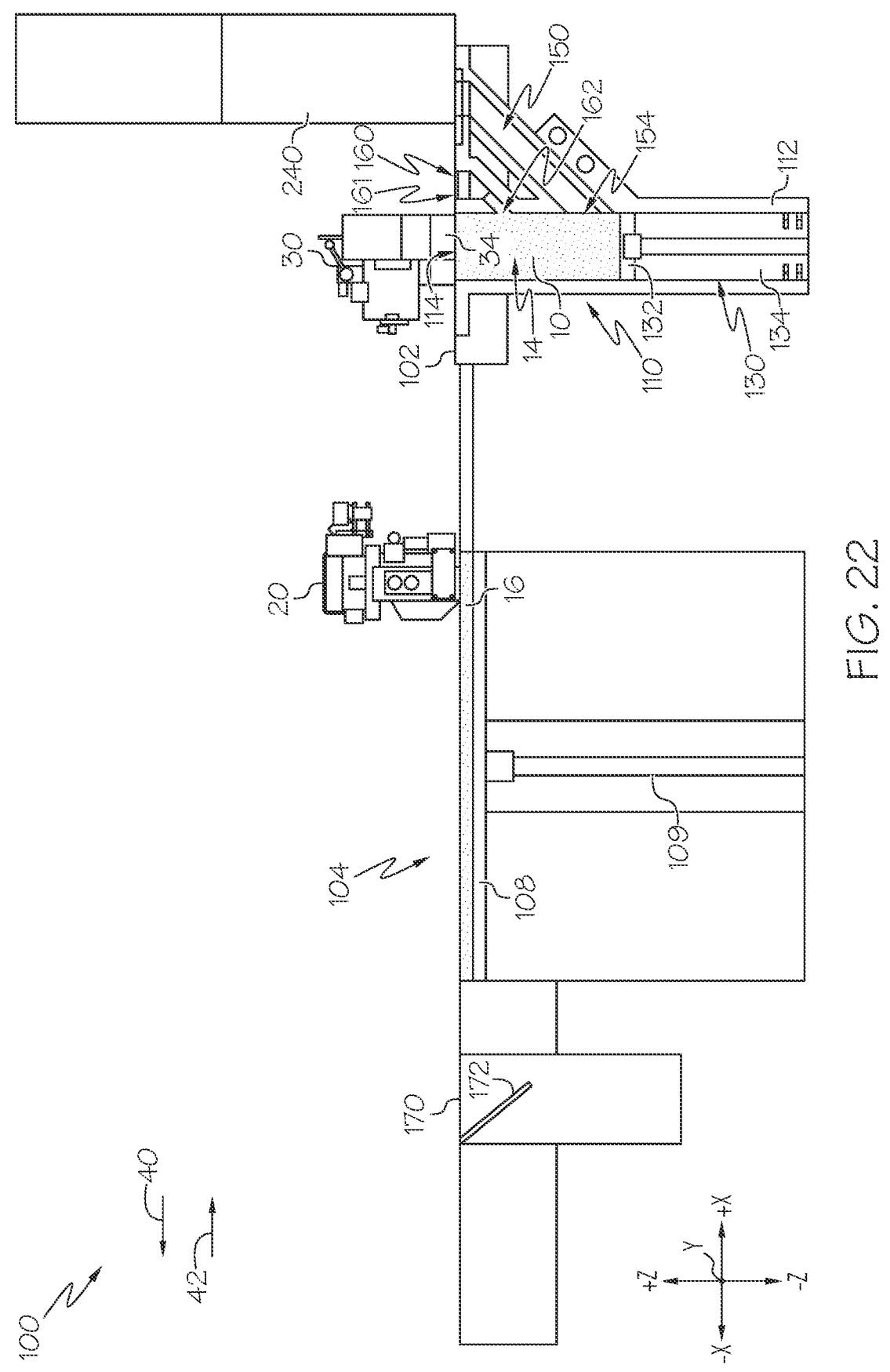
FIG. 22 schematically depicts a side view of the recoat assembly of the manufacturing system of FIG. 1 moving excess build material to the excess return, according to one or more embodiments shown and described herein.

Referring now to FIGS. 1-3, 21, and 22, in some embodiments, the manufacturing system 100 includes a contaminant receptacle 170. The contaminant receptacle 170 may be positioned along the working surface 102 between (e.g., in the direction of the x-axis of the coordinate axes of FIG. 21) the build area 104 and the supply receptacle 110. In some embodiments, such as depicted in FIG. 22 the contaminant receptacle 170 may be positioned along the working surface 102 such that the build area 104 is positioned between (e.g., in the direction of the x-axis of the coordinate axes of FIG. 22) the contaminant receptacle 170 and the supply receptacle 110. The manufacturing system 100 may further comprise an upwardly-facing trap door 172 that is positionable between a closed position, in which access to the contaminant receptacle 170 is restricted, and an open position, in which build material 10 is movable into the contaminant receptacle 170. More specifically, in the closed position, the upwardly-facing trap door 172 may be flush with the working surface 102 such that the material spreading member 34 of the recoat assembly 30 may move build material 10 over the upwardly-facing trap door 172 to and from the build area 104. In embodiments, the manufacturing system 100 may include the defect sensor 176 communicatively coupled to the controller 300. The defect sensor 176 may be a camera or any other suitable sensor to assess one or more properties of the build material 10 within the system. For instance, a single defect sensor 176 may be positioned within the manufacturing system 100 such that it can simultaneously collect information on build material 10 in the supply receptacle 110, on the build area 104, and on the working surface 102. In some embodiments, multiple defect sensors 176 may be employed in the manufacturing system 100, and each defect sensor 176 may be physically positioned within the manufacturing system 100 to collect information on build material 10 in the supply receptacle 110, on the build area 104, and on the working surface 102, respectively. The processor 302 of the controller 300 may receive a signal from the defect sensor 176 indicative of a defect within the build material 10 on or in at least one of the build area 104, the working surface 102, and the supply receptacle 110. The defect within the build material 10 may include a contaminant in the build material 10, a consolidated portion of build material 10 that does not define a volume of the three-dimensional object being formed, and/or the like. In response to receiving the signal, the processor 302 of the controller 300 may direct a trap door actuator 174 to move the upwardly-facing trap door 172 from the closed position to the open position. The processor 302 may then direct the recoat actuator 32 to move the recoat assembly 30 such that the material spreading member 34 directs the defective or contaminated build material 10 into the contaminant receptacle 170. For instance, in embodiments in which the contaminant receptacle 170 is positioned between the build area 104 and the supply receptacle 110, as shown in FIG. 21, if a defect is detected in build material 10 positioned on the build area 104, the recoat actuator 32 may move the recoat assembly 30 in the return direction 42 such that the material spreading member 34 directs the defect from the build area 104 to the contaminant receptacle 170. In embodiments in which the build area 104 is positioned between the contaminant receptacle 170 and the supply receptacle 110, as shown in FIG. 22, and a defect is detected in build material 10 positioned on the build area 104, the recoat actuator 32 may move the recoat assembly 30 in the coating direction 40 such that the material spreading member 34 directs defect from the build area 104 to the contaminant receptacle 170. As another example, if a defect is detected in build material 10 in the supply receptacle 110, the piston 130 may be actuated to expose the defective build material 10 from the upwardly-facing receptacle opening 114, and the recoat actuator 32 may move the recoat assembly 30 across the upwardly-facing receptacle opening 114 in the coating direction 40 such that the material spreading member 34 directs the defective build material 10 into the contaminant receptacle 170.

Figure 23:
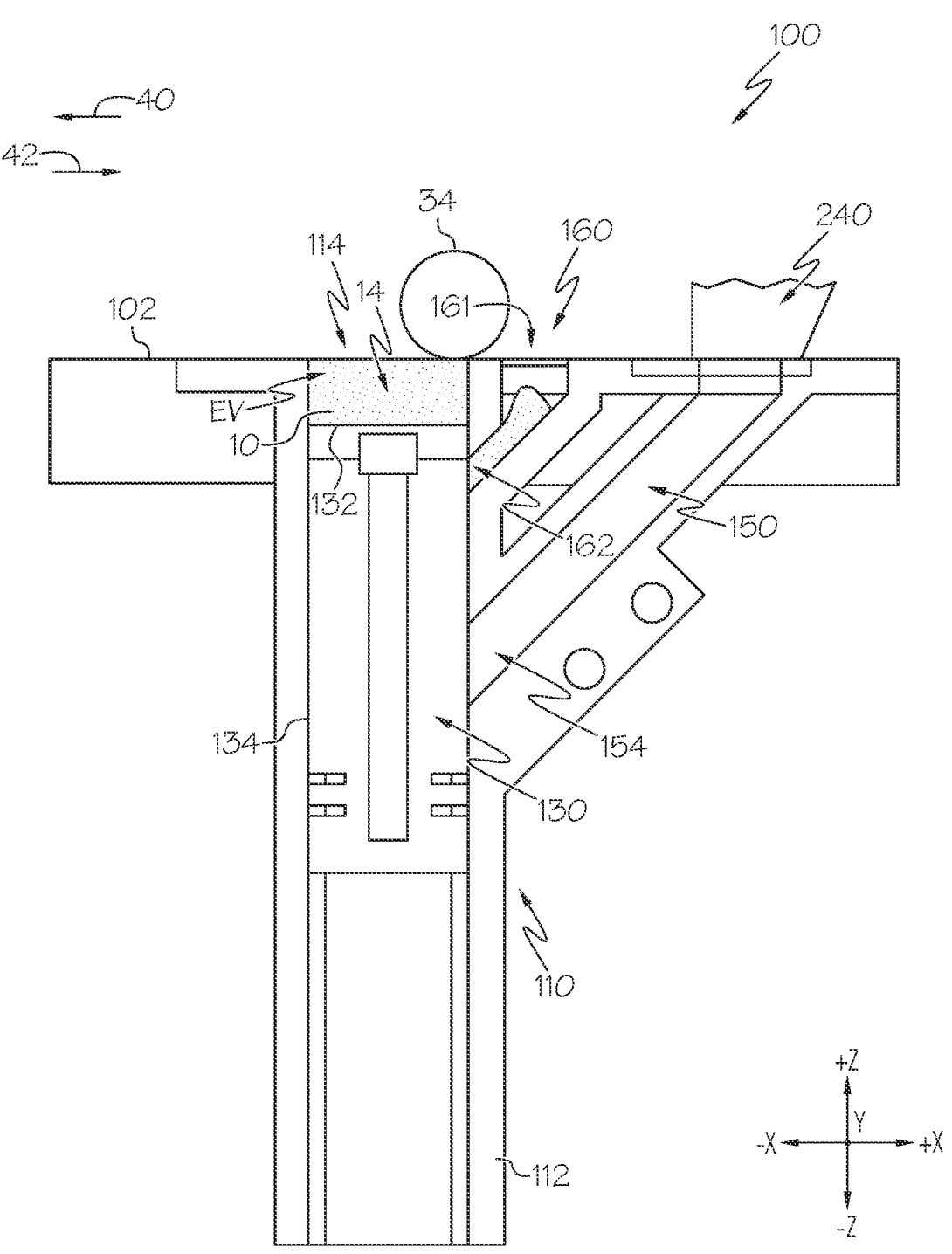
FIG. 23 schematically depicts a side section view of the material spreading member, the supply receptacle, and the excess return as the material spreading member moves excess build material to the excess return, according to one or more embodiments shown and described herein.
Figure 24:
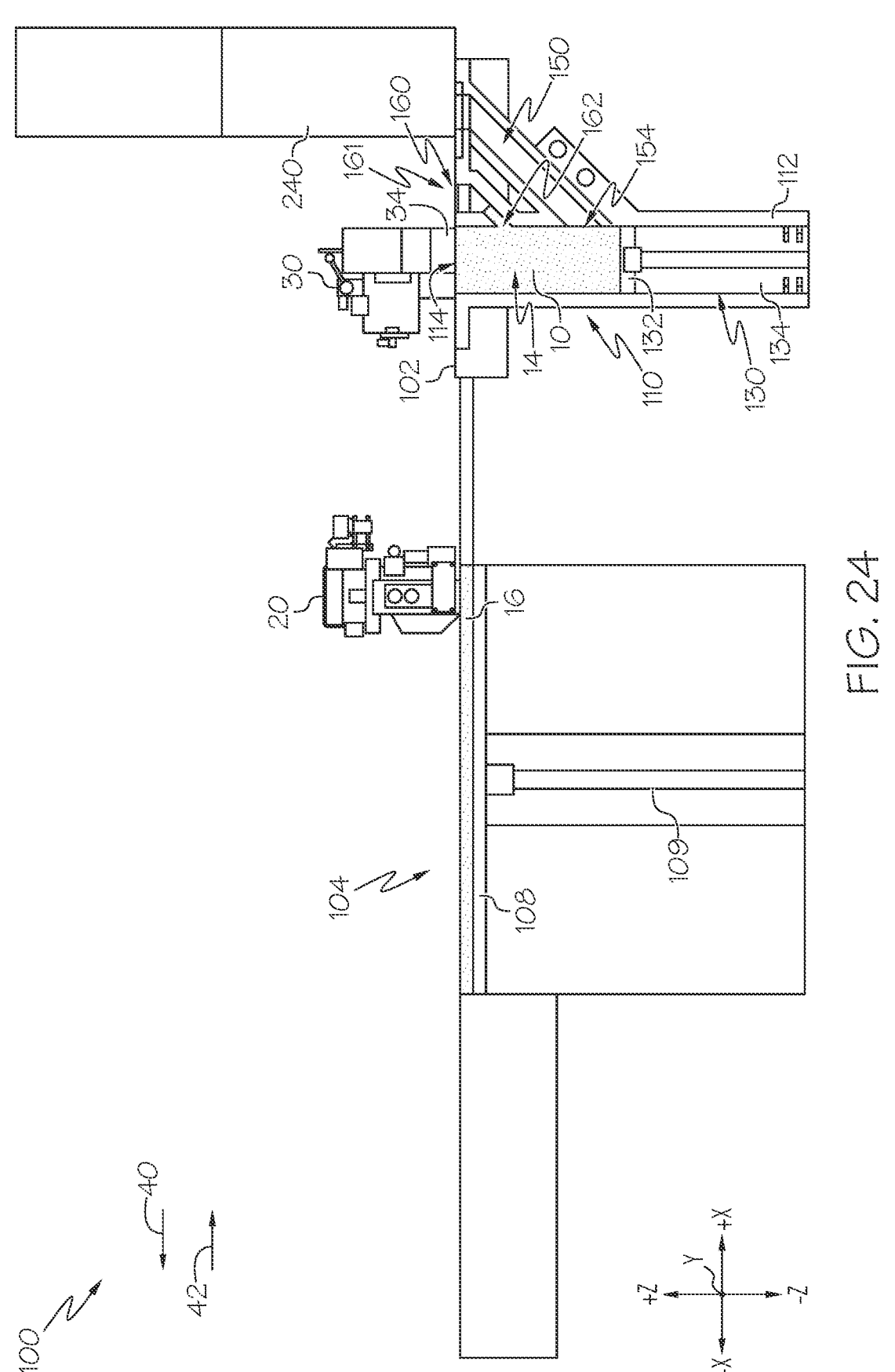
FIG. 24 schematically depicts a side view of the print assembly moving further across the build area with the recoat assembly positioned over the excess return, according to one or more embodiments shown and described herein.

Referring now to FIGS. 1-3 and 22-24, in embodiments, the processor 302 of the controller 300 may direct the recoat actuator 32 to continue to move the recoat assembly 30 in the return direction 42, such that the material spreading member 34 moves across the supply receptacle 110 and the excess return 160. By doing so, and as depicted in FIG. 23 particularly, the material spreading member 34 may direct the excess build material 10 from the first layer 16 in the build area 104 across the supply receptacle 110, which contains the build material pile 14 flush with the working surface 102, and into the excess return 160. The excess build material 10 that is moved into the excess return 160 then settles within the excess return 160. In the example depicted in FIG. 23, the build material 10 within the excess return may be prevented from flowing back into the supply receptacle 110 by at least one of the build material pile 14 and the one or more piston perimeter surfaces 134 which may at least partially obstruct communication between the excess return 160 and the interior space 116.

Figure 25:
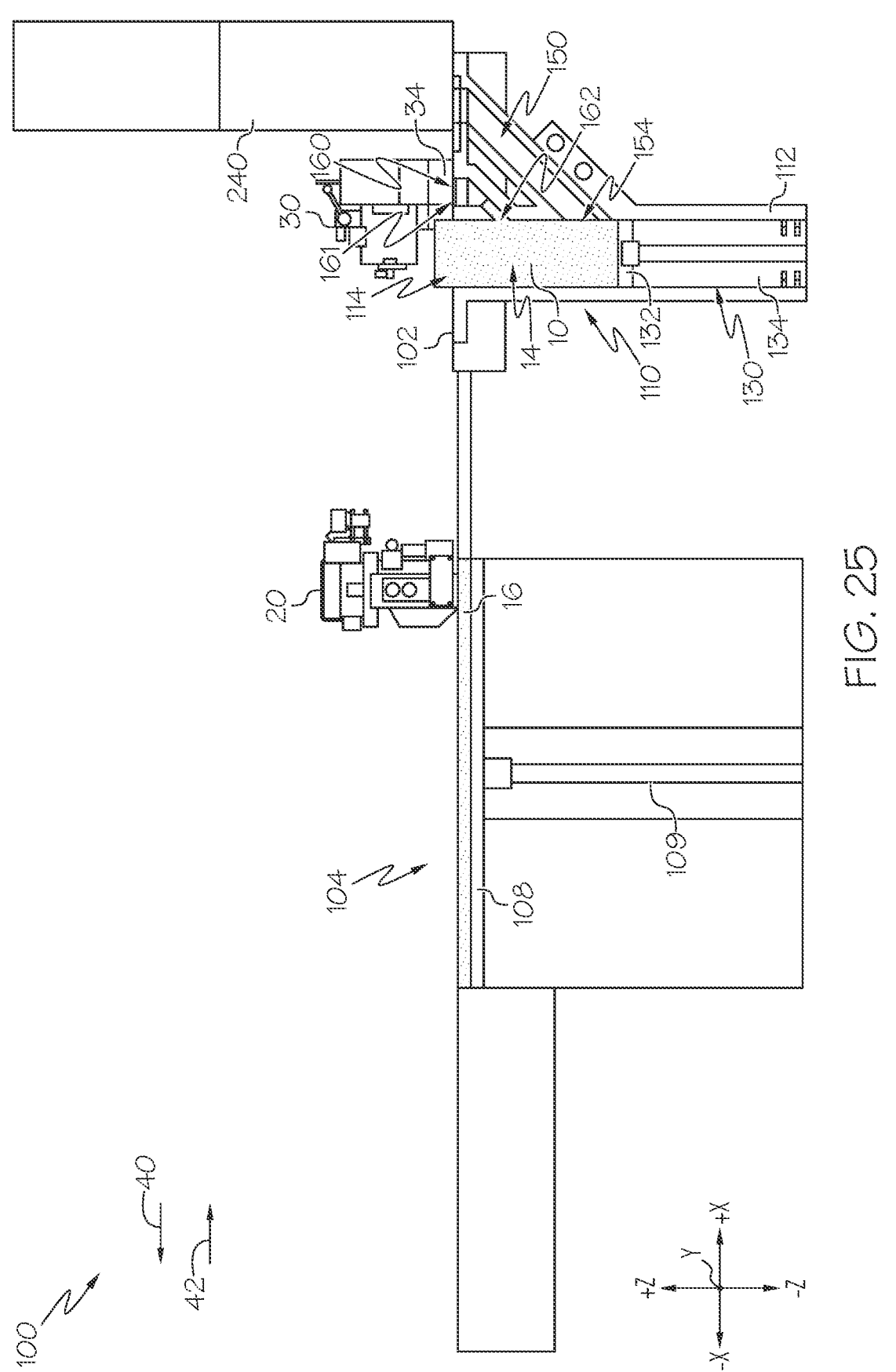
FIG. 25 schematically depicts a side view of the print assembly moving back over the build area and the piston moving build material above a working surface, according to one or more embodiments shown and described herein.
Figure 26:
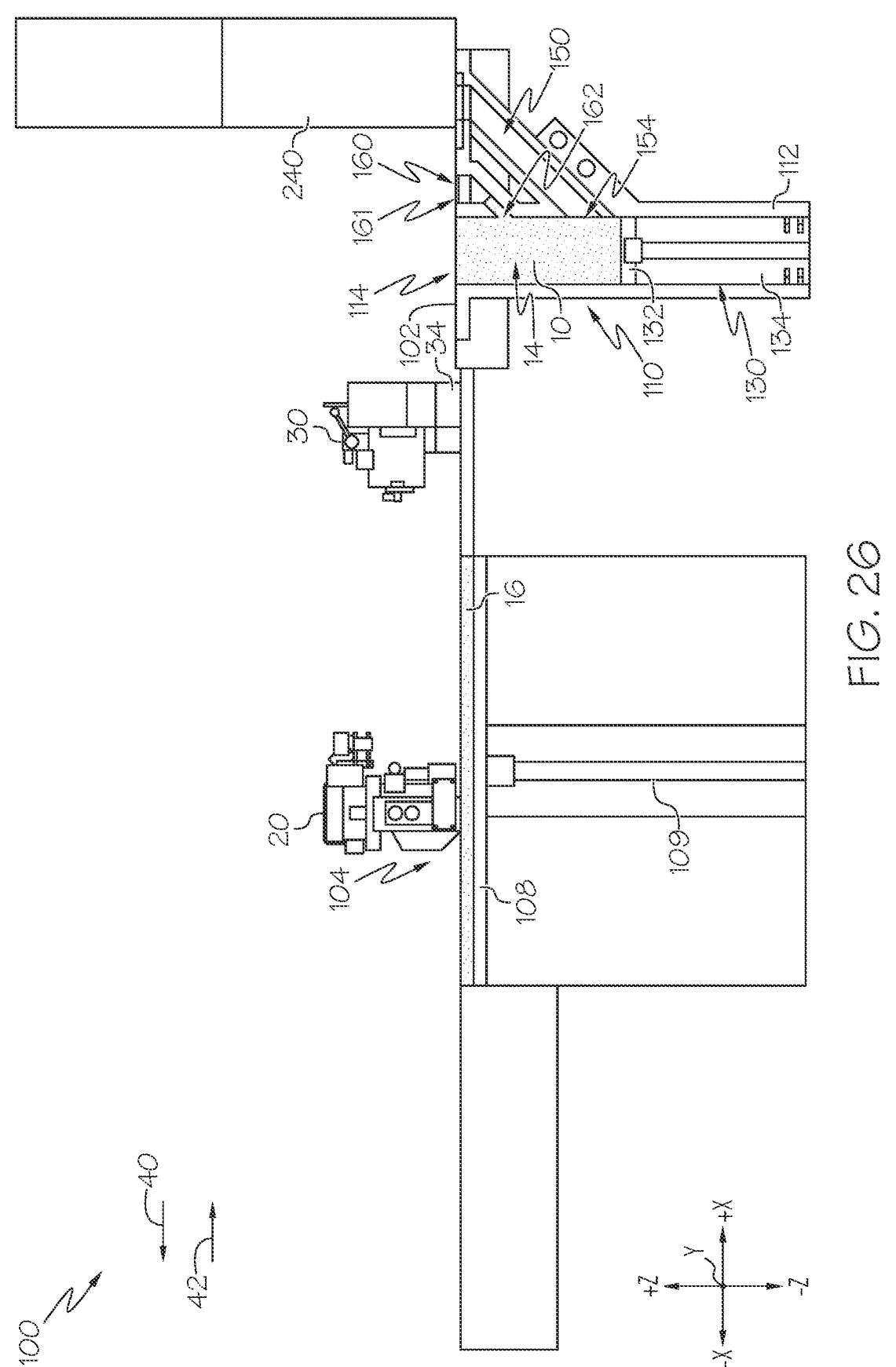
FIG. 26 schematically depicts a side view of the recoat assembly moving build material from the supply receptacle to the build area, according to one or more embodiments shown and described herein.
Figure 27:
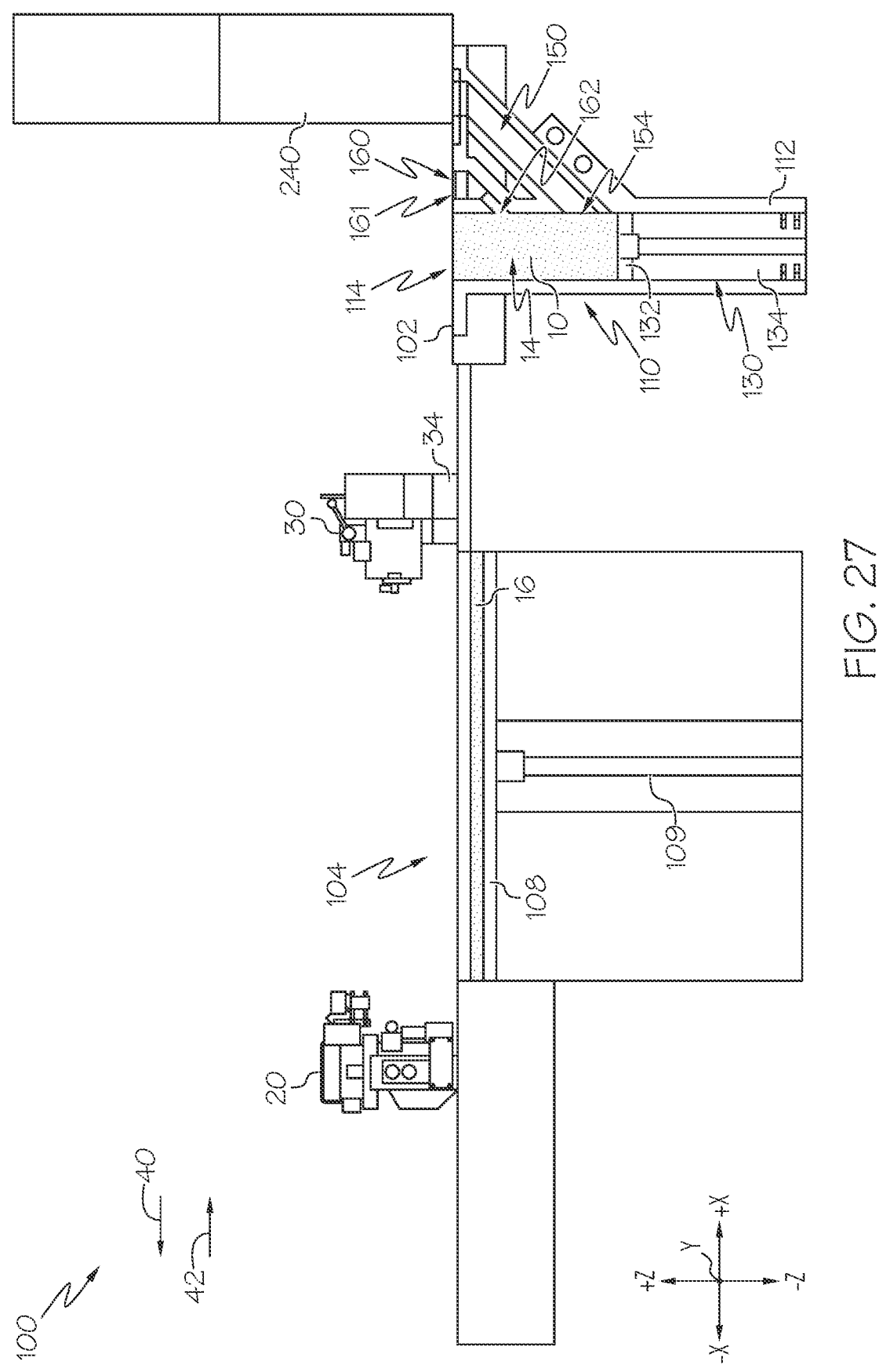
FIG. 27 schematically depicts a side view of the recoat assembly continuing to move build material from the supply receptacle to the build area, according to one or more embodiments shown and described herein.
Figure 28:
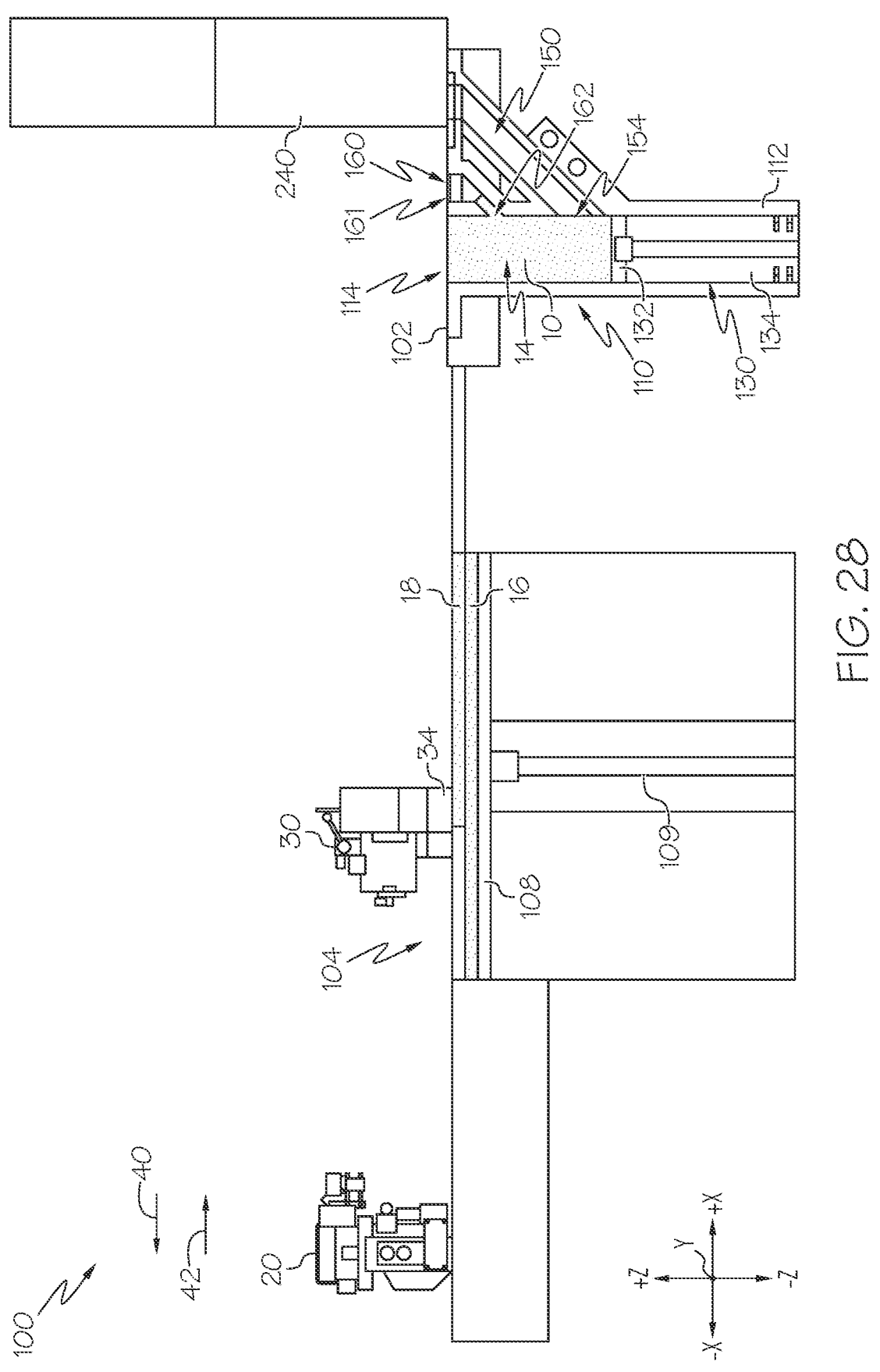
FIG. 28 schematically depicts a side view of the recoat assembly depositing another layer of build material to the build area, according to one or more embodiments shown and described herein.
Figure 29:
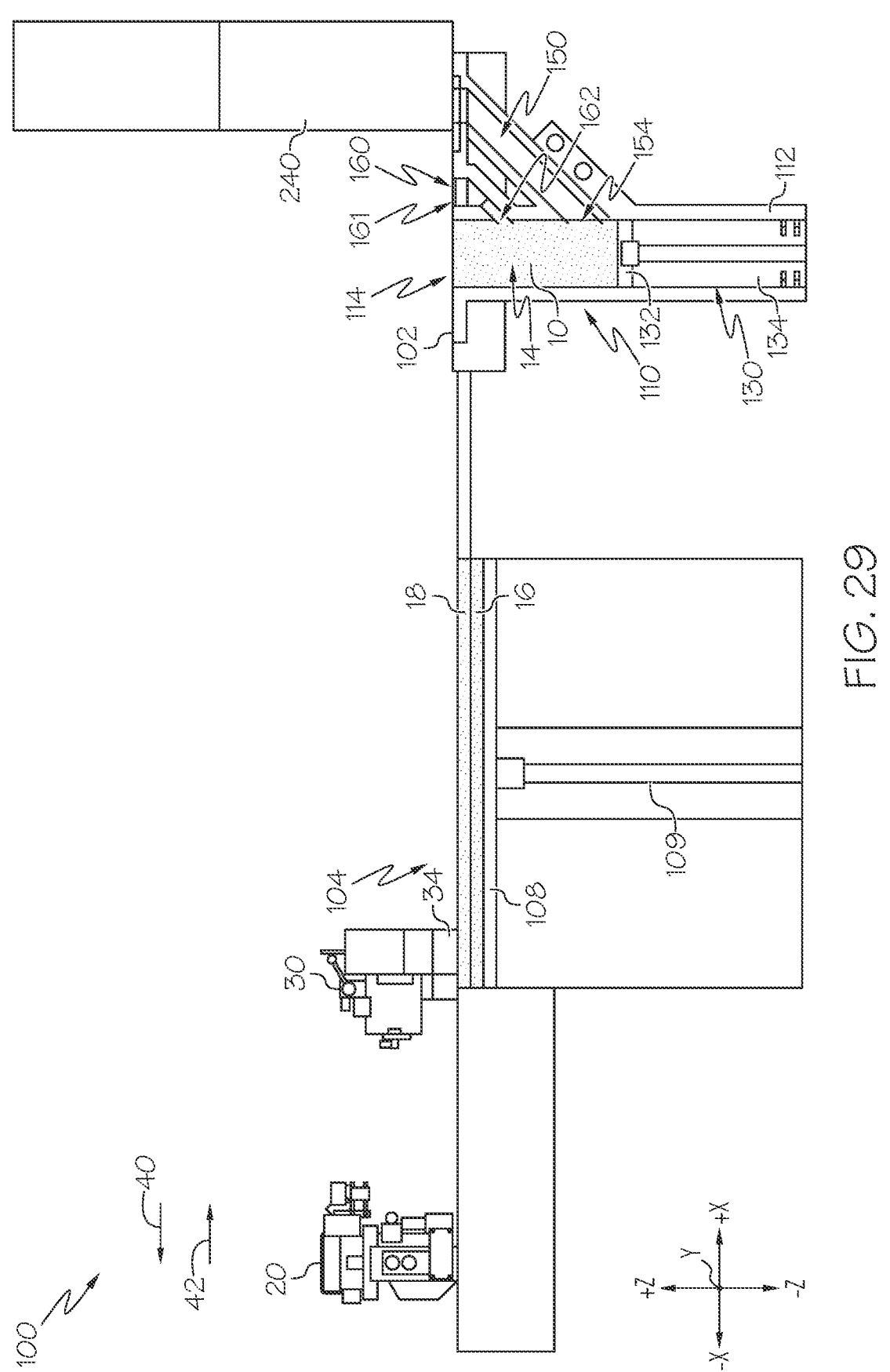
FIG. 29 schematically depicts a side view of the recoat assembly continuing to deposit the layer of build material to the build area, according to one or more embodiments shown and described herein.
Figure 30:
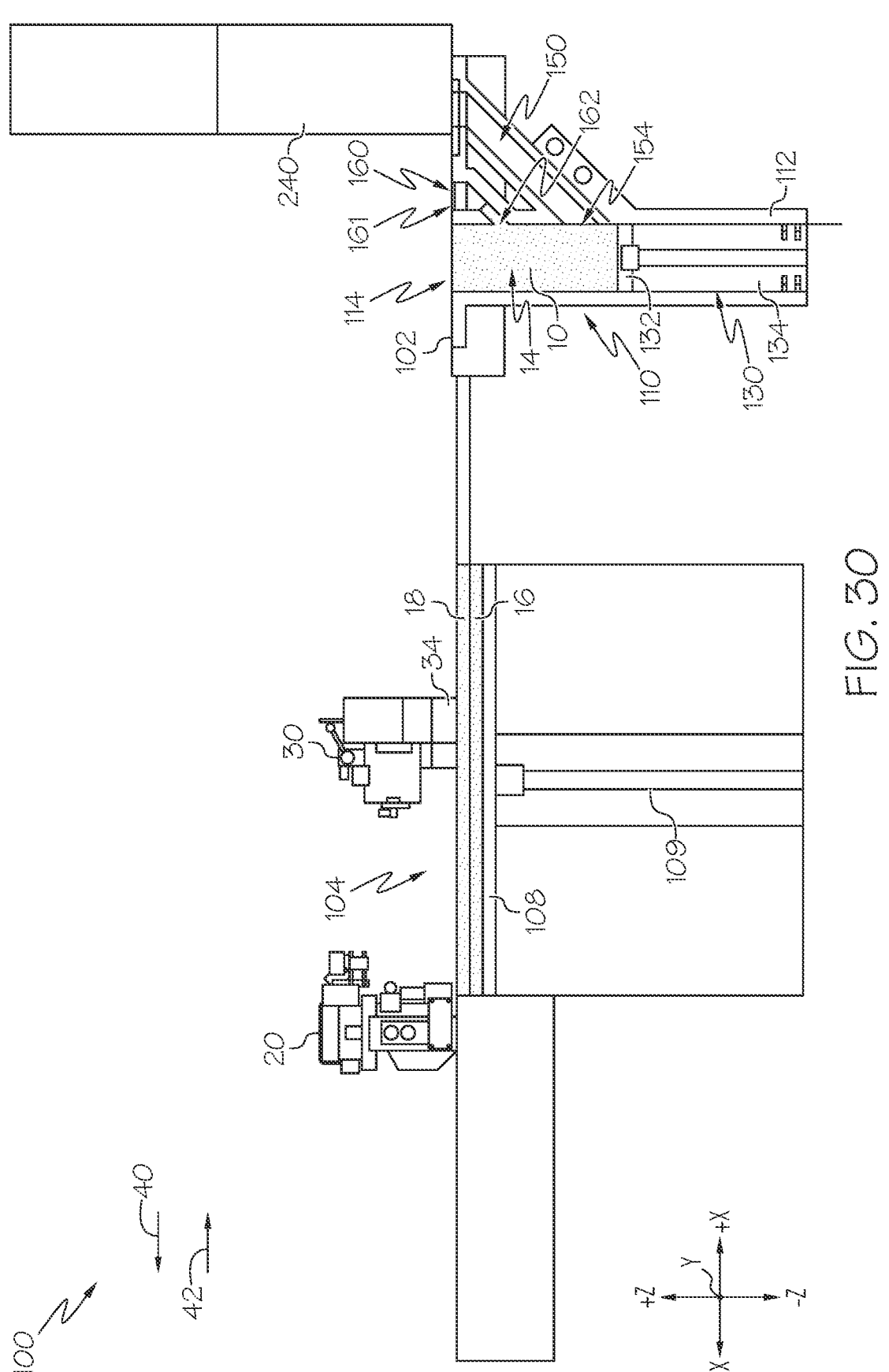
FIG. 30 schematically depicts a side view of the recoat assembly moving back to the supply receptacle, according to one or more embodiments shown and described herein.

It should be noted, however, that in embodiments in which the upwardly-facing trap door 172 (FIG. 21) of the contaminant receptacle 170 (FIG. 21) is positioned in the open position, some or all of the excess build material 10 from the first layer 16 in the build area 104 may be directed into the contaminant receptacle 170 (FIG. 21), positioned between (e.g., in the direction of the x-axis of the coordinate axes of FIGS. 21-24) the build area 104 and the supply receptacle 110, instead of the excess return 160. Simultaneously or subsequently with the processor 302 directing the recoat actuator 32 to move the recoat assembly 30 to the excess return 160, the processor 302 may also direct the print assembly actuator 22 to move the print assembly 20 in the return direction 42 until the print assembly 20 moves across the build area 104, as depicted in FIG. 25 particularly. As such, the print assembly 20 may bind select portions of the first layer 16 across the first layer 16 that correspond to a cross-sectional area of the three-dimensional object to be formed.

Referring now to FIGS. 1-3 and 25, in embodiments, the processor 302 of the controller 300 may direct the piston actuator 136 to move the piston 130 upwardly (e.g., in the +z direction of the coordinate axes of FIG. 25) a known distance to expose a second known amount of build material 10 of the build material pile 14 from the upwardly-facing receptacle opening 114 and above the working surface 102. As noted above, the amount of build material of the build material pile 14 exposed may be equal to the amount of build material 10 required to cover the build area 104 with a layer of build material of a desired thickness. In some embodiments, the amount of build material 10 of the build material pile 14 exposed may be the amount of build material 10 required to cover the build area 104 with a layer of build material 10 of a desired thickness and additionally a known excess or overdose amount of build material 10. The processor 302 of the controller 300 may direct the recoat actuator 32 to move the recoat assembly 30 in the coating direction 40 over the supply receptacle 110. The recoat assembly 30, and particularly the material spreading member 34 of the recoat assembly 30, then move across the upwardly-facing receptacle opening 114 of the supply receptacle 110, spreading the second exposed amount of build material 10 of the build material pile 14 towards the build area 104.

Referring now to FIGS. 1-3 and 26, as the recoat assembly 30 moves across the upwardly-facing receptacle opening 114 of the supply receptacle 110, the processor 302 of the controller 300 may direct the print assembly actuator 22 to simultaneously or subsequently move the print assembly 20 across the build area 104 in the coating direction 40. As the print assembly 20 moves over the build area 104 in the coating direction 40, the print assembly 20 may continue dispense binder on the first layer 16 in a pattern that corresponds to a cross-sectional shape of the three-dimensional object to be formed.

Referring now to FIGS. 1-3 and 27, after the print assembly 20 moves across the build area 104 in the coating direction 40, but before the recoat assembly 30 begins passing over the build area 104 in the coating direction 40, the processor 302 may direct the build platform 108 to move downwardly (e.g., in the −z direction of the coordinate axes of FIG. 27) a known distance to receive a second layer 18 of build material 10 above the first layer 16 in the build area 104. Following the downward actuation of the build platform 108, and with additional reference to FIGS. 28 and 29, the processor 302 directs the recoat actuator 32 to move the recoat assembly 30 across the build area 104 in the coating direction 40, such that the recoat assembly 30 and the material spreading member 34 move across the build area 104 in the coating direction 40, spreading the second exposed amount of build material 10 of the build material pile 14 as the second layer 18 supported in the build area 104.

Referring now to FIGS. 1-3 and 30, after the recoat assembly 30 moves across the build area 104 in the coating direction 40, the processor 302 of the controller 300 may direct the recoat actuator 32 to move the recoat assembly 30 in the return direction 42. Therefore, the recoat assembly 30, and particularly the material spreading member 34, move back across the build area 104 towards the excess return 160. The material spreading member 34, in some embodiments, may scrape and remove excess build material 10 from the second layer 18 in the build area 104 as the material spreading member 34 moves in the return direction 42. As the recoat assembly 30 moves across the build area 104 in the return direction 42, the processor 302 of the controller 300 may direct the print assembly actuator 22 to simultaneously or subsequently move the print assembly 20 across the build area 104 in the return direction 42. In other words, the print assembly 20 may trail the recoat assembly 30 as the print assembly 20 and the recoat assembly 30 move in the return direction 42. The above-described order of operation may be completed for successive layers of build material 10 in the build area 104 until the entire three-dimensional article of interest is formed in the build area 104.

In some embodiments, the above-described order of operation may continue for successive layers of build material 10 in the build area 104 until the supply receptacle 110 is empty of build material 10. The manufacturing system 100 may include the volume sensor 126 communicatively coupled to the controller 300. The volume sensor 126 may be a camera or any other suitable sensor to assess the volume of build material 10 within the supply receptacle 110. The processor 302 of the controller 300 may receive a signal from the volume sensor 126 indicative that the supply receptacle 110 contains a volume of build material 10 below a configurable threshold. The configurable threshold may be, for instance, when the supply receptacle 110 is empty of build material 10, does not contain enough build material 10 to form a desirable layer on the build area 104, does not contain enough build material 10 to form two successive layers on the build area 104, and the like. In response to receiving the signal, the processor 302 of the controller 300 may direct the piston actuator 136 to move the piston 130 downwardly (e.g., in the −z direction of the coordinate axes of FIG. 30). The piston actuator may move the piston 130 such that the delivery surface 132 of the piston 130 and/or the upper surface (e.g., in the +z direction of the coordinate axes of FIG. 30) of the build material pile 14 supported on the delivery surface 132 is positioned beneath the return intersection 162. Therefore, some or all of the build material 10 in the excess return 160 flows into the supply receptacle 110 and is supported on the piston 130. In some embodiments, the piston actuator 136 may move the piston 130 such that the delivery surface 132 of the piston 130 and/or the upper surface (e.g., in the +z direction of the coordinate axes of FIG. 30) of the build material pile 14 supported on the delivery surface 132 is positioned beneath the supply intersection 154. Therefore, some or all of the build material 10 in the excess return 160 flows into the supply receptacle 110 and is supported on the piston 130, and the dosing hopper 240 supplies build material 10 to the piston 130 within the supply receptacle 110 through the supply chute 150. After the release or supply of additional build material 10 into the supply receptacle 110, the processor 302 may direct the piston actuator 136 to move the piston 130 upwardly (e.g., in the +z direction of the coordinate axes of FIG. 30) such that a first amount of build material 10 of the build material pile 14 is exposed from the upwardly-facing receptacle opening 114, and the processor 302 may further direct the recoat actuator 32 to move the recoat assembly 30 such that the exposed build material 10 is directed into the excess return 160, thereby smoothing the build material pile 14 as discussed with reference to FIGS. 13 and 14 above. Following, the smoothing of the build material pile 14, the manufacturing system 100 may proceed to form a three dimensional object of interest in the build area 104 as discussed above with reference to FIGS. 15-30.

Figure 31:
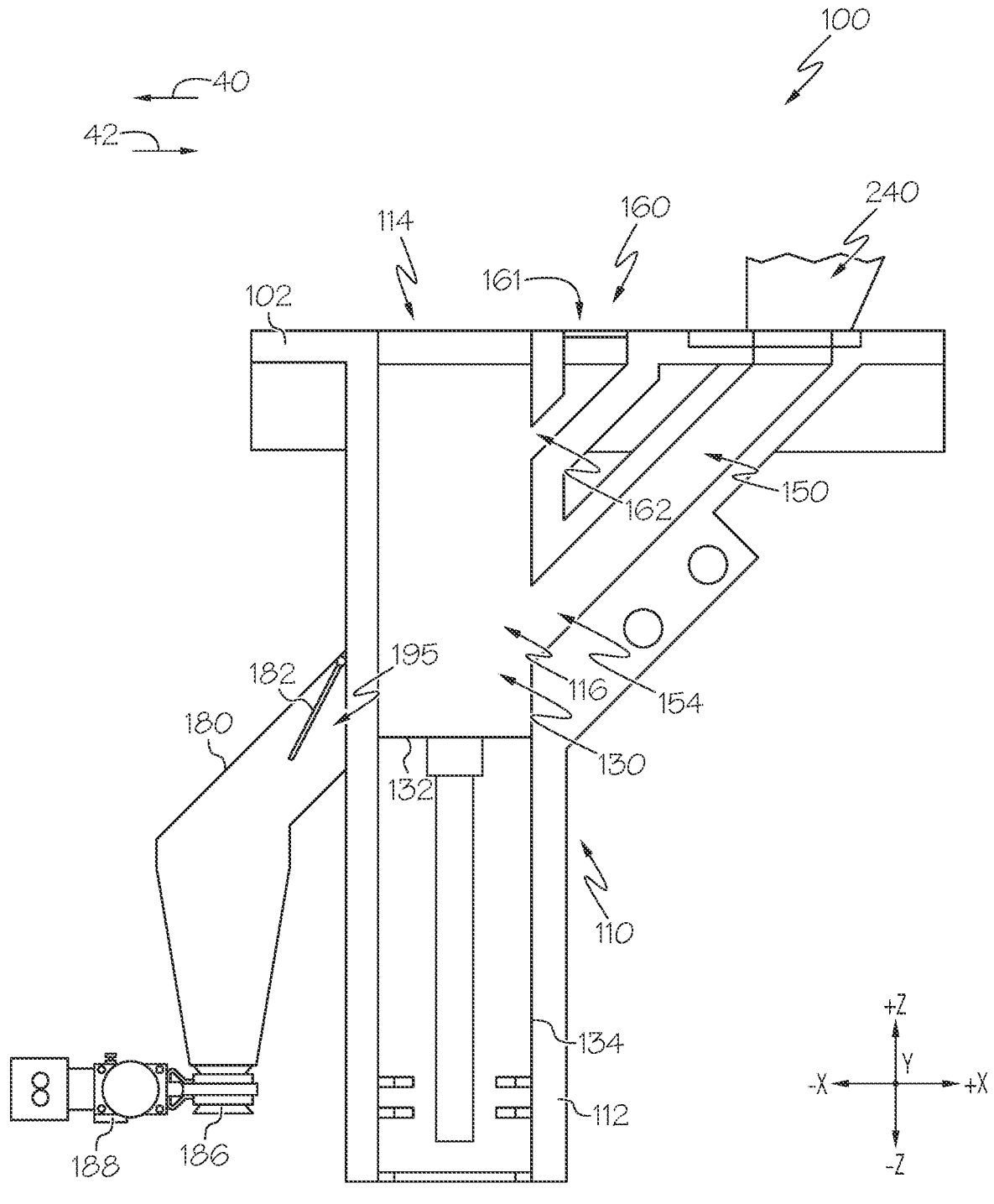
FIG. 31 schematically depicts a side section view of an illustrative purge chute in communication with the supply receptacle of FIG. 3, according to one or more embodiments shown and described herein.

Referring now FIG. 31, a sectional view of the supply receptacle 110 including a purge chute 180 is schematically depicted. The purge chute 180 may be positioned in the one or more supply receptacle sidewalls 112 and in selective communication with the interior space 116 of the supply receptacle 110. More particularly, the purge chute 180 extends from the one or more supply receptacle sidewalls 112 at a purge intersection 195. While in the embodiment depicted in FIG. 31 the purge chute 180 is positioned opposite the supply chute 150, it should be understood that this is merely an example, and the purge chute 180 may be in communication with any of the supply receptacle sidewalls 112. In the embodiment depicted in FIG. 31, the purge intersection 195 is positioned in the one or more supply receptacle sidewalls 112 opposite the supply intersection 154 and/or the return intersection 162, however, it should be understood that this is merely an example. In embodiments, the purge intersection 195 may be positioned vertically beneath (e.g., in the −z direction of the coordinate axes of FIG. 31) the return intersection 162 and the supply intersection 154. In such embodiments, the purge chute 180 may be passive. For instance, the delivery surface 132 and/or the one or more piston perimeter surfaces 134 may at least partially obstruct communication between the interior space 116 and the purge chute 180 when the delivery surface 132 is positioned vertically above (e.g., in the +z direction of the coordinate axes of FIG. 31) the purge intersection 195. However, during normal operation, the delivery surface 132 of the piston 130 may be positioned vertically above (e.g., in the +z direction of the coordinate axes of FIG. 31) the purge intersection 195, while the delivery surface 132 of the piston 130 is positioned beneath (e.g., in the −z direction of the coordinate axes of FIG. 31) the supply intersection 154 and the return intersection 162. Therefore, the supply intersection 154 and the return intersection 162 may be unobstructed by the delivery surface 132 and the one or more piston perimeter surfaces 134 of the piston 130 such that the supply intersection 154 and the return intersection 162 may be in communication with the interior space 116. With communication between the purge chute 180 and the interior space 116 at least partially obstructed, the build material 10 (FIG. 1) supplied from the supply intersection 154 and/or the return intersection 162 may settle within the supply receptacle 110 until further piston 130 actuation. For instance, the piston 130 may be actuated upwardly (e.g., in the +z direction of the coordinate axes of FIG. 31) to deliver build material 10 (FIG. 1) to the working surface 102, as described above.

In embodiments, the piston 130 may also be actuated downwardly (e.g., in the −z direction of the coordinate axes of FIG. 31) such that the purge chute 180, and particularly purge intersection 195, is no longer obstructed by the delivery surface 132 and/or the one or piston perimeter surfaces 134 of the piston 130. With the delivery surface 132 of the piston 130 positioned below the purge intersection 195, build material 10 (FIG. 1) supported on the delivery surface 132 of the piston 130 may flow into the purge chute 180. Because the purge intersection 195 is positioned beneath the supply intersection 154 and the return intersection 162, build material 10 (FIG. 1) may flow from the dosing hopper 240 and the excess return 160, through the interior space 116, and into the purge chute 180, thereby draining the excess return 160 and the dosing hopper 240.

In some embodiments, the manufacturing system 100 may further include a purge valve 182 in communication with the interior space 116. The purge valve 182 may be positionable between a closed position, in which build material 10 (FIG. 1) is restricted from flowing through the purge valve 182 such that the purge valve 182 at least partially obstructs communication between the interior space 116 and the purge chute 180, and an open position, in which build material 10 (FIG. 1) may flow through the purge valve 182 such that the purge valve 182 does not obstruct communication between the interior space 116 and the purge chute 180. In some embodiments, the purge valve 182 may include a purge valve actuator 184 (FIG. 2). The processor 302 (FIG. 2) of the controller 300 (FIG. 2) may be communicatively coupled to the purge valve actuator 184 (FIG. 2) such that the processor 302 (FIG. 2) may direct the purge valve actuator 184 (FIG. 2) to move the purge valve 182 into the open or the closed position.

The purge chute 180 may further include an extraction valve 186 that is positionable between a closed position, in which build material 10 (FIG. 1) is restricted from flowing out of the purge chute 180, and an open position, in which build material 10 (FIG. 1) can flow out from the purge chute 180 through the extraction valve 186. In such embodiments, the controller 300 (FIG. 2) may be communicatively coupled with an extraction valve actuator 199 (FIG. 2) coupled to the extraction valve 186. The purge chute 180 may be configured to store build material 10 (FIG. 1) until the processor 302 (FIG. 2) directs the extraction valve actuator 199 (FIG. 2) to move the extraction valve 186 into the open position, thereby draining the purge chute 180 of build material 10 (FIG. 1). In some embodiments, a vacuum system 188 may be further coupled to the extraction valve 186 such that the vacuum system 188 actively draws build material 10 (FIG. 1) through the extraction valve 186 and from the purge chute 180 when the extraction valve 186 is in the open position.

The controller 300 (FIG. 2) may direct the environmental control system actuator 202 (FIG. 2) to direct one or more gasses through the environmental control system 200 to assist in the purging of build material 10 (FIG. 1) from the supply receptacle 110 and the extraction of build material 10 (FIG. 1) from the purge chute 180. For instance, when the purge chute 180 is in communication with the interior space 116 of the supply receptacle 110, the processor 302 (FIG. 2) may direct the environmental control system actuator 202 (FIG. 2) to convey gas through the supply chute 150 from the dosing hopper 240 to the supply receptacle 110, thereby promoting the flow of build material 10 (FIG. 1) into the interior space 116 and further into the purge chute 180. Moreover, the conveyance of gas through the supply chute 150 may prevent any backflow of build material 10 (FIG. 1) into the dosing hopper 240 when the purge chute 180 is in communication with the interior space 116. The processor 302 (FIG. 2) may further direct the recoat actuator 32 (FIG.

2) to move the recoat assembly 30 (FIG. 1) over the upwardly-facing receptacle opening 114 of the supply receptacle 110 and/or the upwardly facing opening 161 of the excess return 160 to further prevent a backflow of build material 10 (FIG. 1) toward the working surface 102 when the purge chute 180 is in communication with the interior space 116. Furthermore, when the recoat assembly 30 (FIG. 1) is positioned over the upwardly-facing receptacle opening 114, the processor 302 (FIG. 2) may direct the environmental control system actuator 202 (FIG. 2) to provide a gas to the recoat assembly 30 (FIG. 1) which may be supplied into the supply receptacle 110 through the upwardly-facing receptacle opening 114 to encourage the flow of build material 10 (FIG. 1) into the purge chute 180. In the event the build enclosure 106 (FIG. 1) is not sealed, while moving gas through the manufacturing system 100 (FIG. 1) to assist in the purging and extraction of build material 10 (FIG. 1) from the supply receptacle 110, the processor 302 (FIG. 2) may direct the environmental control system actuator 202 (FIG. 2) to at least partially seal one or more build enclosure outlets to prevent the leakage of gas into the external environment outside the build enclosure 106 (FIG. 1).

While reference has been made to FIG. 31 concerning embodiments in which the supply receptacle 110 is coupled to both the excess return 160 and the dosing hopper 240, it should be appreciated that this a non-limiting example. For instance, in some embodiments, the purge chute 180 may be implemented in the supply receptacle 110 and operate as described above when the supply receptacle 110 is coupled to only one of the excess return 160 and the dosing hopper 240. Furthermore, the purge chute 180 may be similarly implemented in embodiments where the supply receptacle is coupled to a build material source or supply that is neither the excess return 160 nor the dosing hopper 240. For instance, in the embodiments described above, one or both of the excess return 160 and the dosing hopper 240 may be generic sources of build material 10 (FIG. 1) that include a chute or other passageway that intersect the one or more supply receptacle sidewalls 112 above (e.g., in the +z direction of the coordinate axes of FIG. 31) the purge intersection 195.

Figure 32:
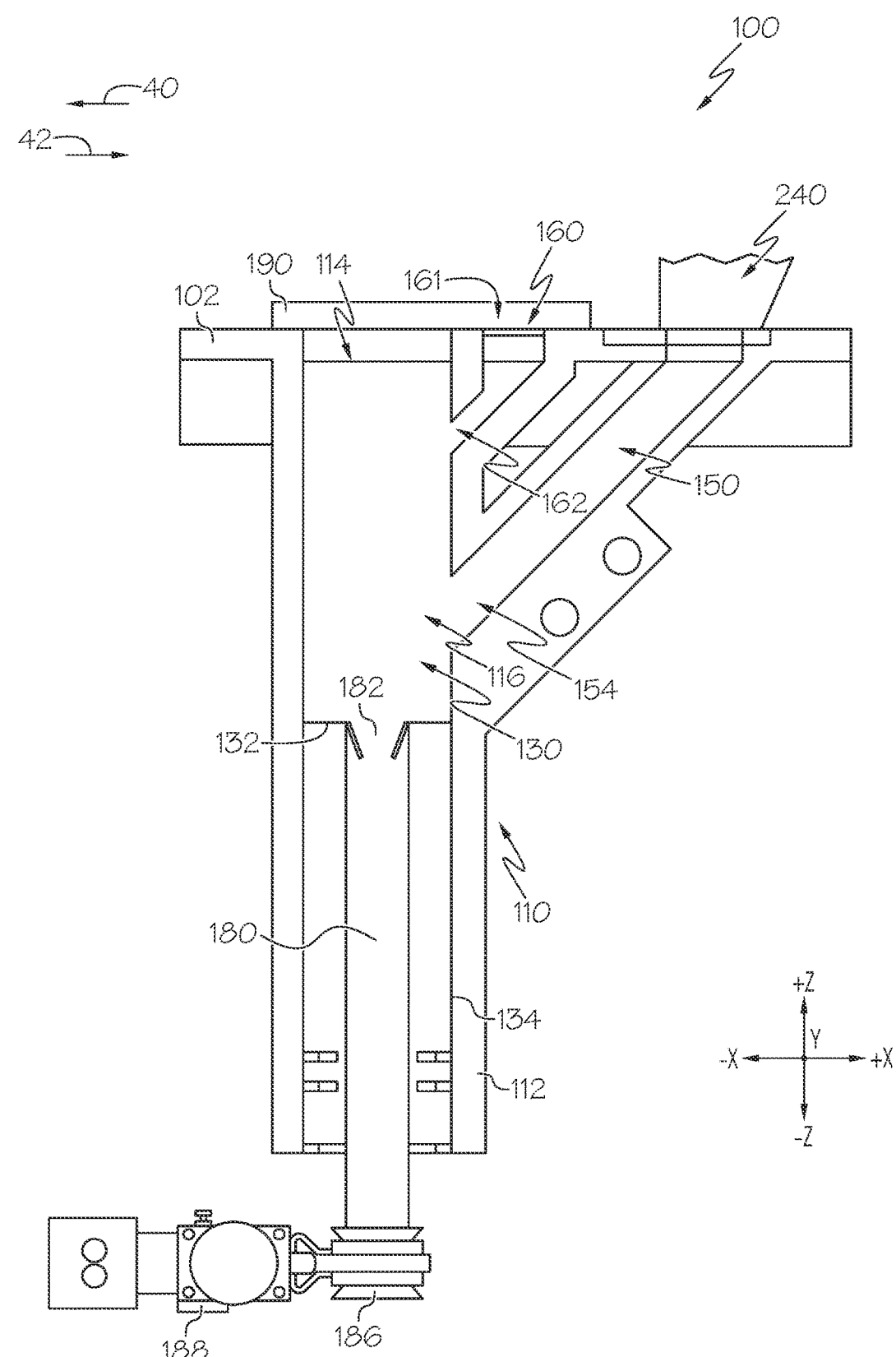
FIG. 32 schematically depicts a side section view of another illustrative purge chute defined in the piston of FIG. 13, according to one or more embodiments shown and described herein.

With reference now to FIG. 32, in some embodiments, the purge chute 180 is in selective communication with the interior space 116 through an interior of the piston 130. In such embodiments, the purge valve 182 may be positioned in the delivery surface 132 of the piston 130. The purge valve 182 may be positionable between a closed position, in which build material 10 (FIG. 1) is restricted from flowing through the purge valve 182 such that the purge valve 182 at least partially obstructs communication between the interior space 116 and the purge chute 180, and an open position, in which build material 10 (FIG. 1) may flow through the purge valve 182 such that the purge valve 182 does not obstruct communication between the interior space 116 and the purge chute 180. In such embodiments, regardless of the position of the delivery surface 132 of the piston 130 with relation to the supply intersection 154 and/or the return intersection 162, the purge valve 182 may be positioned in the open position such that build material 10 (FIG. 1) supported on the delivery surface 132 may flow to the purge chute 180. When the delivery surface 132 is positioned beneath (e.g., in the −z direction of the coordinate axes of FIG. 32) the supply intersection 154 and the return intersection 162, such that the delivery surface 132 and/or the one or more piston perimeter surfaces 134 do not obstruct communication between the excess return 160 and the dosing hopper 240 with the interior space 116, build material

10 (FIG. 1) may flow from the excess return 160 and/or the dosing hopper 240, through the interior space 116, and into the purge chute 180.

Still referring to FIG. 32, the manufacturing system 100 may further include a backflow lid 190. The backflow lid 190 is movable such that the backflow lid 190 may be positioned over the upwardly-facing receptacle opening 114 and/or an upwardly-facing return opening 161 of the excess return 160 when the purge valve 182 is in the open position, thereby preventing any backflow of build material 10 (FIG. 1) from the supply receptacle 110 to the working surface 102 as the bulk of the build material 10 (FIG. 1) flows into the purge chute 180. The manufacturing system 100 may further include the extraction valve 186 coupled to the purge chute 180 and positionable between a closed position, in which build material 10 (FIG. 1) is restricted from flowing out of the purge chute 180, and an open position, in which build material 10 (FIG. 1) is drained from the purge chute 180. In such embodiments, the purge chute 180 may be configured to store build material 10 (FIG. 1) until the extraction valve 186 is positioned in the open position.

Figure 33:
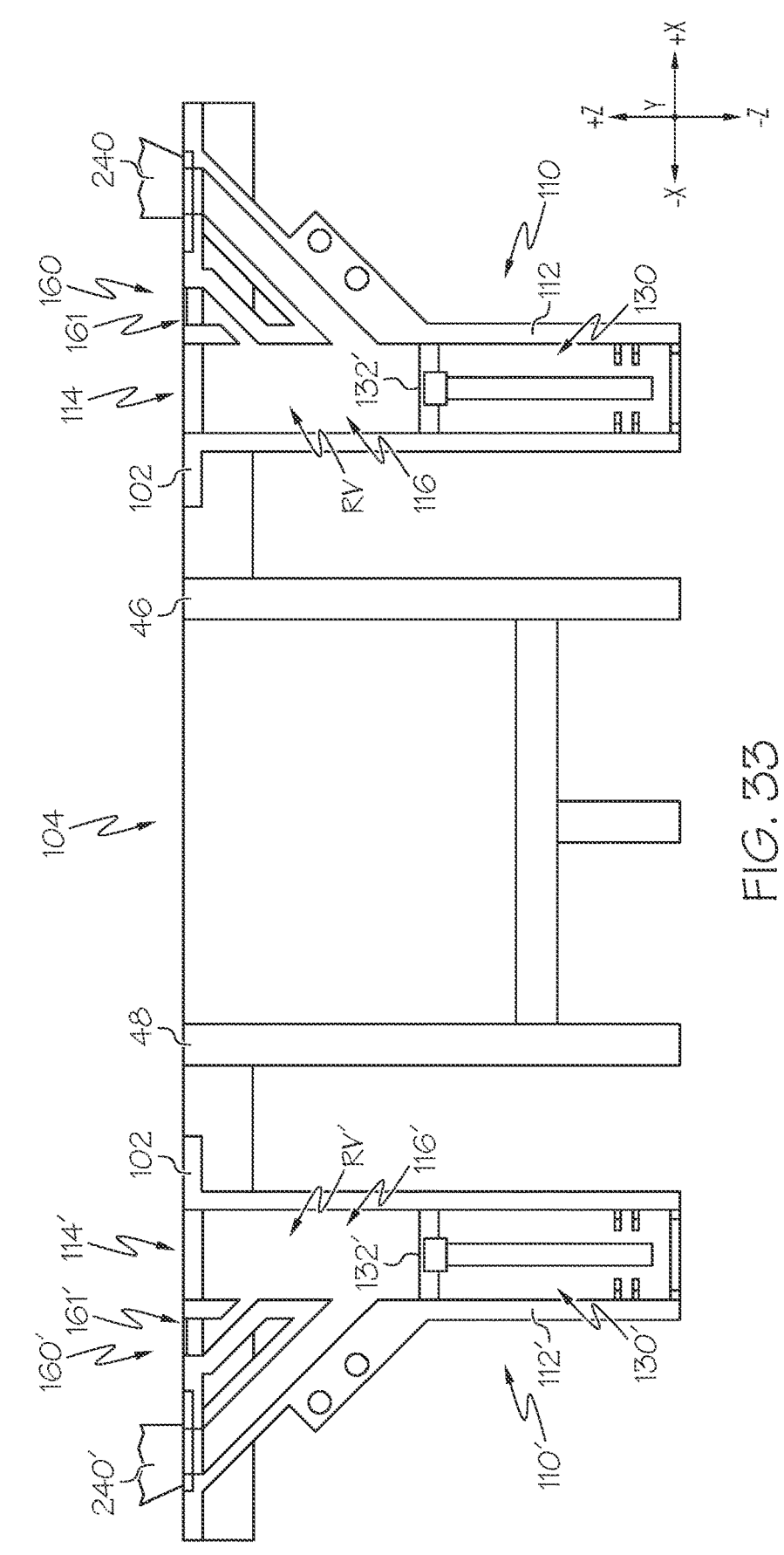
FIG. 33 schematically depicts a side section view of an illustrative manufacturing system including a first supply receptacle and a second supply receptacle, according to one or more embodiments shown and described herein.

Referring now to FIG. 33, in some embodiments, the manufacturing system 100 includes a first supply receptacle 110 and a second supply receptacle 110'. Like the embodiments described above and depicted in FIGS. 1-3, the first supply receptacle 110, is positioned from a first edge 46 of the build area 104 (e.g., in +x direction of the coordinate axes of FIG. 33). The first supply receptacle 110 may be positioned between (e.g., in the direction of the x-axis of the coordinate axes of FIG. 33) the build area 104 and a first excess return 160 in selective communication with the first supply receptacle 110. The first excess return 160, and particularly a first upwardly-facing return opening 161 of the first excess return 160 may be positioned between (e.g., in the direction of the x-axis of the coordinate axes of FIG. 33) a first upwardly-facing receptacle opening 114 of the first supply receptacle 110 and a first dosing hopper 240 along the working surface 102.

Figure 35:
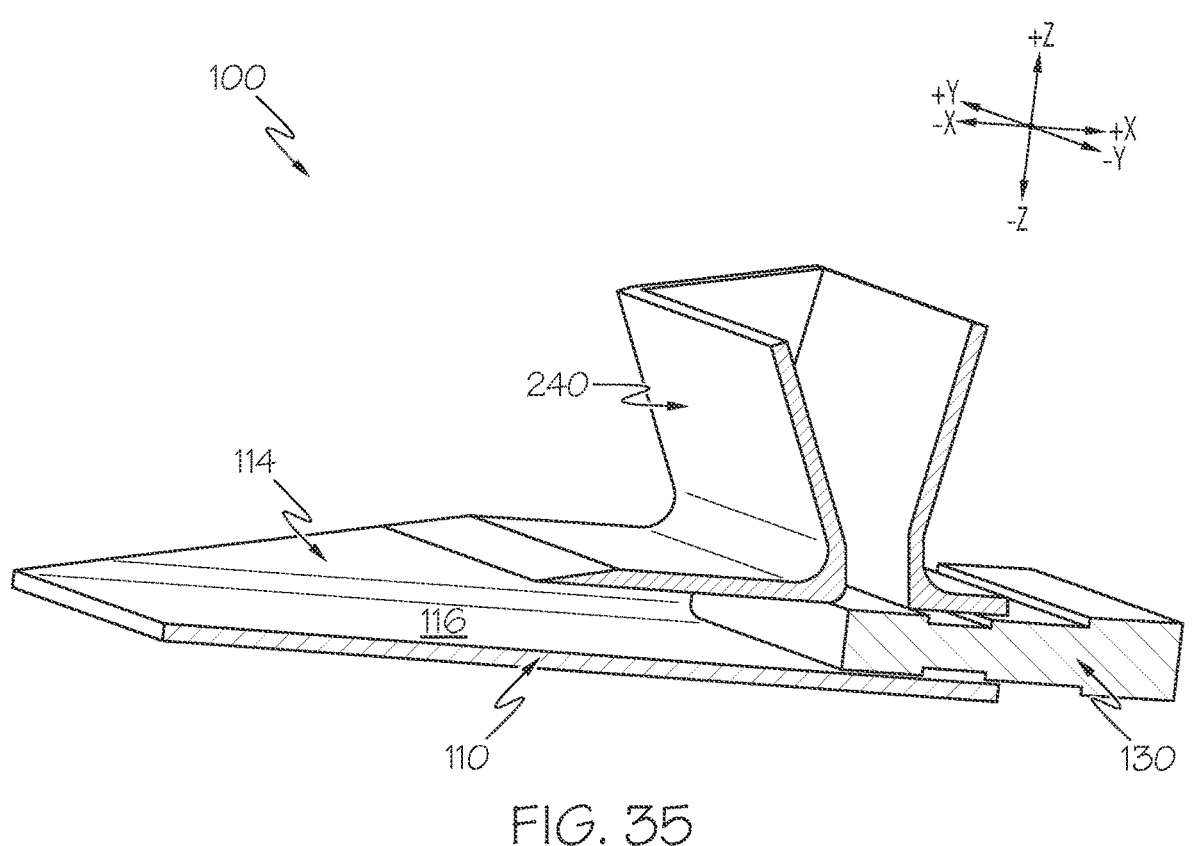
FIG. 35 schematically depicts a perspective section view of another illustrative supply receptacle, according to one or more embodiments shown and described herein.

In the embodiment depicted in FIG. 35, a second supply receptacle 110' may be positioned from a second edge 48 of the build area 104 (e.g., in the −x direction of the coordinate axes of FIG. 33) opposite the first edge 46 of the build area 104. The second supply receptacle 110' may mirror the first supply receptacle 110 in structure and operation. For instance, the second supply receptacle 110' may include one or more second supply receptacle sidewalls 112' and a second upwardly-facing receptacle opening 114'. A second piston 130' may be engaged with the one or more second supply receptacle sidewalls 112', and the second upwardly-facing receptacle opening 114', the one or more second supply receptacle sidewalls 112', and the second piston 130' at least partially define a second interior space 116' of the second supply receptacle 110'. The second piston 130' may be positionable between an extended position, in which the second interior space 116' has a second extended volume EV' (not depicted), and a retracted position, in which the second interior space 116' has a second retracted volume RV'. The second retracted volume RV' is greater in volume than the second extended volume EV' (not depicted). A second excess return 160' may mirror the first excess return 160 in structure and operation and be in selective communication with the second interior space 116'. The second supply receptacle 110' may be positioned between (e.g., in the direction of the x-axis of the coordinate axes of FIG. 33) the build area 104 and the second excess return 160' in selective communication with the second supply receptacle 110'. Moreover, the second excess return 160', and particularly a second upwardly-facing return opening 161' of the second excess return 160' may be positioned between (e.g., in the direction of the x-axis of the coordinate axes of FIG. 33) the second upwardly-facing receptacle opening 114' and a second dosing hopper 240', which mirrors the first dosing hopper 240 and is in selective communication with the second supply receptacle 110', along the working surface 102. It should be appreciated, however, that in some embodiments, the first supply receptacle 110 may not be coupled to or in selective communication with the first dosing hopper 240, and the second supply receptacle 110' may not be coupled to or in selective communication with the second dosing hopper 240'.

Figure 34:
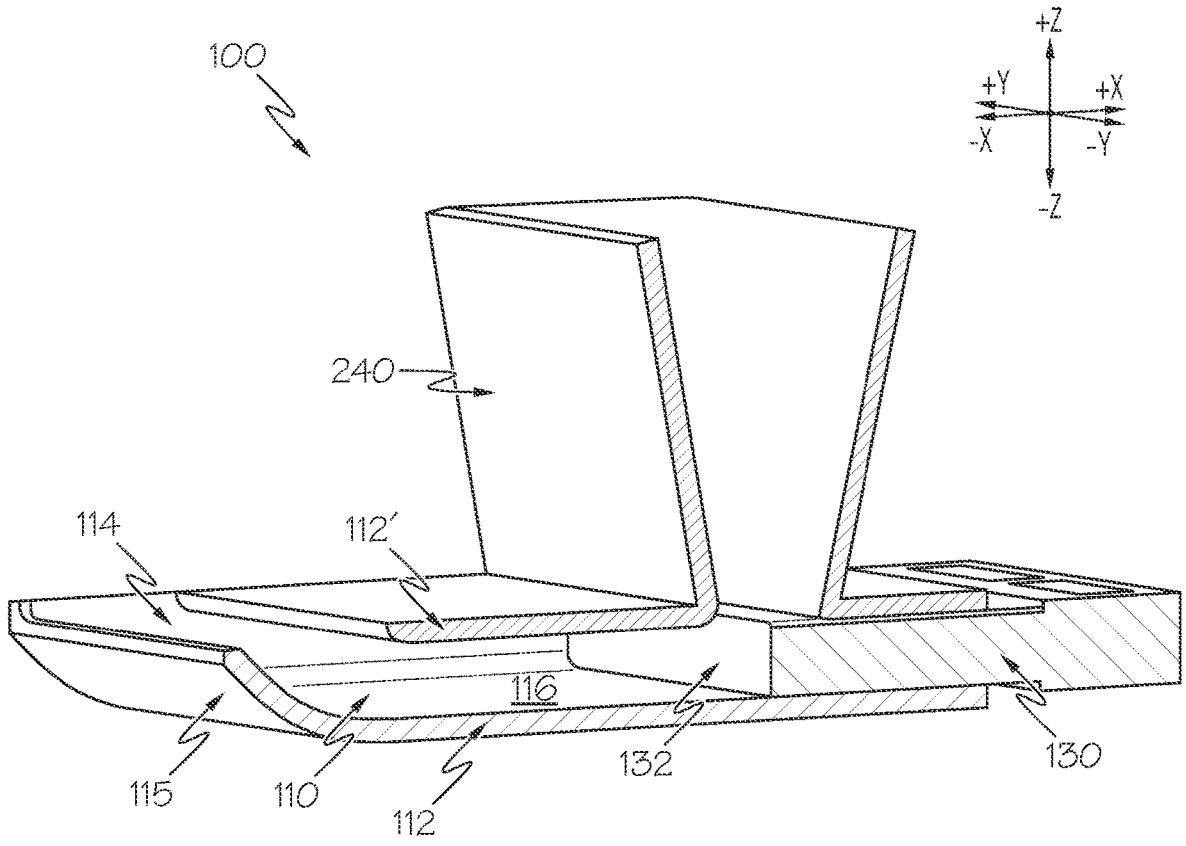
FIG. 34 schematically depicts a perspective section view of another illustrative supply receptacle, according to one or more embodiments shown and described herein.

While in the embodiments described above and depicted in FIGS. 1-33, the supply receptacle 110 is generally depicted as being in a vertical orientation (e.g., with the supply receptacle sidewalls 112 oriented transverse to and/or perpendicular with the working surface 102), it should be understood that this is merely one illustrative example. Another illustrative example is depicted in FIGS. 34 and 35. Referring to FIGS. 34-35, in some embodiments, the supply receptacle 110 may extend at least partially in a horizontal direction (e.g., in the x-direction of the coordinate axes of FIGS. 34 and 35). For example and referring to FIG. 34, the manufacturing system includes the dosing hopper 240 that is in selective communication with the interior space 116 defined by the piston 130 and the one or more supply receptacle sidewalls 112. However, in the embodiment depicted in FIG. 34, supply receptacle 110 includes a lower sidewall 112 and an upper sidewall 112' that generally extend in a horizontal direction (e.g., in the x-direction of the coordinate axes of FIG. 34). The lower sidewall 112 may define a concave contact surface 115 that is adjacent to and oriented to curve upward (e.g., in the z-direction of the coordinate axes of FIG. 34) toward the upwardly-facing receptacle opening 114. In operation, the piston 130 may be moved in the horizontal direction (e.g., in the x-direction of the coordinate axes of FIG. 34) to move build material 10 (FIG. 1) to the upwardly-facing receptacle opening 114. More particularly, build material 10 (FIG. 1) may move from the dosing hopper 240 to the interior space 116, and the piston 130 may move in the horizontal direction (e.g., in the x-direction of the coordinate axes of FIG. 34) to move build material within the interior space 116 to the upwardly-facing receptacle opening 114. Because the piston 130 moves in the horizontal direction (e.g., in the x-direction of the coordinate axes of FIG. 34), the delivery surface 132 of the piston 130 may not directly move the build material around the concave contact surface 115 to the upwardly-facing receptacle opening 114. Instead, build material 10 (FIG. 1) within the interior space 116 may be successively moved through the interior space 116 around the concave contact surface 115 as the piston 130 moves in the horizontal direction (e.g., in the x-direction of the coordinate axes of FIG. 34).

Referring to FIG. 35, the supply receptacle 110 is oriented at an angle with respect to the horizontal direction and the vertical direction (e.g., in the x-direction and the z-direction of the coordinate axes depicted in FIG. 35). In the embodiment depicted in FIG. 35, the one or more supply receptacle sidewalls 112 are substantially planar, and build material 10 (FIG. 1) can move from the dosing hopper 240 to the interior space 116, and may be moved to the upwardly-facing receptacle opening 114 through movement of the piston along the supply receptacle 110.

Figure 36:
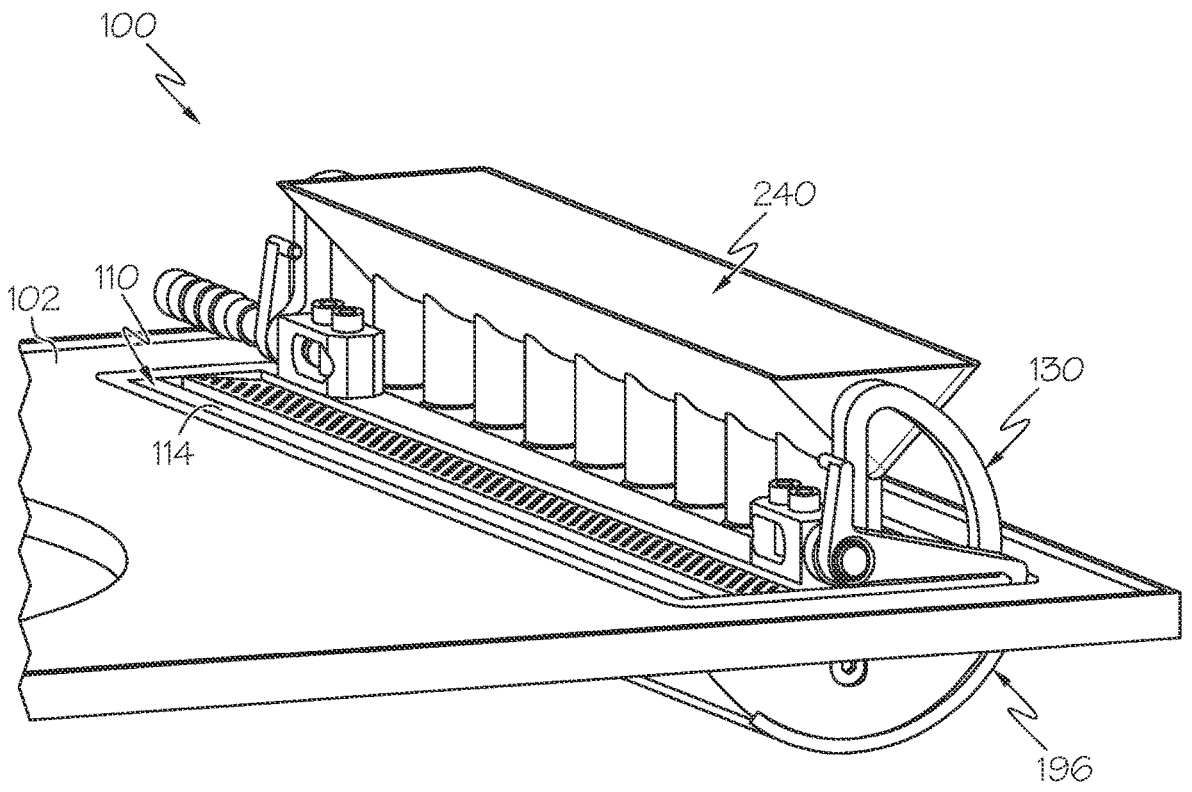
FIG. 36 schematically depicts a perspective view of another illustrative supply receptacle, according to one or more embodiments shown and described herein.

Referring to FIG. 36, a perspective view of another embodiment of the manufacturing system 100 is schematically depicted. Like the embodiment described above and depicted in FIGS. 1-5, the manufacturing system 100 includes the supply receptacle 110, the piston 130, and the dosing hopper 240. However, in the embodiment depicted in FIG. 36, the piston 130 defines an arcuate shape. Because the piston 130 has an arcuate shape, the piston may move within the supply receptacle 110 without a seal or seals engaging the piston 130 and the one or more sidewalls of the supply receptacle 110. In other words, because the piston 130 has an arcuate shape, the piston may be positioned entirely within the build enclosure 106 (FIG. 1). Accordingly, in embodiments in which the piston 130 has an arcuate shape, seals between the piston and the one or more sidewalls of the supply receptacle 110 are not necessary to retain build material 10 (FIG. 1) within the build enclosure 106 (FIG. 1).

Figure 37:
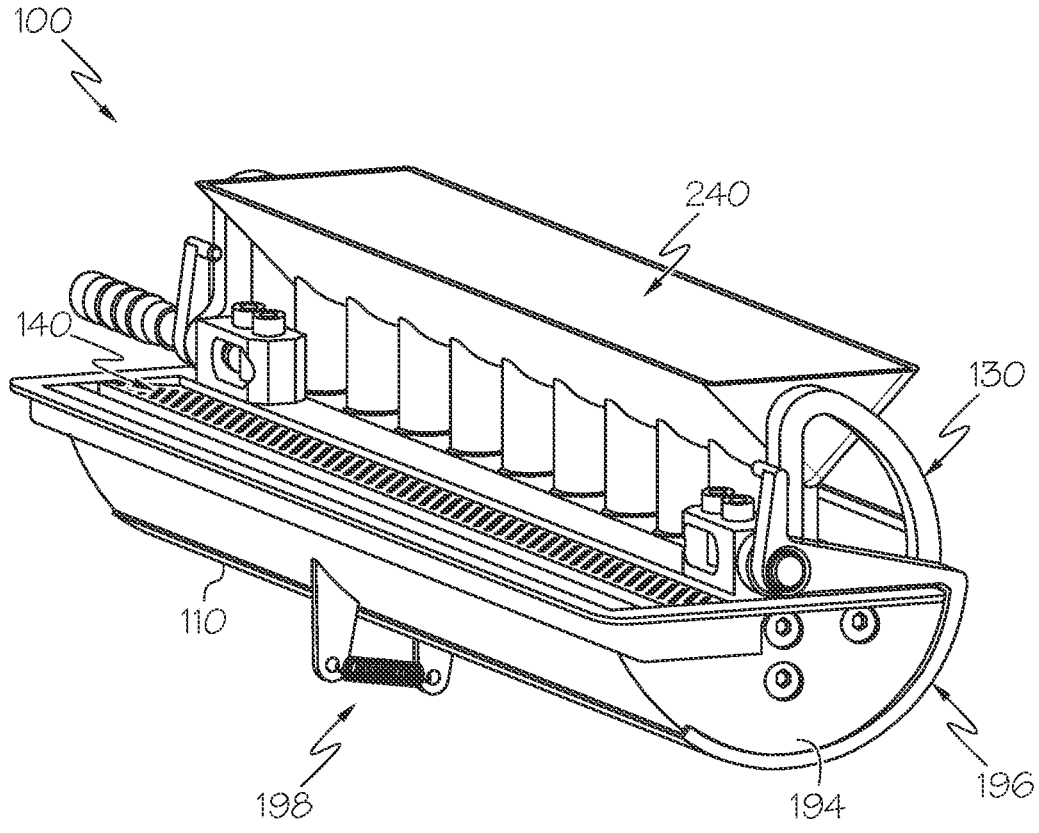
FIG. 37 schematically depicts another perspective view of the supply receptacle of FIG. 36, according to one or more embodiments shown and described herein.
Figure 38:
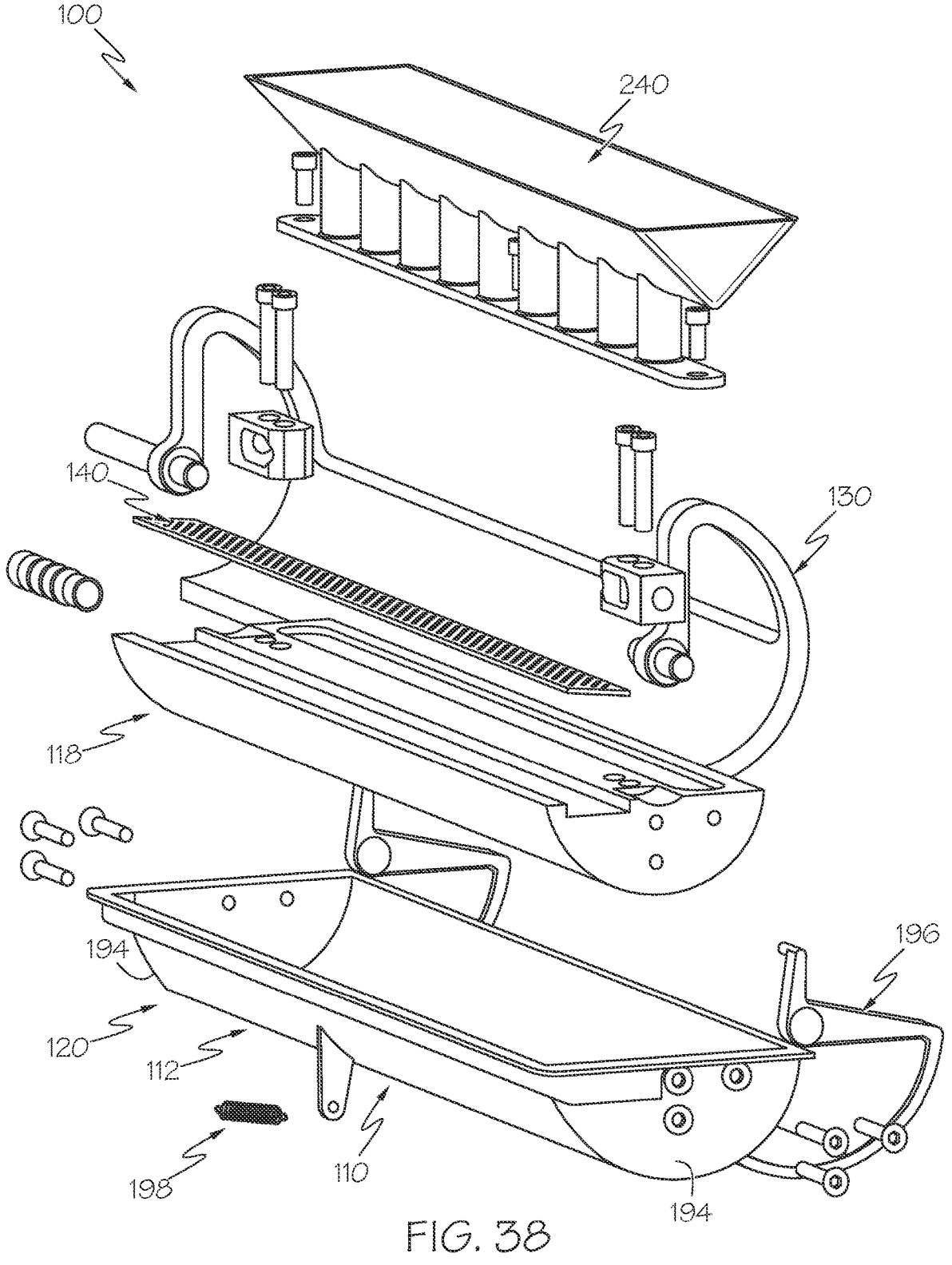
FIG. 38 schematically depicts an exploded view of the supply receptacle of FIG. 36, according to one or more embodiments shown and described herein.

Referring to FIGS. 37 and 38, a perspective view and an exploded perspective view of the supply receptacle 110, the piston 130, and the dosing hopper 240 are schematically depicted. The manufacturing system 100 includes the upper supply sidewall 118 and the lower supply sidewall 120 that at least partially define the supply receptacle 110. In the embodiment depicted in FIGS. 38 and 39 the upper supply sidewall 118 defines an inwardly-facing convex surface and the lower supply sidewall 120 defines an inwardly-facing concave surface. In embodiments, the supply receptacle 110 further includes one or more transverse sidewalls 194 that are oriented transverse to the upper supply sidewall 118 and the lower supply sidewall 120. In embodiments, the upper supply sidewall 118 and the lower supply sidewall 120 define an arcuate shape that is complementary to the arcuate shape of the piston 130.

In embodiments, the manufacturing system 100 further includes a movable supply chute cover 196 that is movable with respect to the lower supply sidewall 120, as described in greater detail herein. The manufacturing system 100 may further include a biasing member 198 engaged with the movable supply chute cover 196. In some embodiments, the manufacturing system 100 may include a biasing member 198 engaged with the movable supply chute cover 196 that biases the movable supply chute cover into an engaged position, as described in greater detail herein. In embodiments, the movable supply chute cover 196 may operate as a purge valve to selectively allow build material 10 (FIG. 1) to be removed from the supply receptacle 110.

Figure 39:
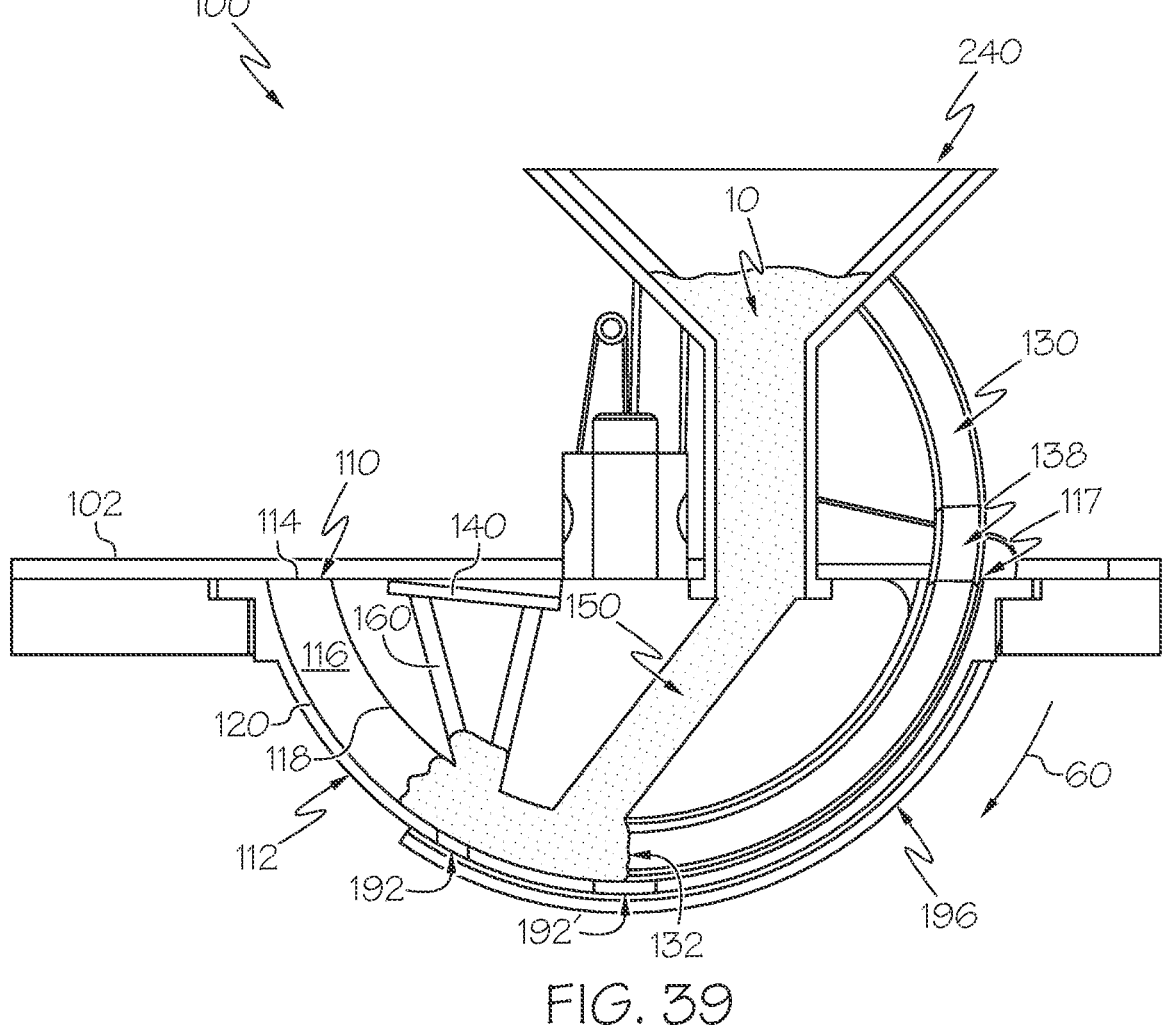
FIG. 39 schematically depicts a section view of the supply receptacle of FIG. 36, according to one or more embodiments shown and described herein.
Figure 40:
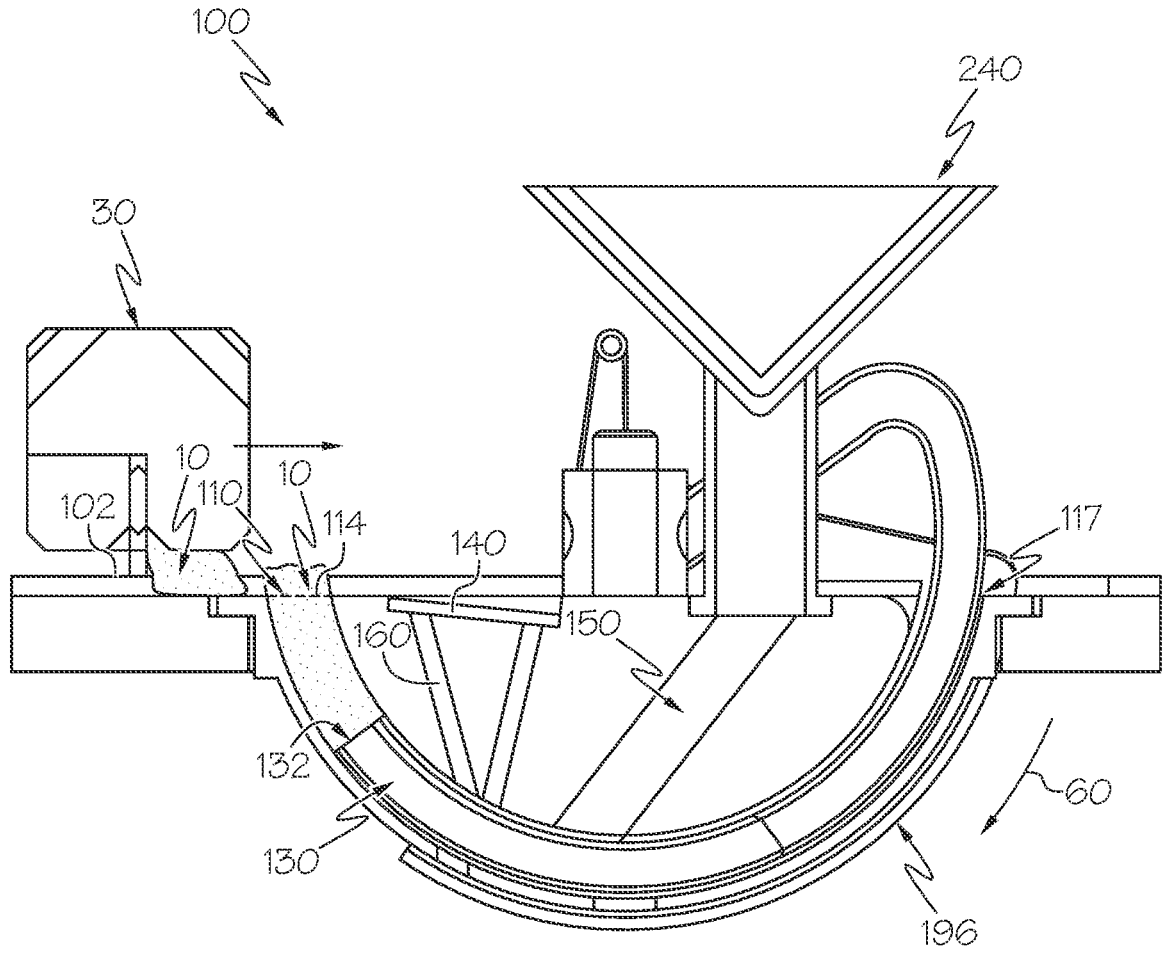
FIG. 40 schematically depicts a section view of the supply receptacle of FIG. 36 with an illustrative piston in an extended position, according to one or more embodiments shown and described herein.
Figure 41:
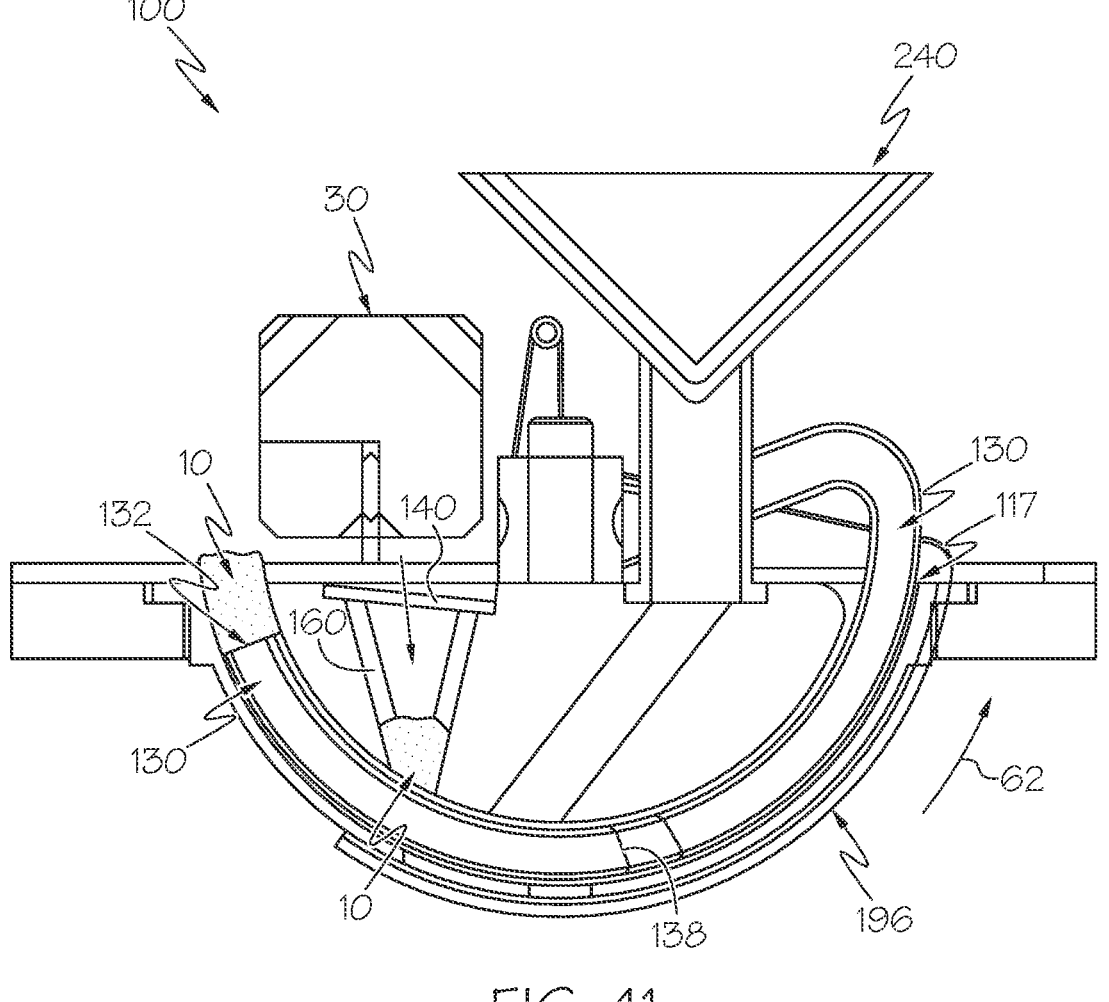
FIG. 41 schematically depicts a section view of the supply receptacle of FIG. 36 with the recoat assembly moving excess build material to the excess return, according to one or more embodiments shown and described herein.

Referring to FIGS. 39-41, section views of the supply receptacle 110, the piston 130, and the dosing hopper 240 is schematically depicted. Similar to the embodiment described above and depicted in FIGS. 1-5, build material 10 is provided to the interior space 116 via the supply chute 150. The manufacturing system 100 further includes the excess return 160 and the sieve 140, and the piston 130 can move build material 10 toward the receptacle opening 114. However, in the embodiment depicted in FIGS. 39-41, instead of moving in a linear direction, the piston 130 moves in an arcuate direction 60 to move the build material 10 toward the receptacle opening 114.

Figure 42:
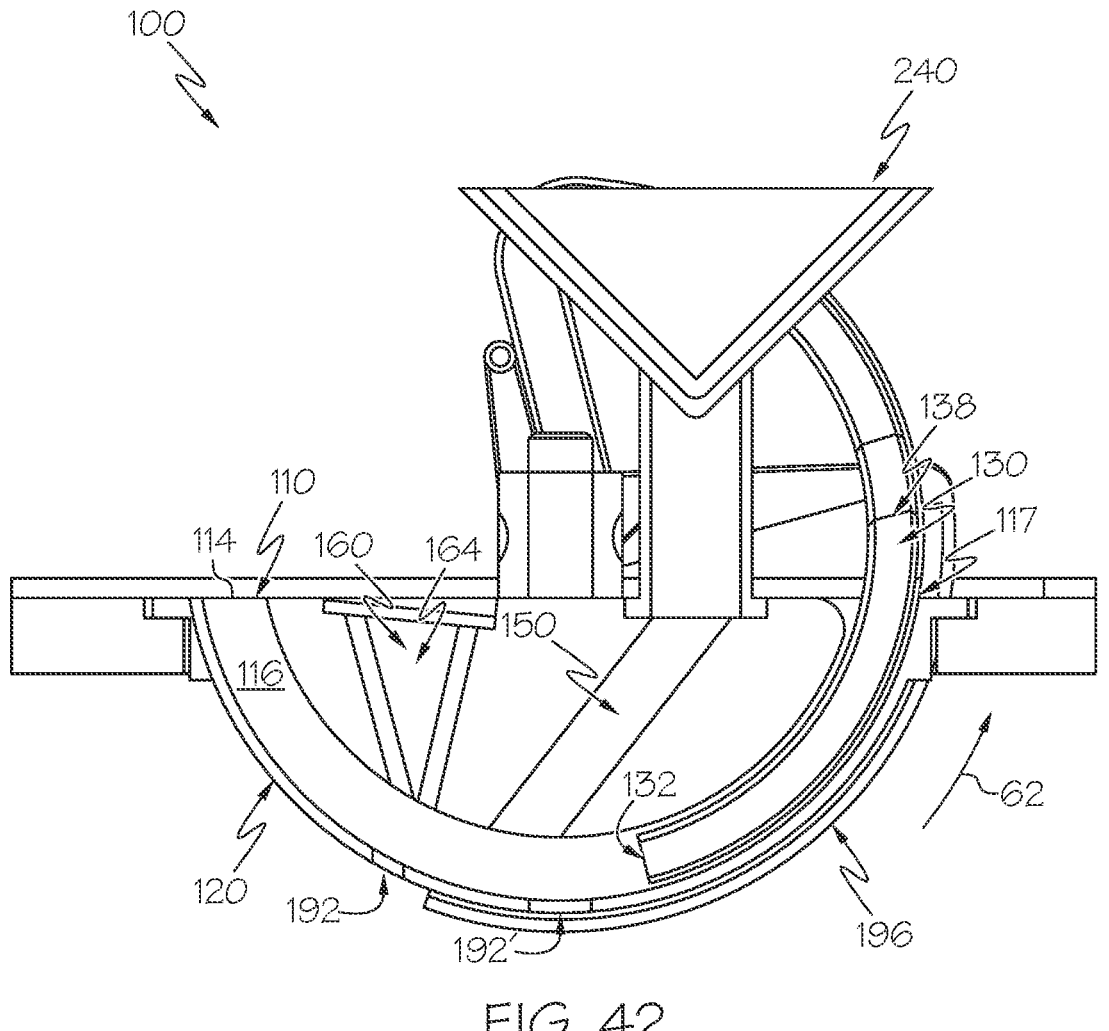
FIG. 42 schematically depicts a section view of the supply receptacle of FIG. 36 with an illustrative movable supply chute cover in a retracted position, according to one or more embodiments shown and described herein.

Referring to FIG. 42, in some embodiments, the manufacturing system 100 includes one or more purge apertures 192 in communication with the interior space 116. Build material may be released from the manufacturing system 100 through the one or more purge apertures 192, as described in greater detail herein.

For example, in the embodiment depicted in FIG. 42, the lower supply sidewall 120 defines one or more purge apertures 192 extending through the lower supply sidewall 120. In some embodiments, the lower supply sidewall 120 defines an upper purge aperture 192, and a lower purge aperture 192'. The upper purge aperture 192, in the embodiment depicted in FIG. 42 is generally aligned with the excess return 160. In some embodiments, the lower purge aperture 192' may be positioned at an apex of the lower supply sidewall 120. The movable supply chute cover 196 may selectively obstruct the upper purge aperture 192 and/or the lower purge aperture 192'.

For example and referring to FIGS. 41 and 42, the movable supply chute cover 196 is movable between an engaged position, as shown in FIG. 41, and a disengaged position, as shown in FIG. 42. In the engaged position as shown in FIG. 41, the movable supply chute cover 196 at least partially obstructs the one or more purge apertures (e.g., the upper purge aperture 192 and the lower purge aperture 192'). In the disengaged position as shown in FIG. 42, the movable supply chute cover 196 is retracted from the upper purge aperture 192, such that build material 10 within the interior space 116 and the excess return 160 may flow out the upper purge aperture 192.

Figure 43:
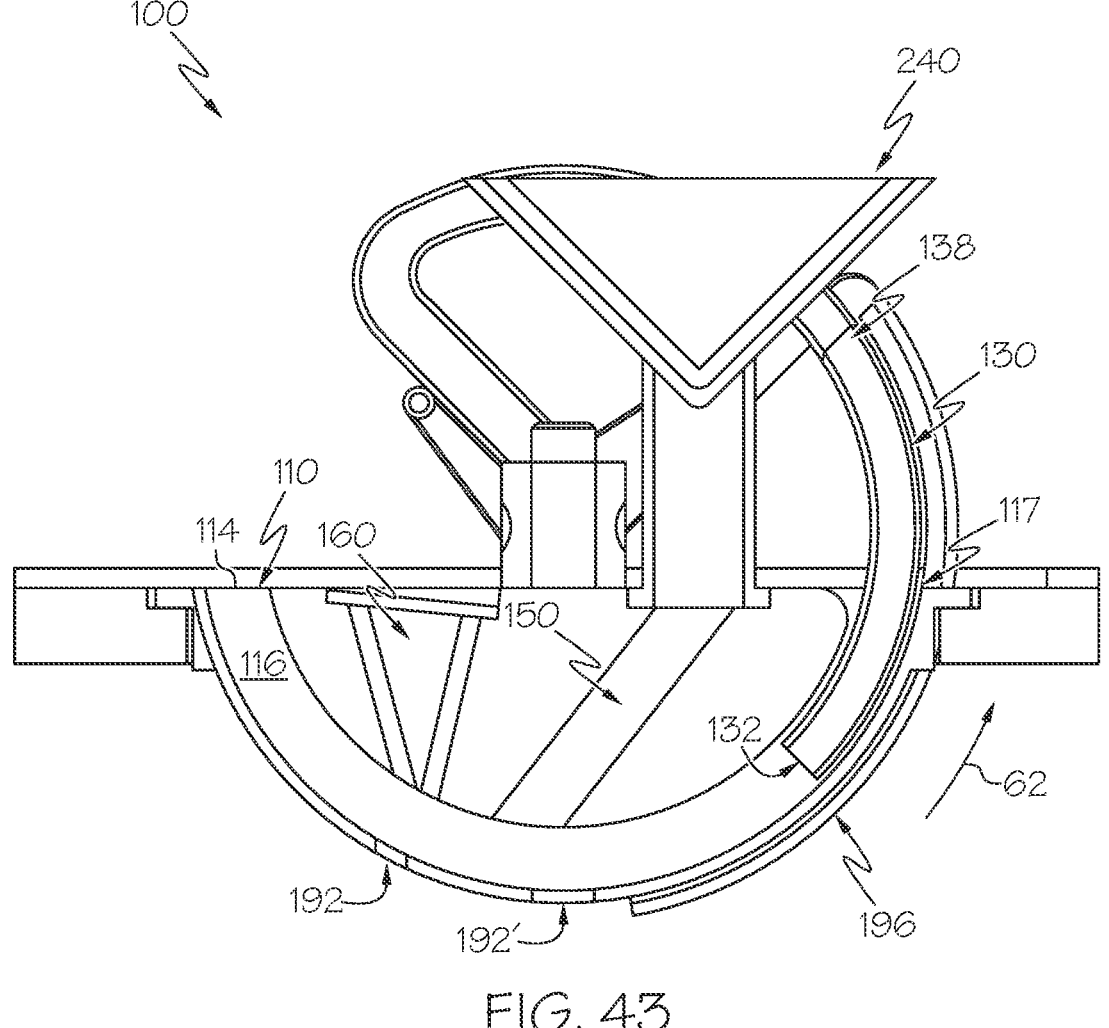
FIG. 43 schematically depicts a section view of the supply receptacle of FIG. 36 with the movable supply chute cover further retracted, according to one or more embodiments shown and described herein.

In some embodiments and referring to FIG. 43, the movable supply chute cover 196 may be moved away from the upper purge aperture 192 and the lower purge aperture 192' in the disengaged position. In the disengaged position as shown in FIG. 43, build material 10 within the interior space 116, the excess return 160, the supply chute 150 and the dosing hopper 240 may flow out the upper purge aperture 192 and the lower purge aperture 192'.

In embodiments and referring to FIGS. 42-43, the piston 130 may move in a retraction direction 62 (e.g., a substantially counterclockwise direction in the view shown in FIGS. 42-43) to allow build material 10 within the interior space 116, the excess return 160, the supply chute 150, and/or the dosing hopper 240 to flow out the upper purge aperture 192 and/or the lower purge aperture 192'. In some embodiments, the piston 130 defines a removal surface 138 opposite the delivery surface 132. In embodiments, the removal surface 138 may assist in removing build material 10 out of the supply receptacle 110 as the piston 130 moves in the retraction direction 62, moving the build material out a rear upwardly-facing receptacle opening 117 of the supply receptacle 110.

In some embodiments, as the piston 130 moves build material 10 (FIG. 41) to the opening 114 (FIG. 40), some build material 10 may pass between the piston 130 and the one or more sidewalls of the supply receptacle 110, and may accumulate on the removal surface 138. As the piston 130 moves in the retraction direction 62, build material on the build material (FIG. 41) on the removal surface 138 may fall from the removal surface 138 and back into the supply receptacle 110. For example, in some embodiments, the piston 130 may move in the retraction direction such that the piston 130 is completely withdrawn from the supply receptacle 110, and build material 10 (FIG. 41) that had accumulated on the removal surface 139 may fall back into the supply receptacle 110. With the build material 10 may then be moved, via the piston 130 to the opening 114 (FIG. 40), as described above, or may flow out the upper purge aperture 192 and/or the lower purge aperture 192' if the movable supply chute cover 196 is in the disengaged position.

Figure 44:
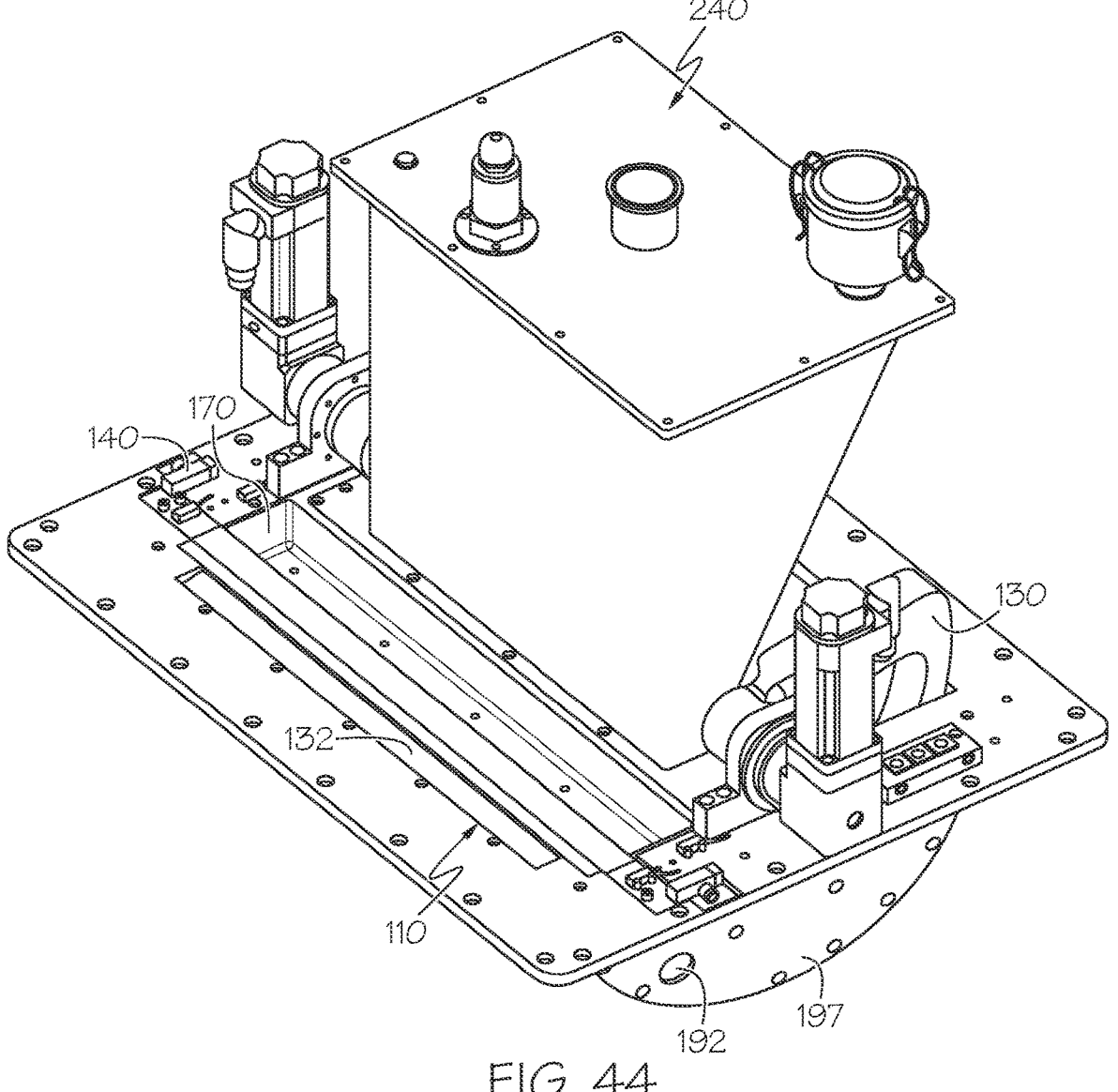
FIG. 44 schematically depicts a perspective view of another illustrative supply receptacle, according to one or more embodiments shown and described herein.

Referring to FIG. 44, a perspective view of another manufacturing system 100 is depicted. Like the embodiment described above and depicted in FIGS. 36-43, the piston 130 and the supply receptacle 110 each define arcuate shapes. However, in the embodiment depicted in FIG. 44, the manufacturing system 100 includes the contaminant receptacle 170 positioned between the opening 114 and the dosing hopper 240. Further, in the embodiment depicted in FIG. 44, one or more of the purge apertures 192 are positioned on one or more of the transverse sidewalls 197.

Further, in the embodiment depicted in FIG. 44, the manufacturing system includes one or more sieve sensors 140 that is structurally configured to detect material/objects positioned on the sieve 140. Similar to the embodiments described above, the sieve 140 may cover the excess return 160, and may allow build material 10 (FIG. 1) to enter the excess return 160 through the sieve 140, while restricting larger particulate matter from passing through the sieve 140. The one or more sieve sensors 140 may detect objects on the sieve 140 that may indicate blockage of the sieve 140, for example, by larger particulate matter and/or defective materials. The one or more sieve sensors 141 may be communicatively coupled to the controller 130 (FIG. 2), and may send signals to the controller 130 indicative of material positioned on the sieve 140. The controller 130 (FIG. 2), may, in some embodiments, direct the recoat actuator 32 (FIG. 2) to move the recoat assembly 30 (FIG. 2) to move over the sieve 140 to move the material on the sieve 140 to the contaminant receptacle 170.

Figure 45:
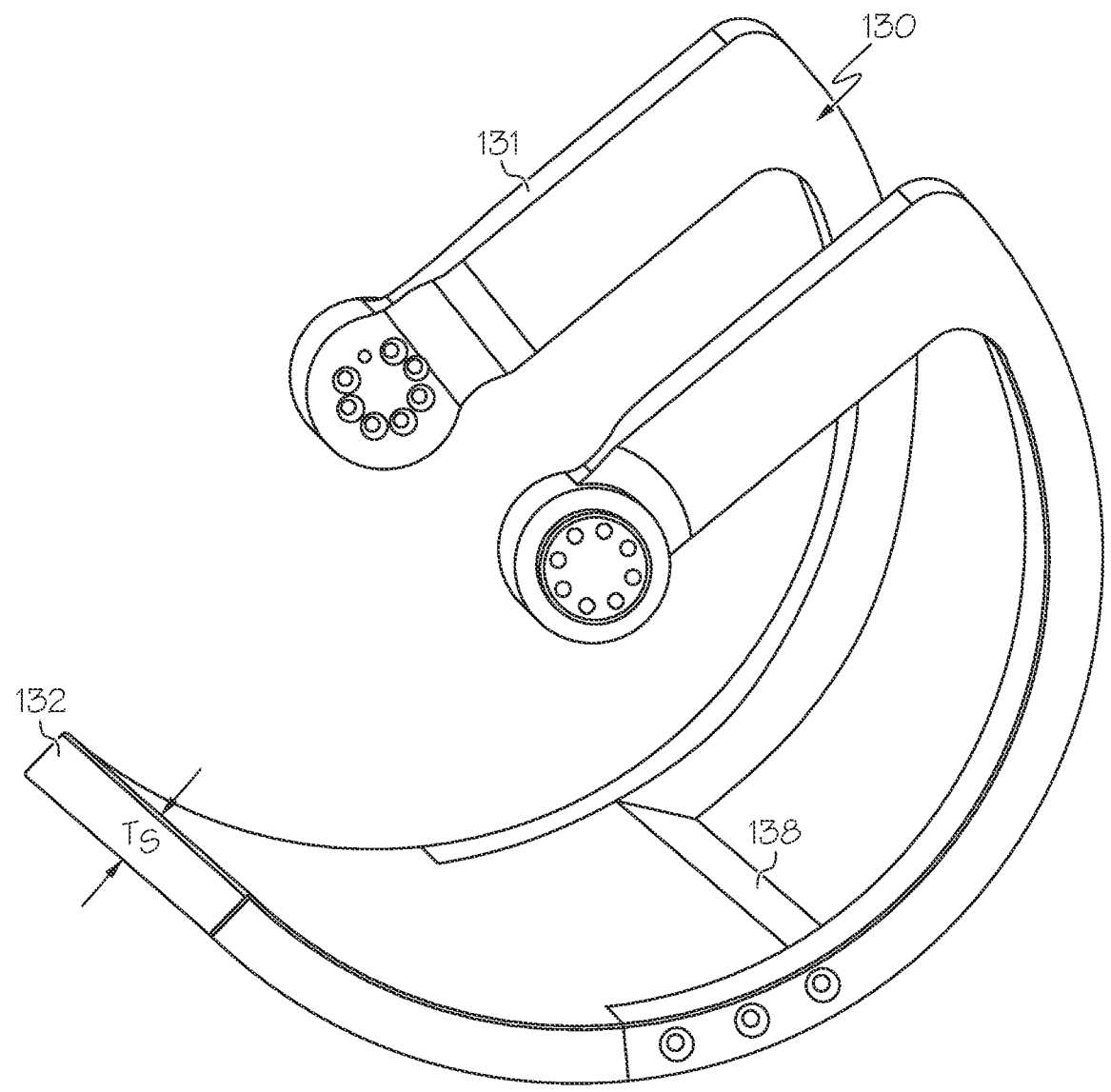
FIG. 45 schematically depicts an illustrative piston of the supply receptacle of FIG. 44, according to one or more embodiments shown and described herein.
Figure 46:
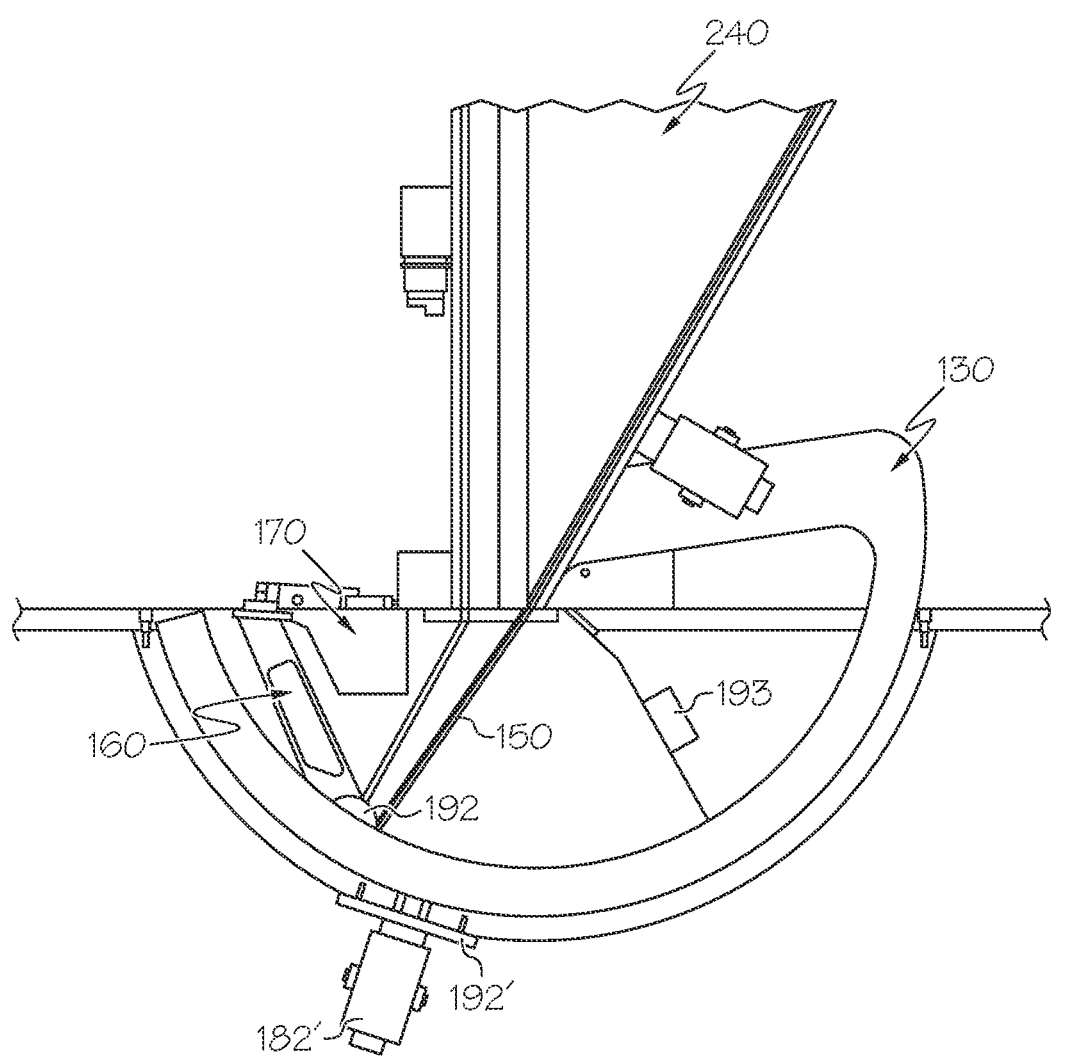
FIG. 46 schematically depicts a section view of the supply receptacle of FIG. 44, according to one or more embodiments shown and described herein.
Figure 47:
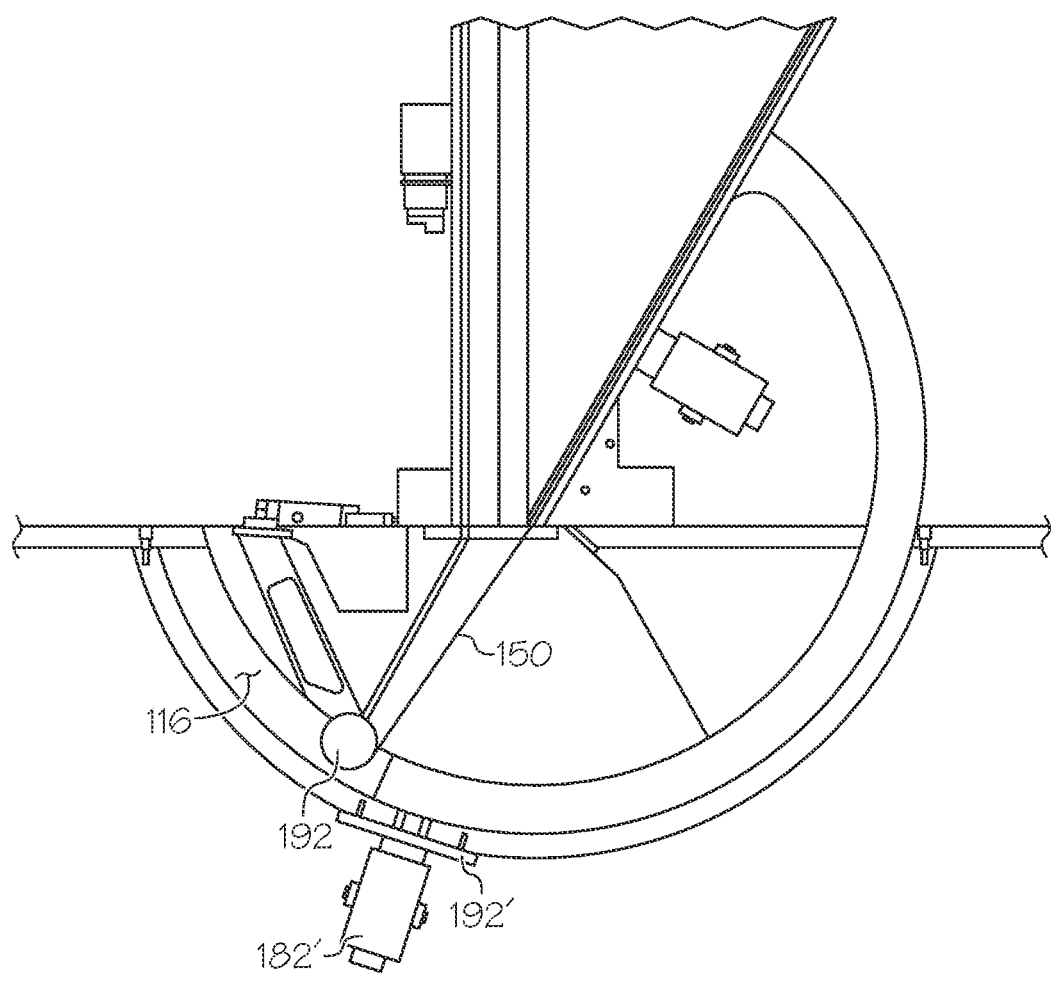
FIG. 47 schematically depicts a section view of the supply receptacle of FIG. 44 with the piston in a retracted position, according to one or more embodiments shown and described herein.

For example and referring to FIGS. 45-47, a perspective view of the piston 130, and section views of the manufacturing system 100 are schematically depicted, respectively. Like the embodiment described above and depicted in FIGS. 36-43, the piston 130 may define the removal surface 138 opposite the delivery surface 132. However, in the embodiment depicted in FIGS. 45-47, the one or more transverse sidewalls 194 define one or more transverse sidewall purge apertures 192, and the lower supply sidewall 120 may define one or more purge apertures 192'. In some embodiments, the delivery surface 132 of the piston 130 defines a surface thickness $T_s$, as shown in FIG. 45. The surface thickness $T_s$ may be selected to provide a suitable surface area of the delivery surface 132 to deliver build material 10 (FIG. 1) while maintaining a comparatively low weight of the piston 130. For example, in some embodiments, the piston may be actuated via an actuator coupled to a piston arm 131. To reduce the moment acting on the piston arm 131 as the piston 130 is moved between the extended and retracted position, it is desirable to minimize the weight of the piston 130, for example, by minimizing the surface thickness $T_s$. In some embodiments, the surface thickness Ts may be about 25 millimeters. In some embodiments, the surface thickness $T_s$ may be between about 15 millimeters and 35 millimeters, inclusive of the endpoints.

In some embodiments, the piston 130, and more particularly, the piston arms 131 may engage hard stops 193 positioned rearward of the supply chute 150. The hard stops 193 may limit movement of the piston 130 in the actuate direction 60, which may assist in calibrating an actuator or actuators coupled to the piston arms 131.

Figure 48:
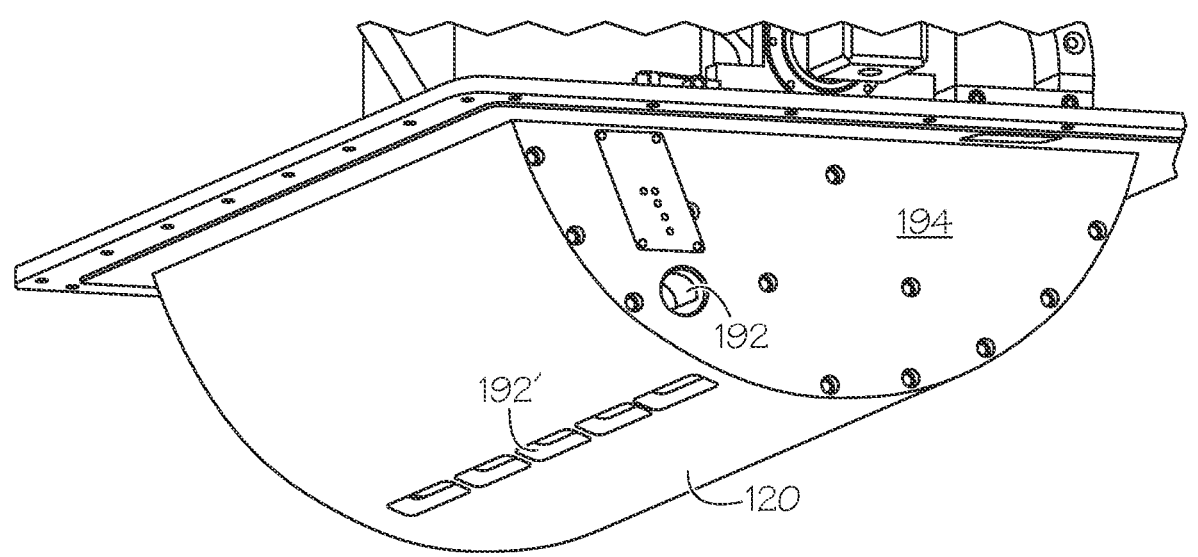
FIG. 48 schematically depicts a lower perspective view of the supply receptacle of FIG. 44, according to one or more embodiments shown and described herein.
Figure 49:
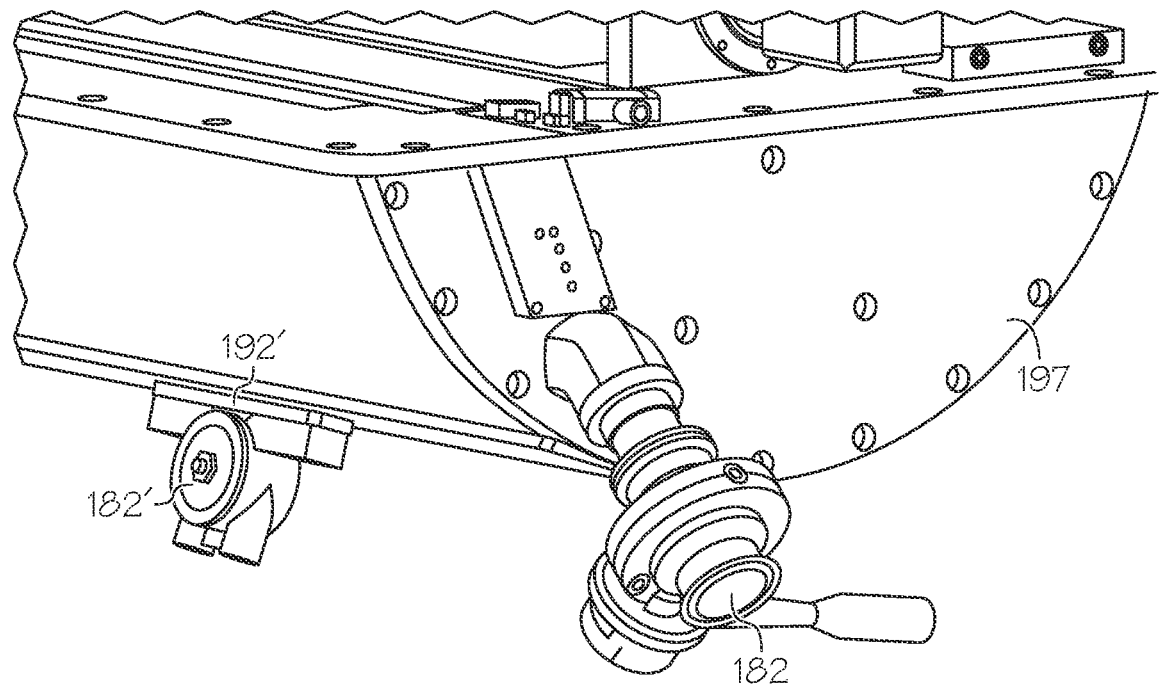
FIG. 49 schematically depicts a perspective view of the supply receptacle of FIG. 44 with one or more purge valves, according to one or more embodiments shown and described herein.

In some embodiments and referring to FIGS. 48 and 49, in some embodiments, purge valves 182, 182' may be positioned over the purge apertures 192, 192'. In embodiments and as described above, by selectively opening the purge valves 182, 182', build material 10 within the interior space 116 (FIG. 47), the excess return 160 (FIG. 47), the supply chute 150 (FIG. 47), and the dosing hopper 240 (FIG. 47) may flow out of the manufacturing system 100 through the purge apertures 192, 192'.

Figure 50:
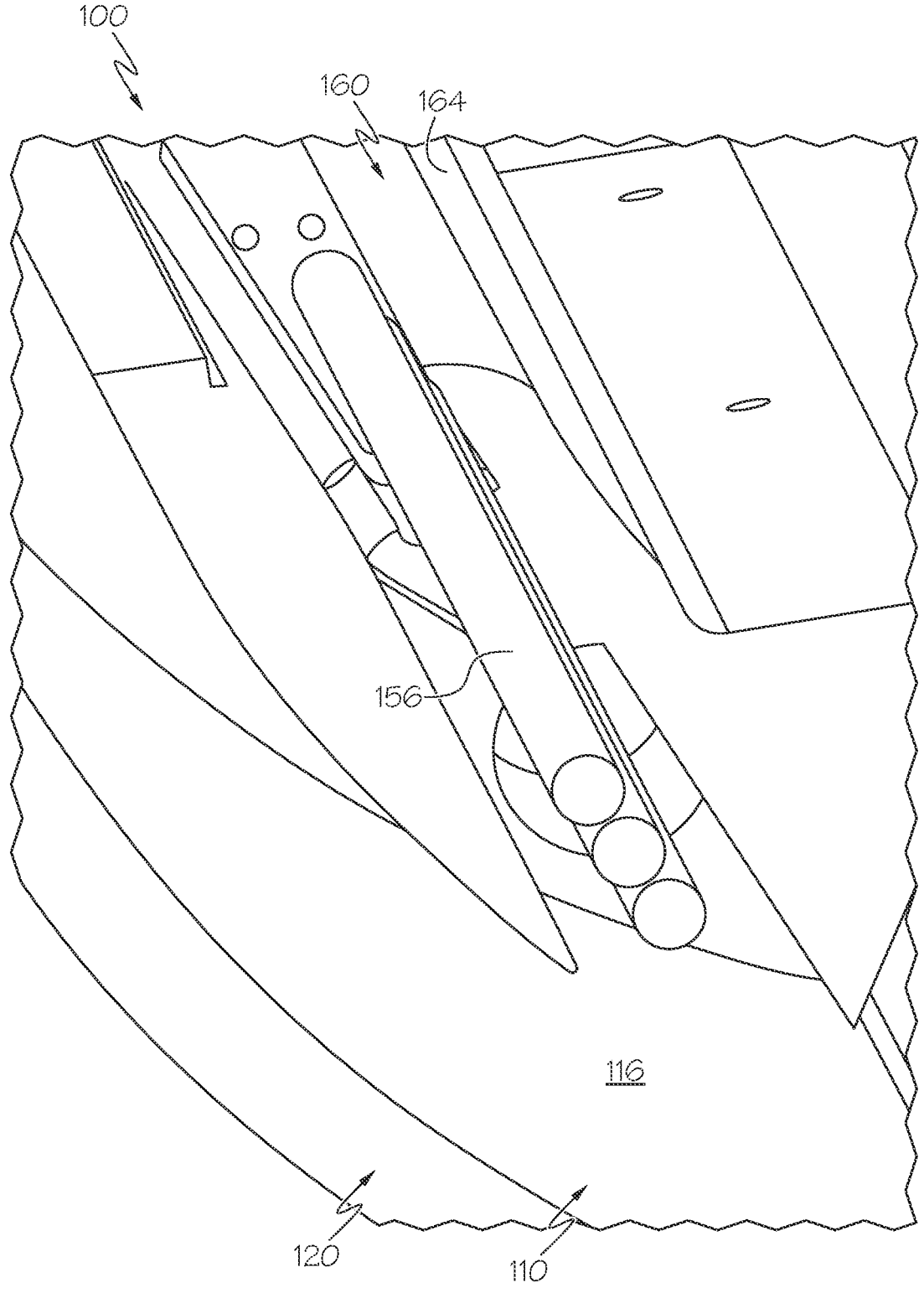
FIG. 50 schematically depicts an enlarged section view of the supply receptacle of FIG. 44 including one or more illustrative heating elements, according to one or more embodiments shown and described herein.

Referring to FIG. 50, an enlarged section view of the excess return 160 is schematically depicted. In the embodiment depicted in FIG. 1, one or more heating elements 156 are positioned at least partially within the excess return 160. While in the embodiment depicted in FIG. 51, the one or more heating elements 156 are positioned at least partially within the excess return 160, it should be understood that the one or more heating elements 156 may additionally or alternatively positioned within the supply chute 150 (FIG. 47). In some embodiments, the one or more heating elements 156 may be at least partially thermally isolated from the return chute 164 and/or the transverse sidewalls 197 (FIG. 49), which may reduce thermal expansion of the supply receptacle 110 and/or the return chute 164.

Based on the foregoing, it should be understood that embodiments described herein are directed to systems and methods that continuously or semi-continuously provide material to a supply receptacle of a manufacturing system.

Further aspects of the embodiments are provided by the subject matter of the following clauses:

1. A method for providing build material to an additive manufacturing system, the method comprising moving the build material from a dosing hopper to an interior space defined by one or more supply sidewalls of a supply receptacle and a piston positioned within the supply receptacle, and moving the piston toward a working surface of the additive manufacturing system, thereby moving build material within the interior space to the working surface.

2. The method of any preceding clause, further comprising moving, with a recoat assembly, the build material from the supply receptacle to a build area spaced apart from the supply receptacle along the working surface.

3. The method of any preceding clause, further comprising moving build material from the build area to an excess return in selective communication with the interior space.

4. The method of any preceding clause, further comprising moving the piston away from the working surface, thereby moving build material from the dosing hopper to the interior space.

5. The method of any preceding clause, wherein moving the piston toward the working surface comprises moving at least about 12.5 cubic centimeters of build material above the working surface.

6. The method of any preceding clause, wherein moving the piston toward the working surface comprises moving at least about 25 cubic centimeters of build material above the working surface.

7. The method of any preceding clause, further comprising moving build material from a conveyance hopper to the dosing hopper.

8. The method of any preceding clause, wherein the dosing hopper defines a dosing volume, and the conveyance hopper defines a supply volume, wherein the dosing volume is less than the supply volume.

9. The method of any preceding clause, wherein the supply volume is greater than a volume defined by a build area.

10. The method of any preceding clause, wherein the combination of the dosing volume and the supply volume is greater than a volume defined by the build area.

11. A system comprising a build area positioned along a working surface, a supply receptacle defining one or more supply receptacle sidewalls and an upwardly-facing receptacle opening, a piston engaged with the one or more supply receptacle sidewalls, wherein the piston, the upwardly-facing receptacle opening, and the one or more supply receptacle sidewalls at least partially define an interior space, and the piston is positionable between an extended position, in which the interior space has an extended volume, and a retracted position, in which the interior space has a retracted volume that is greater than the extended volume, a dosing hopper positioned above and in selective communication with the supply receptacle, wherein the dosing hopper is structurally configured to deliver build material to the interior space and wherein the dosing hopper defines a dosing volume, and a conveyance hopper in communication with the dosing hopper, the conveyance hopper defining a supply volume, wherein the supply volume is greater than the dosing volume.

12. The system of any preceding clause, wherein the supply volume is greater than a volume defined by the build area.

13. The system of any preceding clause, wherein a combination of the supply volume and dosing volume is greater than a volume defined by the build area.

14. The system of any preceding clause, further comprising a supply chute positioned between the dosing hopper and the interior space, wherein the interior space defines a dose volume defined by the one or more supply receptacle sidewalls, the upwardly-facing receptacle opening, and the supply chute opening.

15. The system of any preceding clause, wherein the dose volume is at least about 3500 cubic centimeters.

16. The system of any preceding clause, wherein the supply chute defines a supply chute volume that is at least about 3150 cubic centimeters.

17. The system of any preceding clause, wherein the piston, the one or more supply receptacle sidewalls, and the supply chute opening define a retracted volume with the piston in the retracted position that is less than the dose volume.

18. The system of any preceding clause, wherein the supply volume is at least about 135,000 cubic centimeters.

19. The system of any preceding clause, wherein the supply volume and the dose volume are collectively at least 135,000 cubic centimeters.

20. The system of any preceding clause, further comprising an excess return in selective communication with the interior space.

21. The system of any preceding clause, wherein the excess return defines a return volume that is less than the dosing volume.

22. The system of any preceding clause, wherein the return volume is at least about 1200 cubic centimeters.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A system comprising:
a build area positioned along a working surface;
a supply receptacle defining one or more supply receptacle sidewalls and an upwardly-facing receptacle opening;
a piston engaged with the one or more supply receptacle sidewalls, wherein:
the piston, the upwardly-facing receptacle opening, and the one or more supply receptacle sidewalls at least partially define an interior space; and the piston is positionable between an extended position, in which the interior space has an extended volume, and a retracted position, in which the interior space has a retracted volume that is greater than the extended volume;

a dosing hopper positioned above and in selective communication with the supply receptacle, wherein the dosing hopper is structurally configured to deliver build material to the interior space and wherein the dosing hopper defines a dosing volume;

a conveyance hopper in communication with the dosing hopper, the conveyance hopper defining a supply volume, wherein the supply volume is greater than the dosing volume; and a supply chute positioned between the dosing hopper and the interior space and having a supply chute opening into the interior space positioned below the upwardly-facing receptacle opening, wherein the interior space defines a dose volume defined by the one or more supply receptacle sidewalls, the upwardly-facing receptacle opening, and the supply chute opening.

2. The system of claim 1, wherein the supply volume is greater than a volume defined by the build area.

3. The system of claim 1, wherein a combination of the supply volume and dosing volume is greater than a volume defined by the build area.

4. The system of claim 1, wherein the dose volume is at least about 3500 cubic centimeters.

5. The system of claim 4, wherein the supply chute defines a supply chute volume that is at least about 3150 cubic centimeters.

6. The system of claim 5, wherein the piston, the one or more supply receptacle sidewalls, and the supply chute opening define a retracted volume with the piston in the retracted position that is less than the dose volume.

7. The system of claim 6, wherein the supply volume is at least about 135,000 cubic centimeters.

8. The system of claim 6, wherein the supply volume and the dose volume are collectively at least 135,000 cubic centimeters.

9. The system of claim 1, further comprising an excess return in selective communication with the interior space.

10. The system of claim 9, wherein the excess return defines a return volume that is less than the dosing volume.

* * * * *